United States Patent
Vaknin et al.

(10) Patent No.: US 10,547,573 B2
(45) Date of Patent: Jan. 28, 2020

(54) SYSTEM AND METHOD FOR ASSOCIATING MESSAGES WITH MEDIA DURING PLAYING THEREOF

(71) Applicant: SECOND SCREEN VENTURES LTD., Rishon LeZion (IL)

(72) Inventors: Ofer Vaknin, Beit Dagan (IL); Yoav Mor, Rishon LeZion (IL)

(73) Assignee: SECOND SCREEN VENTURES LTD., Rishon LeZion (IL)

(*) Notice: Subject to any disclaimer, the term of this patent is extended or adjusted under 35 U.S.C. 154(b) by 160 days.

(21) Appl. No.: 15/553,220

(22) PCT Filed: Feb. 25, 2016

(86) PCT No.: PCT/IL2016/050222
§ 371 (c)(1),
(2) Date: Aug. 24, 2017

(87) PCT Pub. No.: WO2016/135734
PCT Pub. Date: Sep. 1, 2016

(65) Prior Publication Data
US 2018/0077093 A1    Mar. 15, 2018

Related U.S. Application Data

(60) Provisional application No. 62/120,910, filed on Feb. 26, 2015.

(51) Int. Cl.
*G06F 15/16*     (2006.01)
*H04L 12/58*     (2006.01)
(Continued)

(52) U.S. Cl.
CPC ............ *H04L 51/046* (2013.01); *G10L 25/51* (2013.01); *H04L 51/10* (2013.01); *H04R 29/00* (2013.01)

(58) Field of Classification Search
CPC . H04L 67/1031; H04L 29/08; H04L 41/5003; H04L 41/5019; H04L 67/1002; H04L 67/1008; H04L 67/1012
(Continued)

(56) References Cited

U.S. PATENT DOCUMENTS 8,204,910 B2 * 6/2012 Tedesco ............... G06F 21/10
                                                707/785
8,626,847 B2 * 1/2014 Jones ................. H04L 12/1822
                                                709/206

(Continued)

FOREIGN PATENT DOCUMENTS

WO   2016/135734   9/2016
WO   2017/145144   8/2017

OTHER PUBLICATIONS

European Search Report dated Oct. 17, 2018 which issued during the prosecution of Applicant's European App No. 16754865.0.
(Continued)

*Primary Examiner* — Melvin H Pollack
(74) *Attorney, Agent, or Firm* — Sughrue Mion, PLLC

(57) ABSTRACT

A method for associating messages with media, including multiple media elements, during playing thereof, the method including sensing at least one media element currently being played by a user during playing of the media and based on the sensing of the at least one media element currently being played by a user, playing at least one message in time synchronization with playing of the at least one media element.

20 Claims, 41 Drawing Sheets

(51) Int. Cl.
*G10L 25/51* (2013.01)
*H04R 29/00* (2006.01)

(58) Field of Classification Search
USPC .......................................................... 709/226
See application file for complete search history.

(56) References Cited

U.S. PATENT DOCUMENTS

| | | | | |
|---|---|---|---|---|
| 8,744,860 | B2* | 6/2014 | Chang | H04L 51/32 |
| | | | | 704/275 |
| 8,762,580 | B2* | 6/2014 | Rajapakse | H04N 21/2368 |
| | | | | 607/60 |
| 8,973,063 | B2* | 3/2015 | Spilo | H04N 5/76 |
| | | | | 725/78 |
| 9,037,277 | B1* | 5/2015 | Sperring | H04R 29/00 |
| | | | | 700/94 |
| 9,215,503 | B2* | 12/2015 | Khader | H04N 21/47202 |
| 9,318,116 | B2* | 4/2016 | Mangold | H04B 11/00 |
| 9,338,208 | B2* | 5/2016 | Rajapakse | H04L 65/4076 |
| 9,380,349 | B2* | 6/2016 | Roberts | H04N 7/17318 |
| 9,383,965 | B1* | 7/2016 | Qureshi | G06F 3/04847 |
| 9,391,580 | B2* | 7/2016 | Helbling | H03G 5/165 |
| 9,396,180 | B1* | 7/2016 | Salvador | H04N 21/233 |
| 9,451,048 | B2* | 9/2016 | Wang | H04H 60/37 |
| 9,460,100 | B2* | 10/2016 | Obradovich | G11B 27/034 |
| 9,465,867 | B2* | 10/2016 | Hoarty | G06F 16/70 |
| 9,471,673 | B1* | 10/2016 | Sharifi | G06F 16/683 |
| 9,536,509 | B2* | 1/2017 | Esparza | G10H 3/143 |
| 9,549,027 | B2* | 1/2017 | Ali | H04L 67/125 |
| 9,565,226 | B2* | 2/2017 | Ravine | H04L 65/60 |
| 9,578,392 | B2* | 2/2017 | Abecassis | H04N 21/4126 |
| 9,799,348 | B2* | 10/2017 | Paul | G10L 17/16 |
| 9,832,518 | B2* | 11/2017 | Bangma | H04N 21/23106 |
| 9,848,228 | B1* | 12/2017 | Morris | H04N 21/4307 |
| 10,013,857 | B2* | 7/2018 | Sridhara | H04N 21/235 |
| 10,021,044 | B2* | 7/2018 | Abate | H04L 51/046 |
| 10,061,555 | B2* | 8/2018 | Harwood | G05B 15/02 |
| 2007/0106760 | A1 | 5/2007 | Houh et al. | |
| 2010/0281108 | A1 | 11/2010 | Cohen | |
| 2011/0125784 | A1 | 5/2011 | Cocheu et al. | |
| 2012/0004956 | A1* | 1/2012 | Huston | H04W 4/21 |
| | | | | 705/14.1 |
| 2012/0259926 | A1 | 10/2012 | Lockhart | |
| 2013/0254308 | A1* | 9/2013 | Rose | H04N 21/252 |
| | | | | 709/206 |
| 2013/0340004 | A1 | 12/2013 | Prestenback et al. | |
| 2014/0289309 | A1* | 9/2014 | Mitchell, Jr. | H04L 65/605 |
| | | | | 709/203 |
| 2015/0348157 | A1 | 12/2015 | Garcia | |
| 2016/0073141 | A1* | 3/2016 | Brand | H04N 5/4401 |
| | | | | 725/32 |
| 2016/0117144 | A1* | 4/2016 | Soldner | G06F 3/165 |
| | | | | 700/94 |
| 2016/0173347 | A1* | 6/2016 | Rajapakse | H04L 43/06 |
| | | | | 709/224 |
| 2017/0244992 | A1* | 8/2017 | Deshpande | H04N 21/242 |
| 2018/0159909 | A1* | 6/2018 | Huang | H04N 21/845 |
| 2018/0374461 | A1* | 12/2018 | Serletic | G10L 25/48 |

OTHER PUBLICATIONS

An International Search Report and a Written Opinion both dated Jan. 19, 2017, which issued during the prosecution of Applicant's PCT/IL2016/050918.

An International Search Report and a Written Opinion both dated Aug. 5, 2016, which issued during the prosecution of Applicant's PCT/IL2016/050222.

An International Preliminary Report on Patentability dated Aug. 29, 2017, which issued during the prosecution of Applicant's PCT/IL2016/050222.

U.S. Appl. No. 62/120,910, filed Feb. 26, 2015.

* cited by examiner

SYSTEM AND METHOD FOR ASSOCIATING MESSAGES WITH MEDIA DURING PLAYING THEREOF

CROSS-REFERENCE TO RELATED APPLICATIONS

Reference is hereby made to National Stage of International Application No. PCT/IL2016/050222 filed Feb. 25, 2016, claiming priority based on U.S. Provisional Patent Application Ser. No. 62/120,910 filed Feb. 26, 2015, and the entitled METHOD FOR SYNCHRONIZING SOCIAL-NETWORK INTERACTION WITH MEDIA CONSUMPTION, the description of which is hereby incorporated by reference and priority of which is hereby claimed pursuant to 37 C.F.R. 1.78(a)(1).

FIELD OF THE INVENTION

The present invention relates to message transmission systems and methods.

BACKGROUND OF THE INVENTION

Various types of message transmission systems and methods are known.

SUMMARY OF THE INVENTION

The present invention seeks to provide improved message transmission systems and methods.

There is thus provided in accordance with a preferred embodiment of the present invention a method for associating messages with media, including multiple media elements, during playing thereof, the method including sensing at least one media element currently being played by a user during playing of the media and based on the sensing of the at least one media element currently being played by a user, playing at least one message in time synchronization with playing of the at least one media element.

In accordance with a preferred embodiment of the present invention the playing of the media and the playing of the at least one message take place on different devices. Alternatively, the playing of the media and the playing of the at least one message take place on a single device.

Preferably, the method also includes, prior to the sensing, associating the at least one message in time with the at least one media element.

In accordance with a preferred embodiment of the present invention the associating the at least one message in time with the at least one media element includes time stamping a message with respect to a content specific timeline of media thereby providing a content specific timeline time stamp and storing the message together with the content specific timeline time stamp. Additionally, the sensing at least one media element currently being played by a user during playing of the media includes sensing playing of the media and the content specific timeline. Additionally or alternatively, the playing at least one message in time synchronization with playing of the at least one media element includes associating the message with the media during playing thereof at a time along the content specific timeline specified by the content specific timeline time stamp.

Preferably, the at least one message includes a text message. Alternatively, the at least one message includes a multi-media message. Alternatively, the at least one message includes an audio message. In accordance with a preferred embodiment of the present invention the at least one message includes an interactive message.

In accordance with a preferred embodiment of the present invention the media includes a video component.

Preferably, at least one of the different devices is selected from a telephone screen, a tablet and a watch screen.

In accordance with a preferred embodiment of the present invention the media is selected from video media, audio media, interactive media, podcasts, audio books, music, radio programming, television programming, movies, live events, sports, lectures and sermons. Additionally or alternatively, the media element is selected from: an audio frame, a video frame, an image, a word, a sequence of audio frames, a sound, a brightness level, a sound level, a sequence of video frames, a sequence of images, a sequence of words, a musical sequence, a logo, a portion of an image, a combination of video and audio content, an absence of audio content, an absence of video content and an absence of audio and video content.

Preferably, the playing at least one message in time synchronization with playing of the at least one media element includes playing the at least one message at least partially coincidentally in time with playing of the at least one media element. Alternatively, the playing at least one message in time synchronization with playing of the at least one media element includes playing the at least one message within at least a predetermined time following playing of the at least one media element. In accordance with a preferred embodiment of the present invention the playing at least one message in time synchronization with playing of the at least one media element includes playing the at least one message within at least a predetermined time prior to playing of the at least one media element.

In accordance with a preferred embodiment of the present invention the playing at least one message in time synchronization with playing of the at least one media element includes playing the at least one message within at least a predetermined time along a content specific timeline following playing of the at least one media element. Alternatively, the playing at least one message in time synchronization with playing of the at least one media element includes playing the at least one message within at least a predetermined time along a content specific timeline prior to playing of the at least one media element. In accordance with a preferred embodiment of the present invention the playing at least one message in time synchronization with playing of the at least one media element includes playing the at least one message within at least a predetermined time along a content specific timeline at least partially during playing of the at least one media element.

In accordance with a preferred embodiment of the present invention the sensing at least one media element employs a microphone picking up ambient audio information during playing of the at least one media element by the user, the ambient audio information including audio content of the at least one media element. Additionally, the method also includes analyzing the ambient audio information to provide output information of at least frequency and amplitude of at least some of the ambient audio information along a content specific time line.

Preferably, the analyzing the ambient audio information includes sampling the ambient audio information to provide a multiplicity of samples of the ambient audio information and performing a transformation of the multiplicity of samples to provide an output of at least frequency and amplitude of the at least some of the ambient audio information along a content specific time line to provide a Content Specific Timeline Specific Audio Identifier (CSTSAI). Additionally, the performing a transformation includes performing a plurality of transformations, each for a different number of samples. In accordance with a preferred embodiment of the present invention the transformation includes a short time Fourier transformation.

Preferably, the method also includes attempting matching of the content specific timeline specific audio identifier derived from the sensing to a previously acquired stored corresponding content specific timeline specific audio identifier. Additionally, the attempted matching includes attempting matching of the content specific timeline specific audio identifier derived from the sensing to a plurality of previously acquired stored corresponding content specific timeline specific audio identifiers, ascertaining a match quality metric for matching of the content specific timeline specific audio identifier derived from the sensing with two different ones of the plurality of previously acquired stored corresponding content specific timeline specific audio identifiers having the highest match quality, ascertaining whether a difference in the match quality metrics is equal to or greater than a predetermined threshold and if the difference is equal to or greater than the predetermined threshold, establishing a match between the content specific timeline specific audio identifier derived from the sensing and that one of the two different ones of the plurality of previously acquired stored corresponding content specific timeline specific audio identifiers having the highest match quality.

In accordance with a preferred embodiment of the present invention upon failure of the attempted matching, the content specific timeline specific audio identifier derived from the sensing is stored. Preferably, upon success of the attempted matching, the content specific timeline specific audio identifier derived from the sensing is stored if a quality indicator of the previously acquired stored corresponding content specific timeline specific audio identifier is less than a predetermined threshold. Additionally or alternatively, the playing at least one message in time synchronization with playing of the at least one media element includes upon successful matching of the content specific timeline specific audio identifier derived from the sensing to a previously acquired stored corresponding content specific timeline specific audio identifier, establishing a time synchronization between a content-specific timeline of audio content to which the content specific timeline specific audio identifier derived from the sensing belongs and a content-specific timeline of audio content to which the previously acquired stored corresponding content specific timeline specific audio identifier belongs.

In accordance with a preferred embodiment of the present invention the playing at least one message takes place at a time along the content-specific timeline of audio content to which the content specific timeline specific audio identifier derived from the sensing belongs, which corresponds to a time along the content-specific timeline of audio content to which the previously acquired stored corresponding content specific timeline specific audio identifier belongs to which the message was synchronized.

There is also provided in accordance with another preferred embodiment of the present invention a method for associating messages with media during playing thereof, the method including time stamping a message with respect to a content specific timeline of media thereby providing a content specific timeline time stamp, storing the message together with the content specific timeline time stamp, thereafter, sensing playing of the media and the content timeline and associating the message with the media during playing thereof at a time along the timeline specified by the content specific timeline time stamp.

There is yet further provided in accordance with still another preferred embodiment of the present invention a method for associating messages with podcasts during playing thereof, the method including associating a message with respect to a podcast, thereafter, enabling playing of the podcast on a first device and during playing of the podcast on the first device, enabling playing of the message on a second device.

In accordance with a preferred embodiment of the present invention the associating a message includes associating the message in time with the podcast. Additionally, the associating the message in time with the podcast includes time stamping the message with respect to a content specific timeline of the podcast thereby providing a content specific timeline time stamp and storing the message together with the content specific timeline time stamp.

In accordance with a preferred embodiment of the present invention the associating a message includes sensing playing of the podcast and the content specific timeline. Additionally or alternatively, the playing of the message on a second device includes associating the message with the podcast during playing thereof at a time along the content specific timeline specified by the content specific timeline time stamp.

In accordance with a preferred embodiment of the present invention the at least one message includes a text message. Alternatively, the at least one message includes a multimedia message. Alternatively, the at least one message includes an audio message. In accordance with a preferred embodiment of the present invention the at least one message includes an interactive message.

Preferably, at least one of the first device and the second device is selected from a telephone screen, a tablet and a watch screen.

In accordance with a preferred embodiment of the present invention the playing of the message on a second device includes playing the message based on the content specific timeline time stamp.

There is even further provided in accordance with yet another preferred embodiment of the present invention a method for associating messages with podcasts during playing thereof, the method including time stamping a message with respect to a timeline of a podcast, thereby providing a podcast timeline specific time stamp, storing the message together with the podcast timeline specific time stamp, thereafter, sensing playing of the podcast and the timeline and associating the message with the podcast during playing thereof at a time along the timeline specified by the podcast timeline specific time stamp.

There is still further provided in accordance with even another preferred embodiment of the present invention a method for associating messages with media during playing thereof on a first device, the method including time stamping a message with respect to a timeline of media thereby providing a media timeline specific time stamp, storing the message together with the media timeline specific time stamp and presenting the message on a second device, different from the first device, during playing of the media on the first device at a time along the timeline specified by the media timeline specific time stamp.

Preferably, the presenting the message on a second device during playing of the media includes sensing playing of the media and the timeline.

In accordance with a preferred embodiment of the present invention the message includes a text message. Alternatively, the message includes a multi-media message. Alternatively, the message includes an audio message. In accordance with a preferred embodiment of the present invention the message includes an interactive message.

Preferably, the wherein the media includes a video component.

In accordance with a preferred embodiment of the present invention at least one of the first device and the second device is selected from a telephone screen, tablet and a watch screen.

In accordance with a preferred embodiment of the present invention the media is selected from video media, audio media, interactive media, podcasts, audio books, music, radio programming, television programming, movies, live events, sports, lectures and sermons. Additionally or alternatively, the media element is selected from: an audio frame, a video frame, an image, a word, a sequence of audio frames, a sound, a brightness level, a sound level, a sequence of video frames, a sequence of images, a sequence of words, a musical sequence, a logo, a portion of an image, a combination of video and audio content, an absence of audio content, an absence of video content and an absence of audio and video content.

In accordance with a preferred embodiment of the present invention the sensing playing of the media includes employing a microphone picking up ambient audio information during playing of the media by the user, the ambient audio information including audio content of the media. Additionally, the method also includes analyzing the ambient audio information to provide output information of at least frequency and amplitude of at least some of the ambient audio information along the timeline.

There is also provided in accordance with another preferred embodiment of the present invention a system for associating messages with media, including multiple media elements, during playing thereof, the system including a server including a media element sensor, sensing at least one media element currently being played by a user during playing of the media and a message transmitter, transmitting at least one message to a message player for playing in time synchronization with playing of the at least one media element based on an output from the media element sensor.

In an another preferred embodiment of the present invention, access to the server is given to a third party, for example an advertiser, through the use of an Application Program Interface (API). The API will allow the third party to sense the at least one media element currently being played by a user during playing of the media, allowing the third party to transmit at least one message to the communication device for playing in time synchronization with playing of the at least one media element.

In accordance with a preferred embodiment of the present invention the server also includes a media element message associator, associating the at least one message in time with the at least one media element. Additionally, the media element message associator also includes a message time stamper, time stamping a message with respect to a content specific timeline of media thereby providing a content specific timeline time stamp, a database and a message time stamp storer, storing the message together with the content specific timeline time stamp in the database.

In accordance with a preferred embodiment of the present invention the media element sensor senses playing of the media and the content specific timeline. Additionally or alternatively, the message transmitter associates the message with the media during playing thereof at a time along the content specific timeline specified by the content specific timeline time stamp.

Preferably, the at least one message includes a text message. Alternatively, the at least one message includes a multi-media message. Alternatively, the at least one message includes an audio message. In accordance with a preferred embodiment of the present invention the at least one message includes an interactive message.

In accordance with a preferred embodiment of the present invention the media includes a video component.

Preferably, the media is selected from video media, audio media, interactive media, podcasts, audio books, music, radio programming, television programming, movies, live events, sports, lectures and sermons. Additionally or alternatively, the media element is selected from: an audio frame, a video frame, an image, a word, a sequence of audio frames, a sound, a brightness level, a sound level, a sequence of video frames, a sequence of images, a sequence of words, a musical sequence, a logo, a portion of an image, a combination of video and audio content, an absence of audio content, an absence of video content and an absence of audio and video content.

Preferably, the message transmitter transmits the at least one message for playing at least partially coincidentally in time with playing of the at least one media element. Alternatively, the message transmitter transmits the at least one message for playing within at least a predetermined time following playing of the at least one media element. In accordance with a preferred embodiment of the present invention the message transmitter transmits the at least one message for playing within at least a predetermined time prior to playing of the at least one media element.

Preferably, the message transmitter transmits the at least one message for playing within at least a predetermined time along a content specific timeline following playing of the at least one media element. Alternatively, the message transmitter transmits the at least one message for playing within at least a predetermined time along a content specific timeline prior to playing of the at least one media element. In accordance with a preferred embodiment of the present invention the message transmitter transmits the at least one message for playing within at least a predetermined time along a content specific timeline at least partially during playing of the at least one media element.

In accordance with a preferred embodiment of the present invention the media element sensor includes an ambient audio information receiver receiving ambient audio information during playing of the at least one media element by the user, the ambient audio information including audio content of the at least one media element. Additionally, the media element sensor also includes an ambient audio analyzer, analyzing the ambient audio information to provide output information of at least frequency and amplitude of at least some of the ambient audio information along a content specific time line.

Preferably, the ambient audio analyzer includes an ambient audio sampler, sampling the ambient audio information to provide a multiplicity of samples of the ambient audio information and an ambient audio sample transformer, performing a transformation of the multiplicity of samples to provide an output of at least frequency and amplitude of the at least some of the ambient audio information along a content specific time line to provide a Content Specific Timeline Specific Audio Identifier (CSTSAI).

Preferably, the ambient audio sample transformer performs a plurality of transformations, each for a different number of samples. Additionally or alternatively, the transformation includes a short time Fourier transformation.

In accordance with a preferred embodiment of the present invention the server also includes an audio matcher, attempting matching of the content specific timeline specific audio identifier output by the ambient audio analyzer to a previously acquired stored corresponding content specific timeline specific audio identifier. Additionally, the audio matcher includes an audio identifier matcher, attempting matching of the content specific timeline specific audio identifier provided by the ambient audio analyzer to a plurality of previously acquired stored corresponding content specific timeline specific audio identifiers, a match quality ascertainer, ascertaining a match quality metric for matching of the content specific timeline specific audio identifier provided by the ambient audio analyzer with two different ones of the plurality of previously acquired stored corresponding content specific timeline specific audio identifiers having the highest match quality, a match quality difference ascertainer, ascertaining whether a difference in the match quality metrics is equal to or greater than a predetermined threshold and providing a difference output of 'match' when the match quality metrics are equal to or greater than the threshold and an output of 'no match' when the match quality metrics are less than the threshold and a match establisher, establishing, if the difference output is 'match', a match between the content specific timeline specific audio identifier provided by the ambient audio analyzer and that one of the two different ones of the plurality of previously acquired stored corresponding content specific timeline specific audio identifiers having the highest match quality. Additionally, if the difference output is 'no match', the match establisher stores the content specific timeline specific audio identifier provided by the ambient audio analyzer.

Preferably, if the difference output is 'match', the match establisher stores the content specific timeline specific audio identifier provided by the ambient audio analyzer if a quality indicator of the previously acquired stored corresponding content specific timeline specific audio identifier is less than a predetermined threshold.

In accordance with a preferred embodiment of the present invention the message transmitter, upon the difference output being 'match', establishes a time synchronization between a content-specific timeline of audio content to which the content specific timeline specific audio identifier provided by the ambient audio analyzer belongs and a content-specific timeline of audio content to which the previously acquired stored corresponding content specific timeline specific audio identifier belongs.

Preferably, the message transmitter transmits the message to the message player for playing at a time along the content-specific timeline of audio content to which the content specific timeline specific audio identifier provided by the ambient audio analyzer belongs, which corresponds to a time along the content-specific timeline of audio content to which the previously acquired stored corresponding content specific timeline specific audio identifier belongs to which the message was synchronized.

There is further provided in accordance with yet another preferred embodiment of the present invention a system for associating messages with media during playing thereof, the system including a server including a message time stamper, time stamping a message with respect to a content specific timeline of media thereby providing a content specific timeline time stamp, a database, a message time stamp storer, storing the message together with the content specific timeline time stamp in the database, a media sensor, sensing playing of the media and the content specific timeline and a media message associator, associating the message with the media during playing thereof at a time along the content specific timeline specified by the content specific timeline time stamp.

There is still further provided in accordance with still another preferred embodiment of the present invention a system for associating messages with podcasts during playing thereof, the system including a server including a podcast message associator, associating a message with a podcast during playing thereof and a message transmitter, transmitting the message to a message player for playing in time synchronization with playing of the podcast.

Preferably, the server includes a database, the podcast message associator includes a message time stamper, time stamping a message with respect to a content specific timeline of the podcast thereby providing a content specific timeline time stamp and a message time stamp storer, storing the message together with the content specific timeline time stamp in the database and the message transmitter includes a podcast sensor, sensing playing of the podcast and the content specific timeline, the message transmitter transmitting the message to the message player for playing at a time along the content specific timeline specified by the content specific timeline time stamp.

There is yet further provided in accordance with still another preferred embodiment of the present invention a system for associating messages with podcasts during playing thereof, the system including a server including a message time stamper, time stamping a message with respect to a timeline of a podcast, thereby providing a podcast timeline specific time stamp, a database, a message time stamp storer, storing the message together with the podcast timeline specific time stamp in the database, a podcast sensor, sensing playing of the podcast and the content specific timeline and a podcast message associator, associating the message with the podcast during playing thereof at a time along the content specific timeline specified by the podcast timeline specific time stamp.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
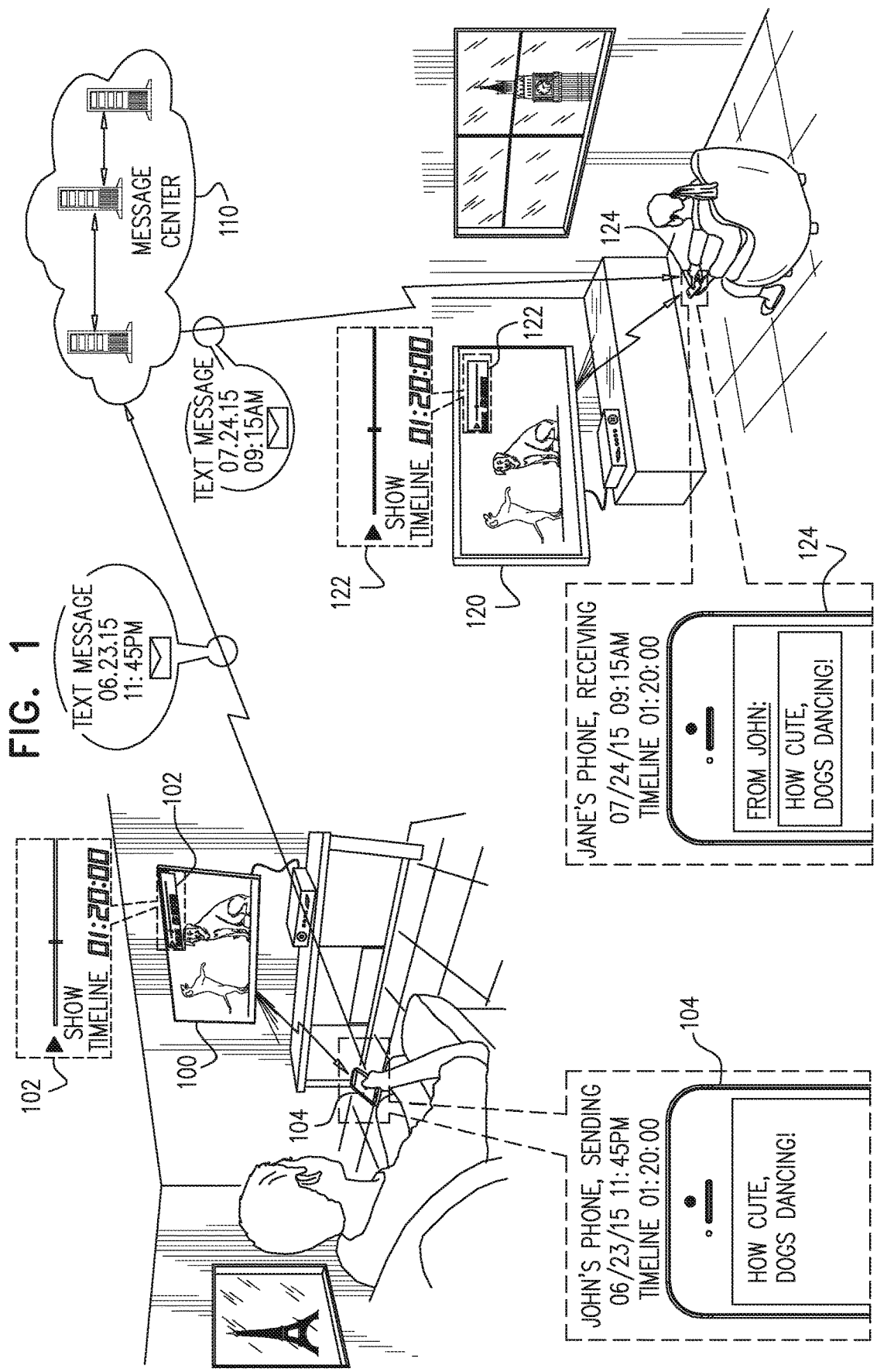
FIG. 1 is a simplified pictorial illustration of the operation of a method and system for associating messages with media during playing thereof in accordance with one embodiment of the present invention.

Reference is now made to FIG. 1, which is a simplified pictorial illustration of the operation of a method and system for associating messages with media during playing thereof in accordance with one embodiment of the present invention.

As seen in FIG. 1, a first user, here designated as John, is watching video content, such as a television show or movie, preferably having audio content, on a screen 100. The video content is not necessarily broadcast at a fixed time, but typically is served to screen 100 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 102.

Typically, while watching the video content on screen 100, John is holding a personal communicator 104, such as a smartphone or alternatively a tablet or other suitable device, including an audio receiver which senses the audio content. John, upon viewing some dogs dancing, is motivated to send a message, using his personal communicator 104, here a text message "HOW CUTE, DOGS DANCING!", commenting on the video content that he is currently watching. In the illustrated embodiment, John sends his text message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John types the first letter of his text message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 110, and is preferably stored thereat.

As also seen in FIG. 1, a second user, here designated as Jane, is watching the same video content, such as a television show or movie, preferably having audio content, on a screen 120. As noted above, the video content is not necessarily broadcast at a fixed time, but typically is served to screen 120 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 122.

It is appreciated that since the video content seen by both John and Jane is the same, they both have an identical CST. In this case, Jane is viewing the content on Jul. 24, 2015 and reaches the CST timestamp associated with John's earlier message at 9:15 AM, London time, on Jul. 24, 2015.

Typically, while watching the video content on screen 120, Jane is holding a personal communicator 124, such as a smartphone or alternatively a tablet or other suitable device, including an audio receiver which senses the audio content. When Jane reaches the CST timestamp 01:20:00 in the video content that she is currently watching and that John watched earlier, Jane receives, from message center 110 to her personal communicator 124, John's text message that was earlier sent by John at 11:45 PM on Jun. 23, 2015, Paris time. She sees John's message, here a text message "HOW CUTE, DOGS DANCING!", at the point of time in the video content which is contextually associated with John's message.

Figure 2:
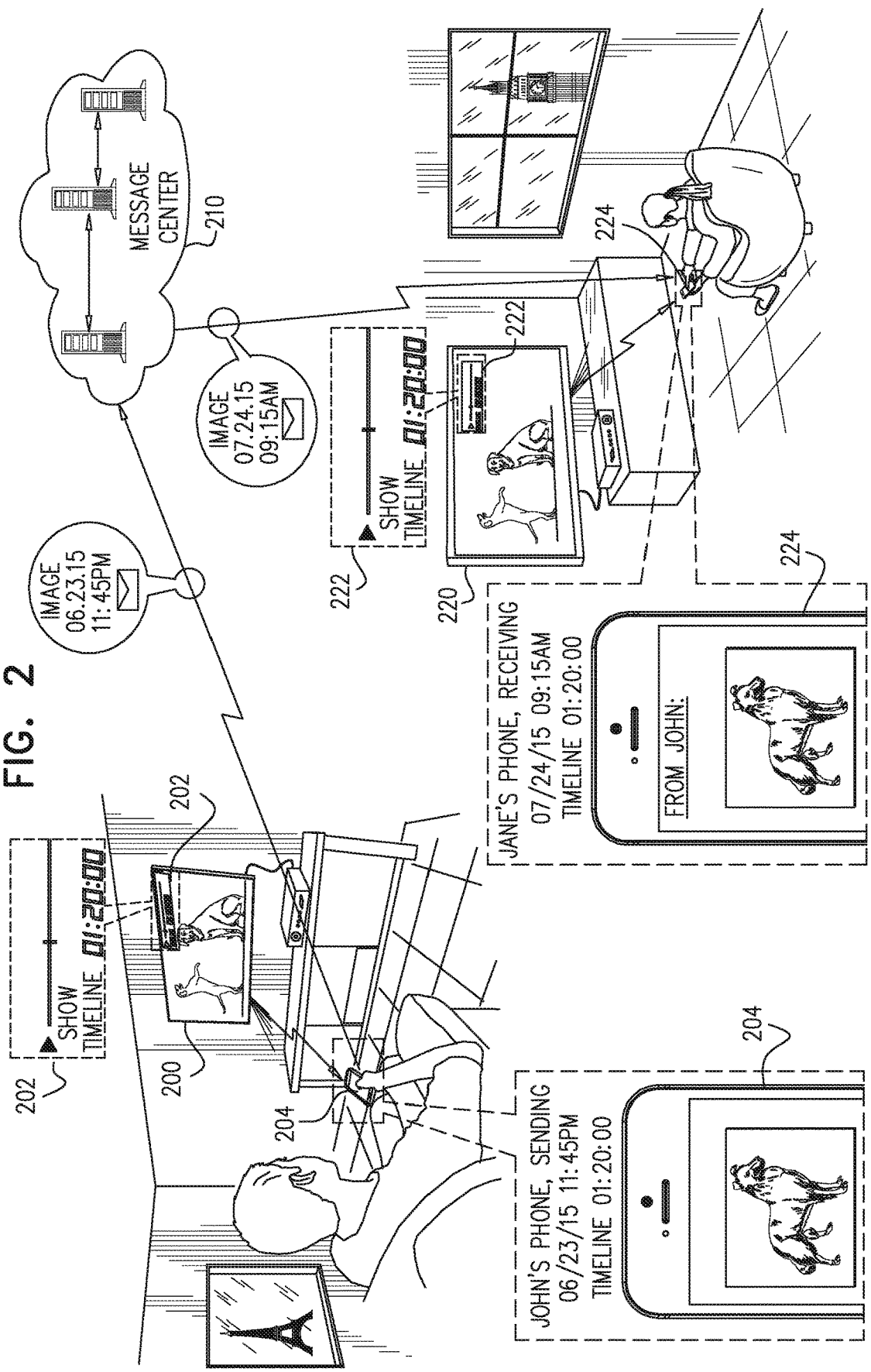
FIG. 2 is a simplified pictorial illustration of the operation of a method and system for associating messages with media during playing thereof in accordance with another embodiment of the present invention.

Reference is now made to FIG. 2, which is a simplified pictorial illustration of the operation of a method and system for associating messages with media during playing thereof in accordance with another embodiment of the present invention.

As seen in FIG. 2, a first user, here designated as John, is watching video content, such as a television show or movie, preferably having audio content, on a screen 200. The video content is not necessarily broadcast at a fixed time, but typically is served to screen 200 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 202.

Typically, while watching the video content on screen 200, John is holding a personal communicator 204, such as a smartphone or alternatively a tablet or other suitable device, including an audio receiver which senses the audio content. John, upon viewing some dogs dancing, is motivated to send a message, using his personal communicator 204, here an image, such as an image of his dog, as a comment on the video content that he is currently watching. In the illustrated embodiment, John sends his message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John initiates a search for an image to appear in his image message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 210, and is preferably stored thereat.

As also seen in FIG. 2, a second user, here designated as Jane, is watching the same video content, such as a television show or movie, preferably having audio content, on a screen 220. As noted above, the video content is not necessarily broadcast at a fixed time, but typically is served to screen 220 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 222.

It is appreciated that since the video content seen by both John and Jane is the same, they both have an identical CST. In this case, Jane is viewing the content on Jul. 24, 2015 and reaches the CST timestamp associated with John's earlier message at 9:15 AM, London time, on Jul. 24, 2015.

Typically, while watching the video content on screen 220, Jane is holding a personal communicator 224, such as a smartphone or alternatively a tablet or other suitable device, including an audio receiver which senses the audio content. When Jane reaches the CST timestamp 01:20:00 in the video content that she is currently watching and that John watched earlier, Jane receives, from message center 210 to her personal communicator 224, John's image message that was earlier sent by John at 11:45 PM on Jun. 23, 2015, Paris time. She sees John's message, here an image of his dog, at the point of time in the video content which is contextually associated with John's message.

Figure 3:
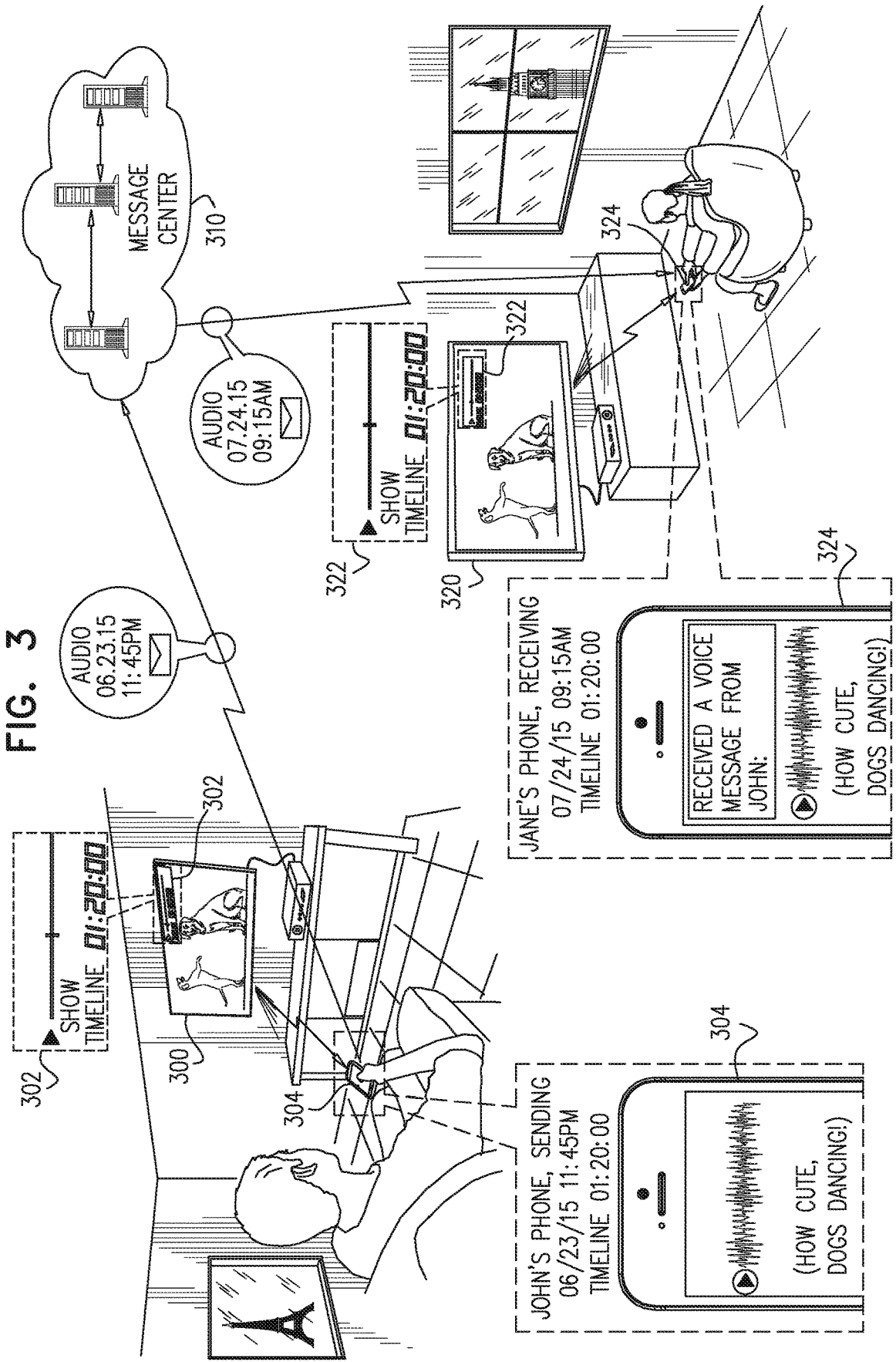
FIG. 3 is a simplified pictorial illustration of the operation of a method and system for associating messages with media during playing thereof in accordance with yet another embodiment of the present invention.

Reference is now made to FIG. 3, which is a simplified pictorial illustration of the operation of a method and system for associating messages with media during playing thereof in accordance with yet another embodiment of the present invention.

As seen in FIG. 3, a first user, here designated as John, is watching video content, such as a television show or movie, preferably having audio content, on a screen 300. The video content is not necessarily broadcast at a fixed time, but typically is served to screen 300 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 302.

Typically, while watching the video content on screen 300, John is holding a personal communicator 304, such as a smartphone or alternatively a tablet or other suitable device, including an audio receiver which senses the audio content. John, upon viewing some dogs dancing, is motivated to send a message, using his personal communicator 304, here an audio message whose transcription is "HOW CUTE, DOGS DANCING!", commenting on the video content that he is currently watching. In the illustrated embodiment, John sends his audio message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John initiates audio recording of his audio message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 310, and is preferably stored thereat.

As also seen in FIG. 3, a second user, here designated as Jane, is watching the same video content, such as a television show or movie, preferably having audio content, on a screen 320. As noted above, the video content is not necessarily broadcast at a fixed time, but typically is served to screen 320 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 322.

It is appreciated that since the video content seen by both John and Jane is the same, they both have an identical CST. In this case, Jane is viewing the content on Jul. 24, 2015 and reaches the CST timestamp associated with John's earlier message at 9:15 AM, London time on Jul. 24, 2015.

Typically, while watching the video content on screen 320, Jane is holding a personal communicator 324, such as a smartphone or alternatively a tablet or other suitable device, including an audio receiver which senses the audio content. When Jane reaches the CST timestamp 01:20:00 in the video content that she is currently watching and that John watched earlier, Jane receives, from message center 310 to her personal communicator 324, John's audio message that was earlier sent by John at 11:45 PM on Jun. 23, 2015, Paris time. She hears John's message, here "HOW CUTE, DOGS DANCING!", at the point of time in the video content which is contextually associated with John's message.

Figure 4:
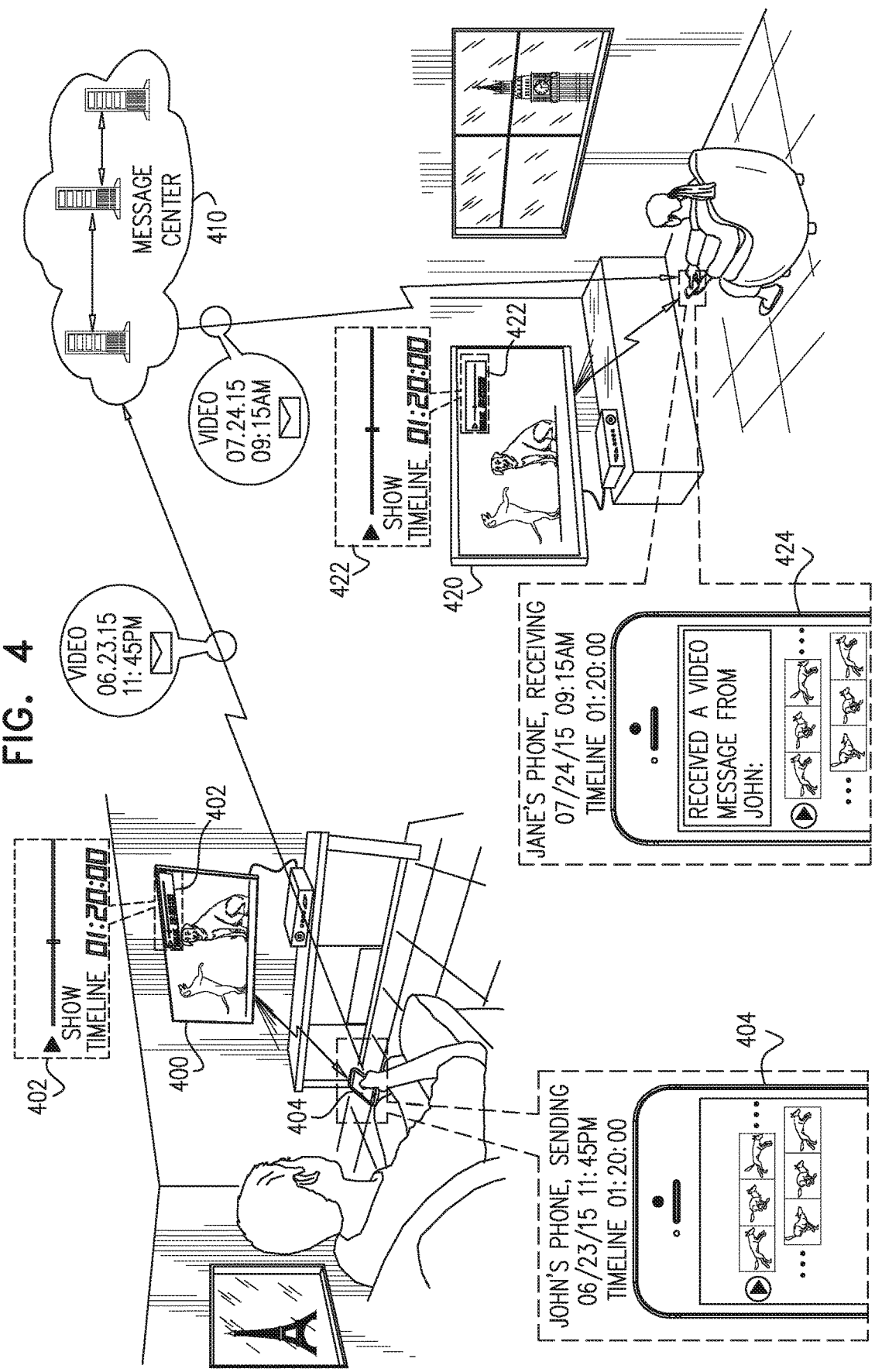
FIG. 4 is a simplified pictorial illustration of the operation of a method and system for associating messages with media during playing thereof in accordance with still another embodiment of the present invention.

Reference is now made to FIG. 4, which is a simplified pictorial illustration of the operation of a method and system for associating messages with media during playing thereof in accordance with still another embodiment of the present invention.

As seen in FIG. 4, a first user, here designated as John, is watching video content, such as a television show or movie, preferably having audio content, on a screen 400. The video content is not necessarily broadcast at a fixed time, but typically is served to screen 400 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 402.

Typically, while watching the video content on screen 400, John is holding a personal communicator 404, such as a smartphone or alternatively a tablet or other suitable device, including an audio receiver which senses the audio content. John, upon viewing some dogs dancing, is motivated to send a message, using his personal communicator 404, here a video message, here showing a dog running, as a comment on the video content that he is currently watching. In the illustrated embodiment, John sends his video message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John initiates video recording, downloading or searching for his video message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 410, and is preferably stored thereat.

As also seen in FIG. 4, a second user, here designated as Jane, is watching the same video content, such as a television show or movie, preferably having audio content, on a screen 420. As noted above, the video content is not necessarily broadcast at a fixed time, but typically is served to screen 420 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 422.

It is appreciated that since the video content seen by both John and Jane is the same, they both have an identical CST. In this case, Jane is viewing the content on Jul. 24, 2015 and reaches the CST timestamp associated with John's earlier message at 9:15 AM, London time, on Jul. 24, 2015.

Typically, while watching the video content on screen 420, Jane is holding a personal communicator 424, such as a smartphone or alternatively a tablet or other suitable device, including an audio receiver which senses the audio content. When Jane reaches the CST timestamp 01:20:00 in the video content that she is currently watching and that John watched earlier, Jane receives, from message center 410 to her personal communicator 424, John's video message that was earlier sent by John at 11:45 PM on Jun. 23, 2015, Paris time. She views John's video message at the point of time in the video content which is contextually associated with John's message.

Figure 5:
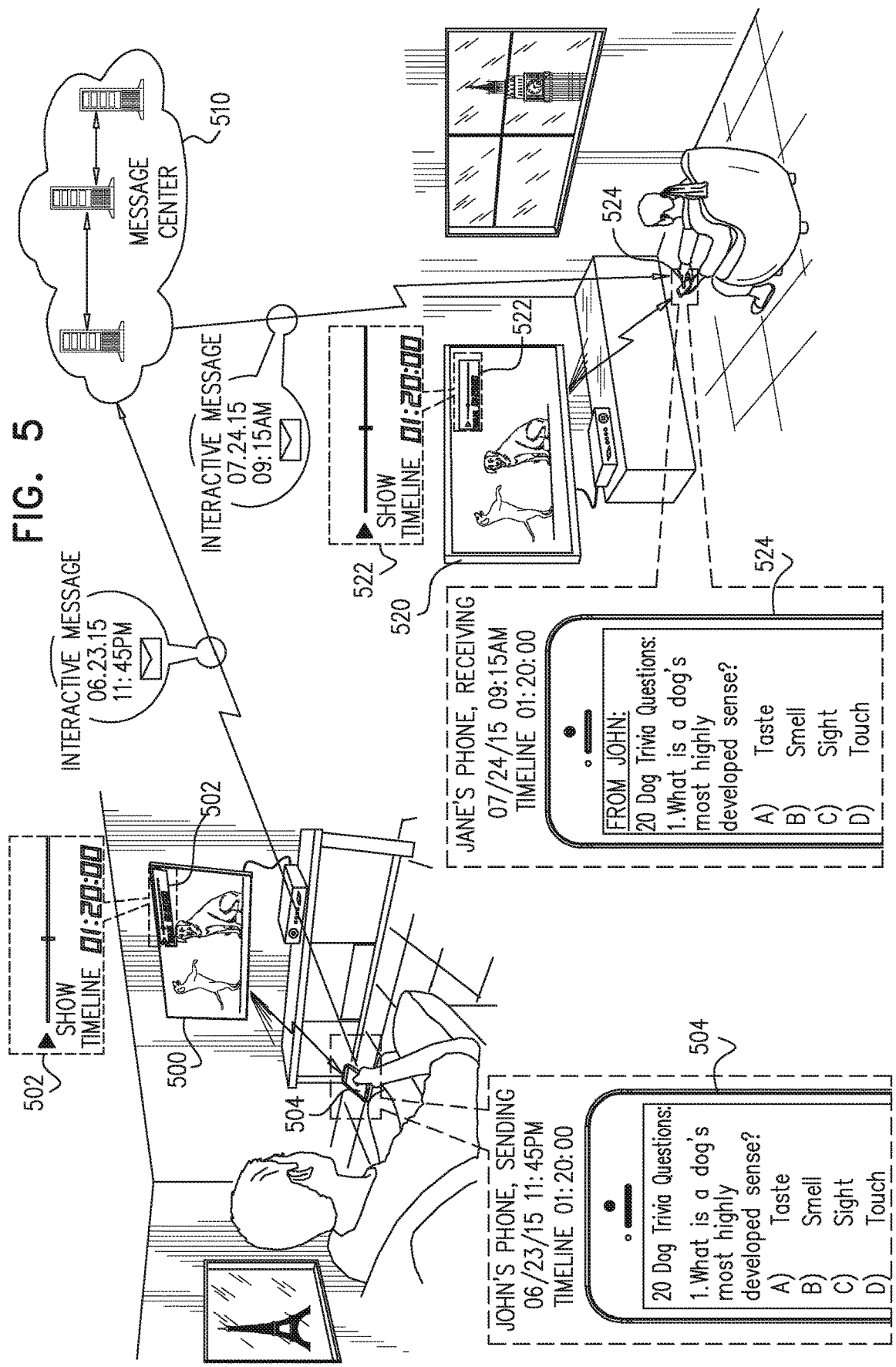
FIG. 5 is a simplified pictorial illustration of the operation of a method and system for associating messages with media during playing thereof in accordance with a further embodiment of the present invention.

Reference is now made to FIG. 5, which is a simplified pictorial illustration of the operation of a method and system for associating messages with media during playing thereof in accordance with another embodiment of the present invention.

As seen in FIG. 5, a first user, here designated as John, is watching video content, such as a television show or movie, preferably having audio content, on a screen 500. The video content is not necessarily broadcast at a fixed time, but typically is served to screen 500 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 502.

Typically, while watching the video content on screen 500, John is holding a personal communicator 504, such as a smartphone or alternatively a tablet or other suitable device, including an audio receiver which senses the audio content. John, upon viewing some dogs dancing, is motivated to send a message, using his personal communicator 504, here an interactive message, such as a message asking dog related questions, as a comment on the video content that he is currently watching. In the illustrated embodiment, John sends his interactive message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John initiates his interactive message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 510, and is preferably stored thereat.

As also seen in FIG. 5, a second user, here designated as Jane, is watching the same video content, such as a television show or movie, preferably having audio content, on a screen 520. As noted above, the video content is not necessarily broadcast at a fixed time, but typically is served to screen 520 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 522.

It is appreciated that since the video content seen by both John and Jane is the same, they both have an identical CST. In this case, Jane is viewing the content on Jul. 24, 2015 and reaches the CST timestamp associated with John's earlier message at 9:15 AM, London time, on Jul. 24, 2015.

Typically, while watching the video content on screen 520, Jane is holding a personal communicator 524, such as a smartphone or alternatively a tablet or other suitable device, including an audio receiver which senses the audio content. When Jane reaches the CST timestamp 01:20:00 in the video content that she is currently watching and that John watched earlier, Jane receives, from message center 510 to her personal communicator 524, John's interactive message that was earlier sent by John at 11:45 PM on Jun. 23, 2015, Paris time. She receives John's interactive message at the point of time in the video content which is contextually associated with John's message. It is appreciated that Jane may specify specific users from whom she is willing to receive messages.

Figure 6:
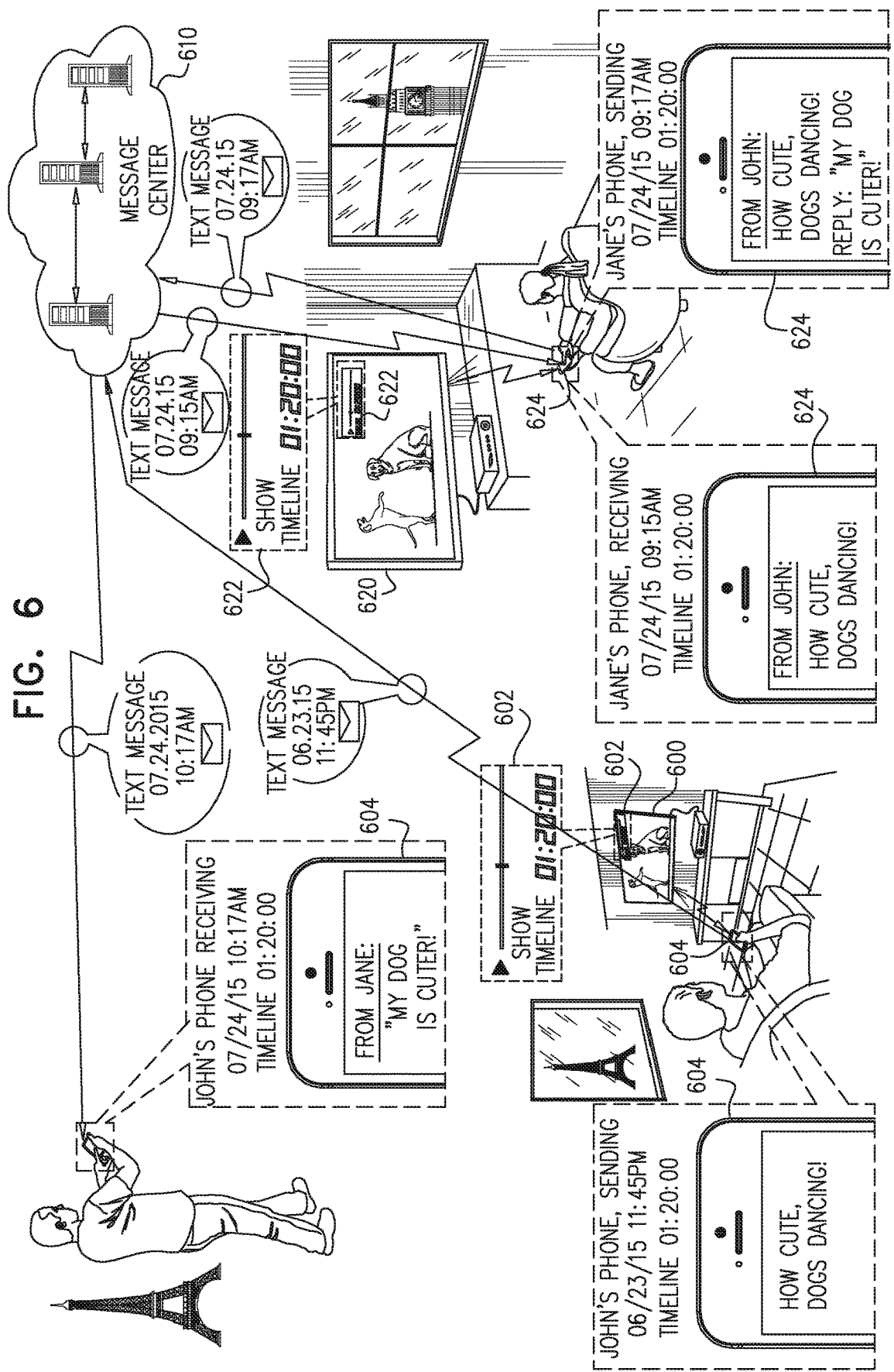
FIG. 6 is a simplified pictorial illustration of the operation of a method and system for associating messages with media during playing thereof in accordance with yet a further embodiment of the present invention.

Reference is now made to FIG. 6, which is a simplified pictorial illustration of the operation of a method and system for associating messages with media during playing thereof in accordance with yet another embodiment of the present invention.

As seen in FIG. 6, a first user, here designated as John, is watching video content, such as a television show or movie, preferably having audio content, on a screen 600. The video content is not necessarily broadcast at a fixed time, but typically is served to screen 600 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 602.

Typically, while watching the video content on screen 600, John is holding a personal communicator 604, such as a smartphone or alternatively a tablet or other suitable device, including an audio receiver which senses the audio content. John, upon viewing some dogs dancing, is motivated to send a message, using his personal communicator 604, here a text message "HOW CUTE, DOGS DANCING!", commenting on the video content that he is currently watching. In the illustrated embodiment, John sends his text message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John types the first letter of his text message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 610, and is preferably stored thereat.

As also seen in FIG. 6, a second user, here designated as Jane, is watching the same video content, such as a television show or movie, preferably having audio content, on a screen 620. As noted above, the video content is not necessarily broadcast at a fixed time, but typically is served to screen 620 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 622.

It is appreciated that since the video content seen by both John and Jane is the same, they both have an identical CST. In this case, Jane is viewing the content on Jul. 24, 2015 and reaches the CST timestamp associated with John's earlier message at 9:15 AM, London time, on Jul. 24, 2015.

Typically, while watching the video content on screen 620, Jane is holding a personal communicator 624, such as a smartphone or alternatively a tablet or other suitable device, including an audio receiver which senses the audio content. When Jane reaches the CST timestamp 01:20:00 in the video content that she is currently watching and that John watched earlier, Jane receives, from message center 610 to her personal communicator 624, John's text message that was earlier sent by John at 11:45 PM on Jun. 23, 2015, Paris time. She sees John's message, here a text message "HOW CUTE, DOGS DANCING!", at the point of time in the video content which is contextually associated with John's message.

Upon receiving John's text message, Jane chooses to reply, here by texting "MY DOG IS CUTER". She can reply upon receipt of John's text message or at any later time. Jane's reply is received by the message center 610. Message center 610 makes Jane's reply available to John immediately and makes it available for download in the future. Additionally, or, alternatively, Jane's reply may be sent directly to John's phone by conventional messaging applications.

Figure 7:
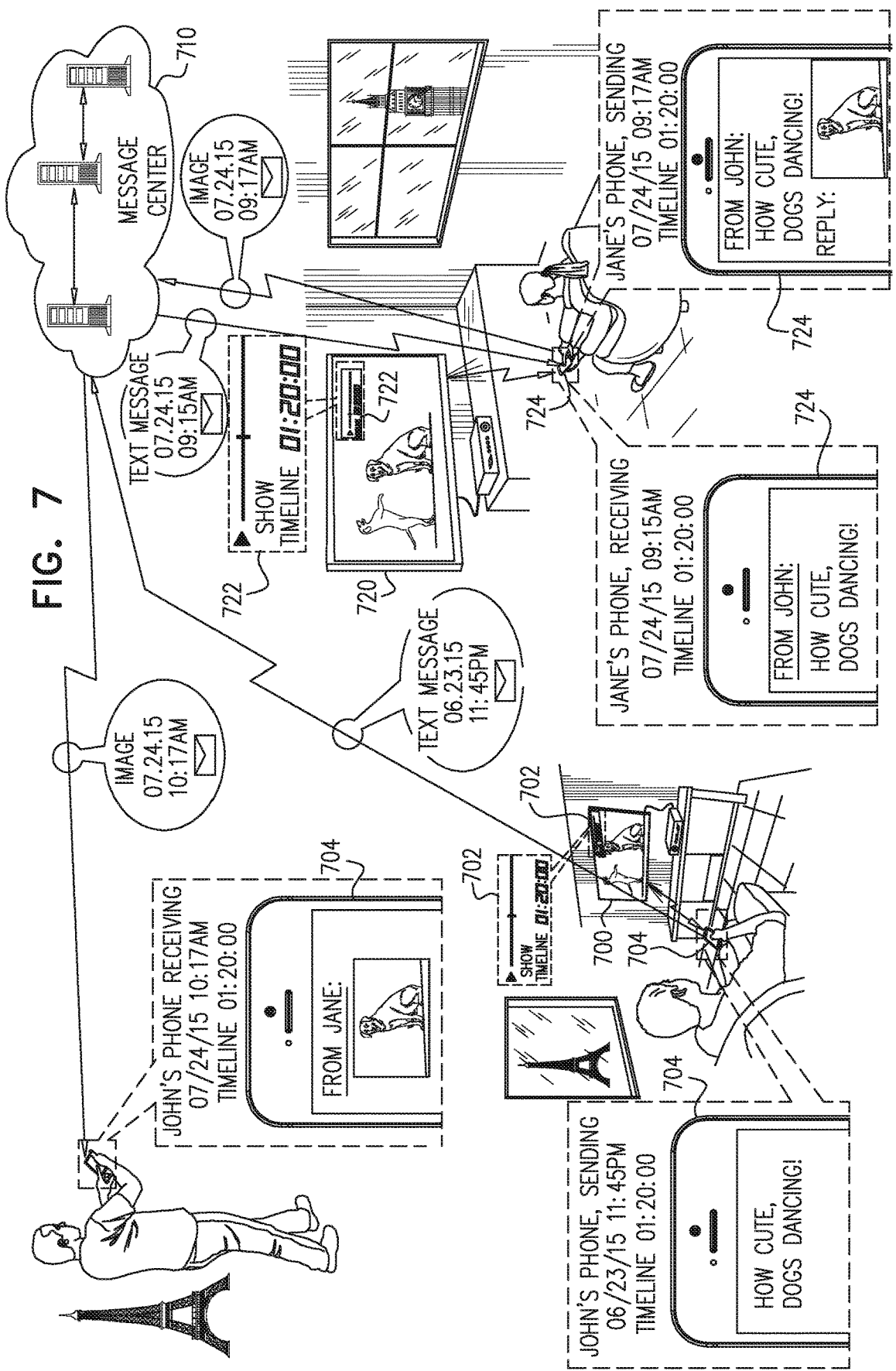
FIG. 7 is a simplified pictorial illustration of the operation of a method and system for associating messages with media during playing thereof in accordance with still a further embodiment of the present invention.

Reference is now made to FIG. 7, which is a simplified pictorial illustration of the operation of a method and system for associating messages with media during playing thereof in accordance with still another embodiment of the present invention.

As seen in FIG. 7, a first user, here designated as John, is watching video content, such as a television show or movie, preferably having audio content, on a screen 700. The video content is not necessarily broadcast at a fixed time, but typically is served to screen 700 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 702.

Typically, while watching the video content on screen 700, John is holding a personal communicator 704, such as a smartphone or alternatively a tablet or other suitable device, including an audio receiver which senses the audio content. John, upon viewing some dogs dancing, is motivated to send a message, using his personal communicator 704, here a text message "HOW CUTE, DOGS DANCING!", commenting on the video content that he is currently watching. In the illustrated embodiment, John sends his text message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John types the first letter of his text message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 710, and is preferably stored thereat.

As also seen in FIG. 7, a second user, here designated as Jane, is watching the same video content, such as a television show or movie, preferably having audio content, on a screen 720. As noted above, the video content is not necessarily broadcast at a fixed time, but typically is served to screen 720 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 722.

It is appreciated that since the video content seen by both John and Jane is the same, they both have an identical CST. In this case, Jane is viewing the content on Jul. 24, 2015 and reaches the CST timestamp associated with John's earlier message at 9:15 AM, London time, on Jul. 24, 2015.

Typically, while watching the video content on screen 720, Jane is holding a personal communicator 724, such as a smartphone or alternatively a tablet or other suitable device, including an audio receiver which senses the audio content. When Jane reaches the CST timestamp 01:20:00 in the video content that she is currently watching and that John watched earlier, Jane receives, from message center 710 to her personal communicator 724, John's text message that was earlier sent by John at 11:45 PM on Jun. 23, 2015, Paris time. She sees John's message, here a text message "HOW CUTE, DOGS DANCING!", at the point of time in the video content which is contextually associated with John's message.

Upon receiving John's text message, Jane chooses to reply, here by sending an image, such as an image of her dog. She can reply upon receipt of John's text message or at any later time. Jane's reply is received by the message center 710. Message center 710 makes Jane's reply available to John immediately and makes it available for download in the future. Additionally, or, alternatively, Jane's reply may be sent directly to John's phone by conventional messaging applications.

Figure 8:
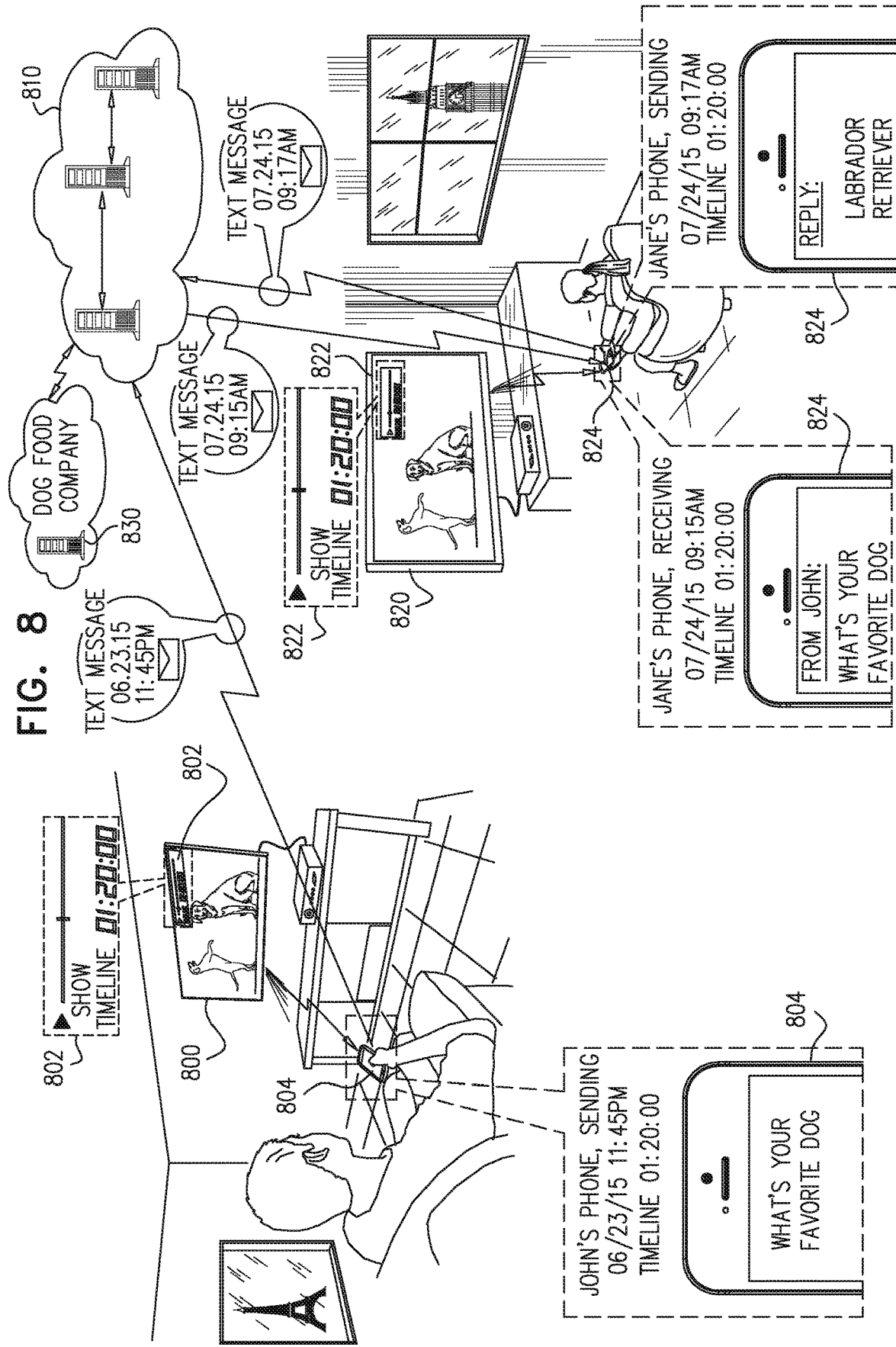
FIG. 8 is a simplified pictorial illustration of the operation of a method and system for associating messages with media during playing thereof in accordance with another embodiment of the present invention.

Reference is now made to FIG. 8, which is a simplified pictorial illustration of the operation of a method and system for associating messages with media during playing thereof in accordance with another embodiment of the present invention.

As seen in FIG. 8, a first user, here designated as John, is watching video content, such as a television show or movie, preferably having audio content, on a screen 800. The video content is not necessarily broadcast at a fixed time, but typically is served to screen 800 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 802.

Typically, while watching the video content on screen 800, John is holding a personal communicator 804, such as a smartphone or alternatively a tablet or other suitable device, including an audio receiver which senses the audio content. John, upon viewing some dogs dancing, is motivated to send a message, using his personal communicator 804, here a text message "WHAT'S YOUR FAVORITE DOG", commenting on the video content that he is currently watching. In the illustrated embodiment, John sends his text message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John types the first letter of his text message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 810, and is preferably stored thereat.

As also seen in FIG. 8, a second user, here designated as Jane, is watching the same video content, such as a television show or movie, preferably having audio content on a screen 820. As noted above, the video content is not necessarily broadcast at a fixed time, but typically is served to screen 820 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 822.

It is appreciated that since the video content seen by both John and Jane is the same, they both have an identical CST. In this case, Jane is viewing the content on Jul. 24, 2015 and reaches the CST timestamp associated with John's earlier message at 9:15 AM, London time, on Jul. 24, 2015.

Typically, while watching the video content on screen 820, Jane is holding a personal communicator 824, such as a smartphone or alternatively a tablet or other suitable device, including an audio receiver which senses the audio content. When Jane reaches the CST timestamp 01:20:00 in the video content that she is currently watching and that John watched earlier, Jane receives, from message center 810 to her personal communicator 824, John's text message that was earlier sent by John at 11:45 PM on Jun. 23, 2015, Paris time. She sees John's message, here a text message "WHAT'S YOUR FAVORITE DOG", at the point of time in the video content which is contextually associated with John's message.

Upon receiving John's text message, Jane chooses to reply, here by texting "LABRADOR RETRIEVER". She can reply upon receipt of John's text message or at any later time. Jane's reply is received by the message center 810. Message center 810 makes Jane's reply available to John immediately and makes it available for download in the future. Additionally, or, alternatively, Jane's reply may be sent directly to John's phone by conventional messaging applications.

In accordance with a preferred embodiment of the present invention, a server 830 of a commercial entity, here a dog food company, receives an identity-agnostic feed of parsed extracts from the messages received by the message center 810. This feed is preferably associated with the CST timestamps of the relevant video context. The identity-agnostic feed of parsed extracts can be used by the commercial entity for various commercial purposes, for example to gauge consumer response to specific portions of video context, such as a product placement.

Figure 9:
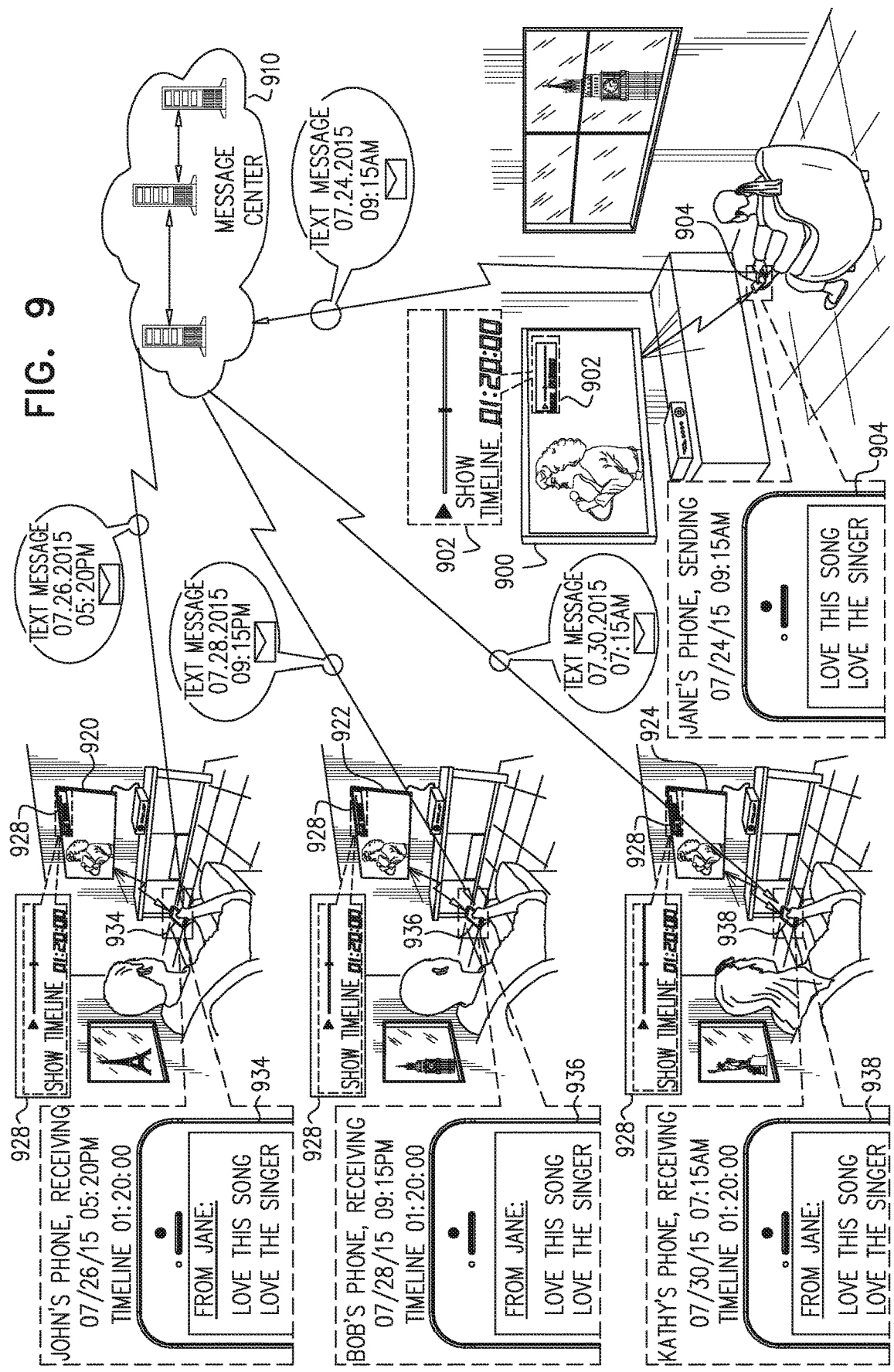
FIG. 9 is a simplified pictorial illustration of the operation of a method and system for associating messages with media during playing thereof in accordance with another embodiment of the present invention.

Reference is now made to FIG. 9, which is a simplified pictorial illustration of the operation of a method and system for associating messages with media during playing thereof in accordance with yet another embodiment of the present invention.

As seen in FIG. 9, a first user, here designated as Jane, is watching video content, such as a television show or movie, preferably having audio content, on a screen 900. The video content is not necessarily broadcast at a fixed time, but typically is served to screen 900 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 902.

Typically, while watching the video content on screen 900, Jane is holding a personal communicator 904, such as a smartphone or alternatively a tablet or other suitable device, including an audio receiver which senses the audio content. Jane, upon viewing a singer singing a song, is motivated to send a message, using her personal communicator 904, here a text message "LOVE THIS SONG, LOVE THE SINGER", commenting on the video content that she is currently watching. In the illustrated embodiment, Jane sends her text message at 9:15 AM on Jul. 24, 2015, London time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that Jane types the first letter of her text message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with Jane's message and is typically embedded therein, although it may not be visible to user recipients thereof.

Jane's message, associated with the CST timestamp, is received by one or more servers, associated with memory, here collectively designated as message center 910, and is preferably stored thereat.

As also seen in FIG. 9, second, third and fourth users, here designated respectively as John, Bob and Kathy, are watching the same video content, such as a television show or movie, preferably having audio content, on respective screens 920, 922 and 924. As noted above, the video content is not necessarily broadcast at a fixed time, but typically is served to screens 920, 922 and 924 at such time as each user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 928 on each of screens 920, 922 and 924.

It is appreciated that since the video content seen by Jane, John, Bob and Kathy is the same, they all have an identical CST. In this case, John is viewing the content on Jul. 26, 2015 and reaches the CST timestamp associated with Jane's earlier message at 5:20 PM, Paris time, on Jul. 26, 2015, Bob is viewing the content on Jul. 28, 2015 and reaches the CST timestamp associated with Jane's earlier message at 9:15 PM, London time, on Jul. 28, 2015 and Kathy is viewing the content on Jul. 30, 2015 and reaches the CST timestamp associated with Jane's earlier message at 7:15 AM, New York time, on Jul. 30, 2015

Typically, while watching the video content on screen 920, John is holding a personal communicator 934, such as a smartphone or alternatively a tablet or other suitable device, including an audio receiver which senses the audio content. When John reaches the CST timestamp 01:20:00 in the video content that he is currently watching and that Jane watched earlier, John receives, from message center 910 to his personal communicator 934, Jane's text message that was earlier sent by Jane at 9:15 AM, London time, on Jul. 24, 2015. He sees Jane's message, here a text message "LOVE THIS SONG, LOVE THE SINGER", at the point of time in the video content, which is contextually associated with Jane's message.

Typically, while watching the video content on screen 922, Bob is holding a personal communicator 936, such as a smartphone or alternatively a tablet or other suitable device, including an audio receiver which senses the audio content. When Bob reaches the CST timestamp 01:20:00 in the video content that he is currently watching and that Jane watched earlier, Bob receives, from message center 910 to his personal communicator 936, Jane's text message that was earlier sent by Jane at 9:15 AM, London time, on Jul. 24, 2015. He sees Jane's message, here a text message "LOVE THIS SONG, LOVE THE SINGER", at the point of time in the video content, which is contextually associated with Jane's message.

Typically, while watching the video content on screen 924, Kathy is holding a personal communicator 938, such as a smartphone or alternatively a tablet or other suitable device, including an audio receiver which senses the audio content. When Kathy reaches the CST timestamp 01:20:00 in the video content that she is currently watching and that Jane watched earlier, Kathy receives, from message center 910 to her personal communicator 938, Jane's text message that was earlier sent by Jane at 9:15 AM, London time, on Jul. 24, 2015. She sees Jane's message, here a text message "LOVE THIS SONG, LOVE THE SINGER", at the point of time in the video content which is contextually associated with Jane's message.

Figure 10:
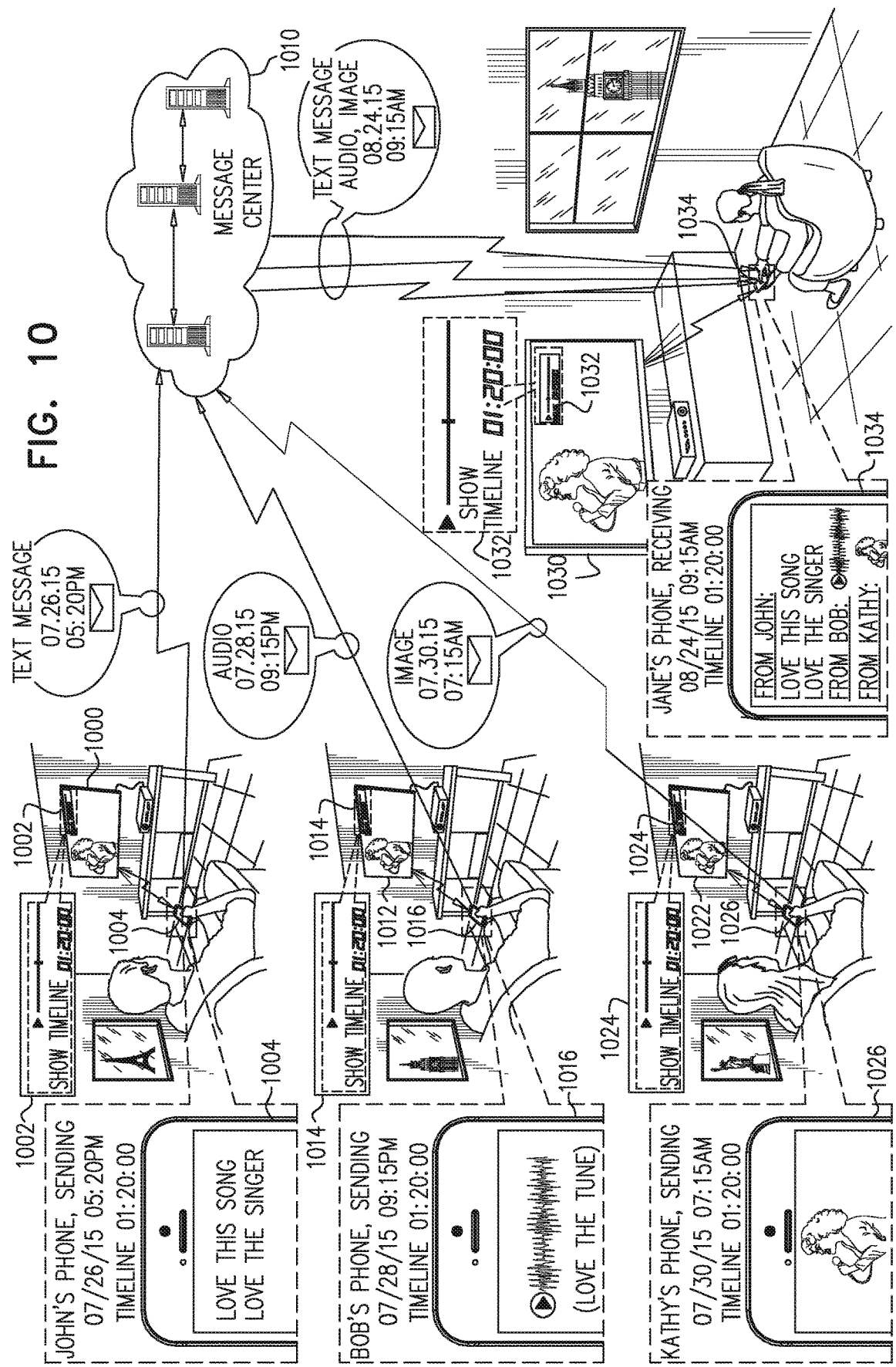
FIG. 10 is a simplified pictorial illustration of the operation of a method and system for associating messages with media during playing thereof in accordance with yet another embodiment of the present invention.

Reference is now made to FIG. 10, which is a simplified pictorial illustration of the operation of a method and system for associating messages with media during playing thereof in accordance with another embodiment of the present invention.

As seen in FIG. 10, a first user, here designated as John, is watching video content, such as a television show or movie, preferably having audio content, on a screen 1000. The video content is not necessarily broadcast at a fixed time, but typically is served to screen 1000 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1002.

Typically, while watching the video content on screen 1000, John is holding a personal communicator 1004, such as a smartphone or alternatively a tablet or other suitable device, including an audio receiver which senses the audio content. John, upon viewing a singer singing a song, is motivated to send a message, using his personal communicator 1004, here a text message "LOVE THIS SONG, LOVE THE SINGER", commenting on the video content that he is currently watching. In the illustrated embodiment, John sends his text message at 5:20 PM on Jul. 26, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John types the first letter of his text message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein, although it may not be visible to user recipients thereof.

John's message, associated with the CST timestamp, is received by one or more servers, associated with memory, here collectively designated as message center 1010, and is preferably stored thereat.

A second user, here designated as Bob, is watching video content, such as a television show or movie, preferably having audio content, on a screen 1012. The video content is not necessarily broadcast at a fixed time, but typically is served to screen 1012 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1014.

Typically, while watching the video content on screen 1012, Bob is holding a personal communicator 1016, such as a smartphone or alternatively a tablet or other suitable device, including an audio receiver which senses the audio content. Bob, upon viewing a singer singing a song, is motivated to send a message, using his personal communicator 1016, here an audio message whose transcription is "LOVE THE TUNE", commenting on the video content that he is currently watching. In the illustrated embodiment, Bob sends his audio message at 9:15 PM on Jul. 28, 2015, London time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that Bob initiates audio recording of his audio message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with Bob's message and is typically embedded therein, although it may not be visible to user recipients thereof.

Bob's message, associated with the CST timestamp, is received by message center 1010 and is preferably stored thereat.

A third user, here designated as Kathy, is watching video content, such as a television show or movie, preferably having audio content, on a screen 1022. The video content is not necessarily broadcast at a fixed time, but typically is served to screen 1022 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1024.

Typically, while watching the video content on screen 1022, Kathy is holding a personal communicator 1026, such as a smartphone or alternatively a tablet or other suitable device, including an audio receiver which senses the audio content. Kathy, upon viewing a singer singing a song, is motivated to send a message, using her personal communicator 1026, here an image message of a singer singing as a comment on the video content that she is currently watching. In the illustrated embodiment, Kathy sends her image message at 7:15 AM on Jul. 30, 2015, New York time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that Kathy initiates a search for an image to appear in her image message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with Kathy's message and is typically embedded therein, although it may not be visible to user recipients thereof.

Kathy's message, associated with the CST timestamp, is received by message center 1010 and is preferably stored thereat.

As also seen in FIG. 10, a fourth user, here designated as Jane, is watching the same video content, such as a television show or movie, preferably having audio content, on a screen 1030. As noted above, the video content is not necessarily broadcast at a fixed time, but typically is served to screen 1030 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1032.

It is appreciated that since the video content seen by John, Bob, Kathy and Jane is the same, they all have an identical CST. In this case, Jane is viewing the content on Aug. 24, 2015 and reaches the CST timestamp associated with John's, Bob's and Kathy's earlier messages at 9:15 AM, London time, on Aug. 24, 2015.

Typically, while watching the video content on screen 1030, Jane is holding a personal communicator 1034, such as a smartphone or alternatively a tablet or other suitable device, including an audio receiver which senses the audio content. When Jane reaches the CST timestamp 01:20:00 in the video content that she is currently watching and that John, Bob and Kathy watched earlier, Jane receives, from message center 1010 to her personal communicator 1034, John's text message that was earlier sent by John at 11:45 PM on Jun. 23, 2015, Paris time, Bob's audio message that was earlier sent by Bob at 9:15 PM on Jul. 28, 2015 and Kathy's image message that was earlier sent by Kathy at 7:15 AM on Jul. 30, 2015. She receives all of these messages at the point of time in the video content which is contextually associated therewith.

Figure 11:
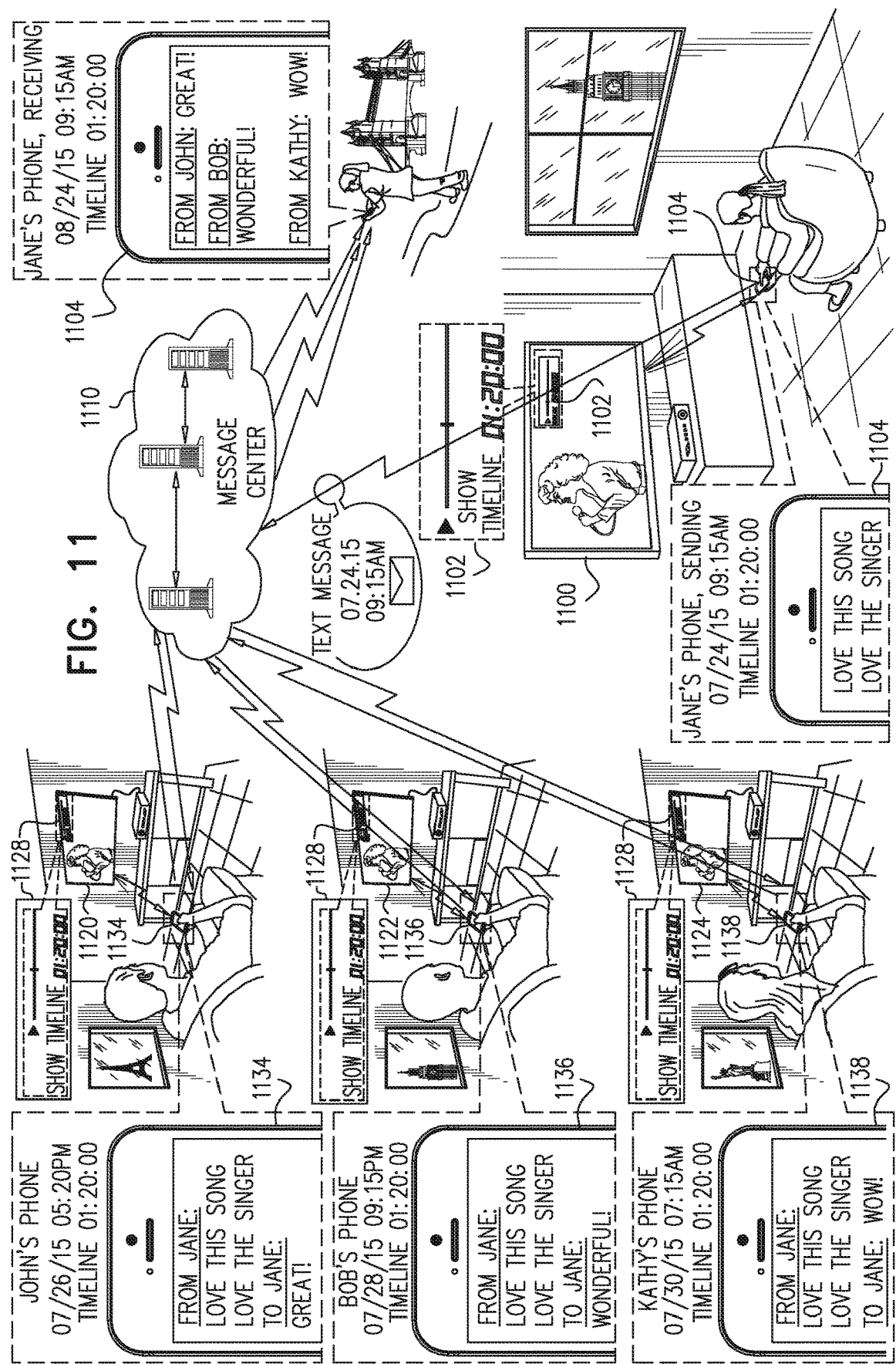
FIG. 11 is a simplified pictorial illustration of the operation of a method and system for associating messages with media during playing thereof in accordance with still another embodiment of the present invention.

Reference is now made to FIG. 11, which is a simplified pictorial illustration of the operation of a method and system for associating messages with media during playing thereof in accordance with yet another embodiment of the present invention.

As seen in FIG. 11, a first user, here designated as Jane, is watching video content, such as a television show or movie, preferably having audio content, on a screen 1100. The video content is not necessarily broadcast at a fixed time, but typically is served to screen 1100 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1102.

Typically, while watching the video content on screen 1100, Jane is holding a personal communicator 1104, such as a smartphone or alternatively a tablet or other suitable device, including an audio receiver which senses the audio content. Jane, upon viewing a singer singing a song, is motivated to send a message, using her personal communicator 1104, here a text message "LOVE THIS SONG, LOVE THE SINGER", commenting on the video content that she is currently watching. In the illustrated embodiment, Jane sends her text message at 9:15 AM on Jul. 24, 2015, London time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that Jane types the first letter of her text message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with Jane's message and is typically embedded therein, although it may not be visible to user recipients thereof.

Jane's message, associated with the CST timestamp, is received by one or more servers, associated with memory, here collectively designated as message center 1110, and is preferably stored thereat.

As also seen in FIG. 11, second, third and fourth users, here designated respectively as John, Bob and Kathy, are watching the same video content, such as a television show or movie, preferably having audio content, on respective screens 1120, 1122 and 1124. As noted above, the video content is not necessarily broadcast at a fixed time, but typically is served to screens 1120, 1122 and 1124 at such time as each user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1128 on each of screens 1120, 1122 and 1124.

It is appreciated that since the video content seen by Jane, John, Bob and Kathy is the same, they all have an identical CST. In this case, John is viewing the content on Jul. 26, 2015 and reaches the CST timestamp associated with Jane's earlier message at 5:20 PM, Paris time, on Jul. 26, 2015, Bob is viewing the content on Jul. 28, 2015 and reaches the CST timestamp associated with Jane's earlier message at 9:15 PM, London time, on Jul. 28, 2015 and Kathy is viewing the content on Jul. 30, 2015 and reaches the CST timestamp associated with Jane's earlier message at 7:15 AM, New York time, on Jul. 30, 2015.

Typically, while watching the video content on screen 1120, John is holding a personal communicator 1134, such as a smartphone or alternatively a tablet or other suitable device, including an audio receiver which senses the audio content. When John reaches the CST timestamp 01:20:00 in the video content that he is currently watching and that Jane watched earlier, John receives, from message center 1110 to his personal communicator 1134, Jane's text message that was earlier sent by Jane at 9:15 AM, London time, on Jul. 24, 2015. He sees Jane's message, here a text message "LOVE THIS SONG, LOVE THE SINGER", at the point of time in the video content which is contextually associated with Jane's message.

Typically, while watching the video content on screen 1122, Bob is holding a personal communicator 1136, such as a smartphone or alternatively a tablet or other suitable device, including an audio receiver which senses the audio content. When Bob reaches the CST timestamp 01:20:00 in the video content that he is currently watching and that Jane watched earlier, Bob receives, from message center 1110 to his personal communicator 1136, Jane's text message that was earlier sent by Jane at 9:15 AM, London time, on Jul. 24, 2015. He sees Jane's message, here a text message "LOVE THIS SONG, LOVE THE SINGER", at the point of time in the video content which is contextually associated with Jane's message.

Typically, while watching the video content on screen 1124, Kathy is holding a personal communicator 1138, such as a smartphone or alternatively a tablet or other suitable device, including an audio receiver which senses the audio content. When Kathy reaches the CST timestamp 01:20:00 in the video content that she is currently watching and that Jane watched earlier, Kathy receives, from message center 1110 to her personal communicator 1138, Jane's text message that was earlier sent by Jane at 9:15 AM, London time, on Jul. 24, 2015. She sees Jane's message, here a text message "LOVE THIS SONG, LOVE THE SINGER", at the point of time in the video content which is contextually associated with Jane's message.

Upon receiving Jane's text message, John, Bob and Kathy choose to reply, in this example in text messages. John, Bob and Kathy can each reply upon receipt of Jane's text message or at any later time. The replies are received by the message center 1110. Message center 1110 makes the replies available to Jane and preferably also to John, Bob and Kathy immediately and makes the replies available for download in the future. Additionally, or, alternatively, the replies may be sent directly to each user's phone by conventional messaging applications.

Figure 12:
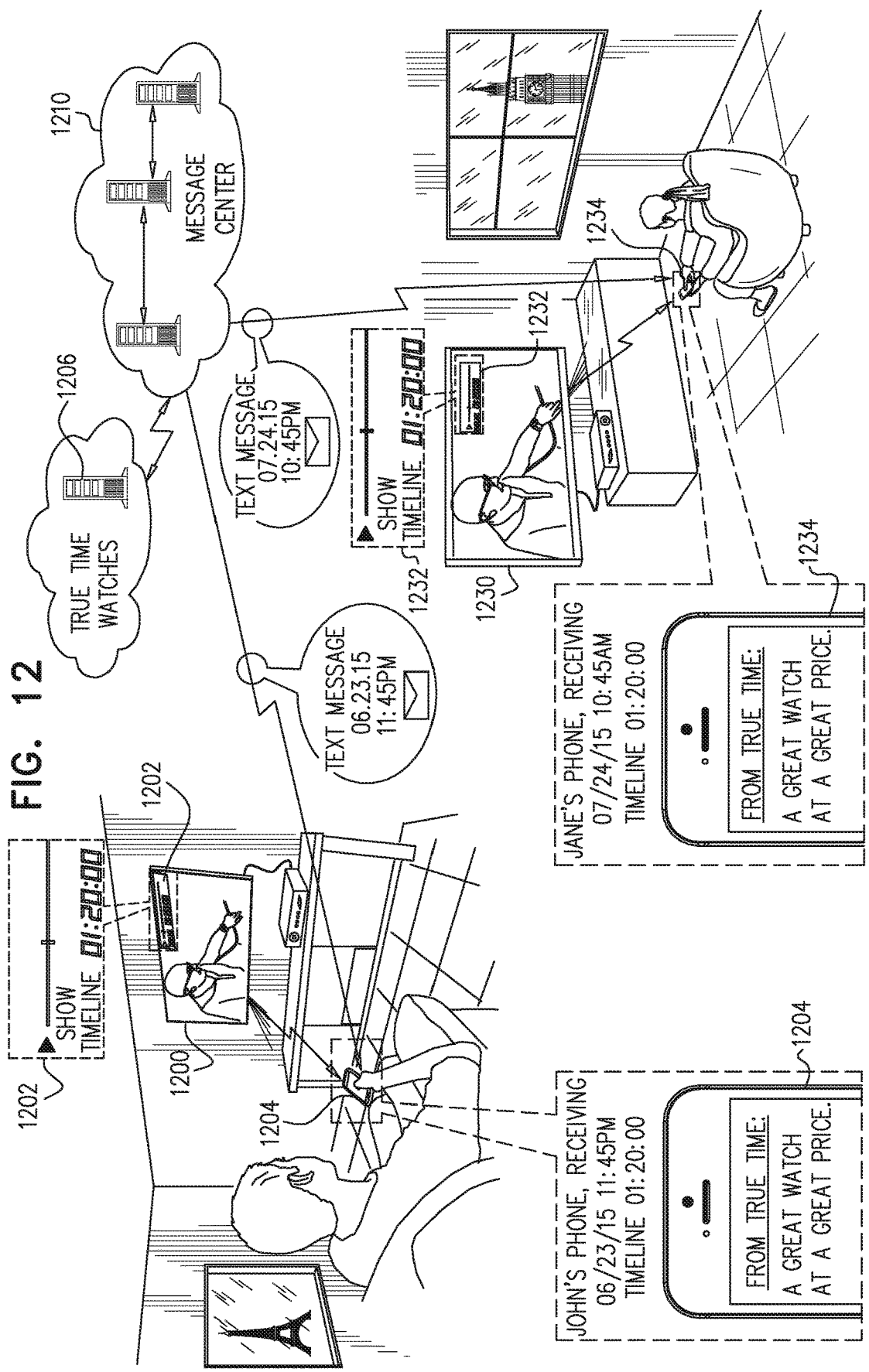
FIG. 12 is a simplified pictorial illustration of the operation of a method and system for associating messages with media during playing thereof in accordance with a further embodiment of the present invention.

Reference is now made to FIG. 12, which is a simplified pictorial illustration of the operation of a method and system for associating messages with media during playing thereof in accordance with yet another embodiment of the present invention.

As seen in FIG. 12, a first user, here designated as John, is watching video content, such as a television show or movie, preferably having audio content, on a screen 1200. The video content is not necessarily broadcast at a fixed time, but typically is served to screen 1200 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1202.

Typically, while watching the video content on screen 1200, John is holding a personal communicator 1204, such as a smartphone or alternatively a tablet or other suitable device, including an audio receiver which senses the audio content.

In accordance with a preferred embodiment of the present invention, a server 1206 of a commercial entity, here a watch company, provides, to a message center 1210, a CST keyed feed indicating one or more CST timestamps at which a certain product, here an unbranded watch, appears in the video content. Server 1206 also provides an advertising message to be sent by the message center 1210 to personal communicators of users watching the video content when they are at the specific CST timestamps and independently of the absolute time at which they are watching the content.

As seen in FIG. 12, when John reaches a CST timestamp, such as 01:20:00 at which a frame of the video content is showing a watch, he receives, from the message center 1210 to his personal communicator 1204, an advertising message, here "FROM TRUE TIME—A GREAT WATCH AT A GREAT PRICE".

As also seen in FIG. 12, a second user, here designated as Jane, is watching the same video content, such as a television show or movie, preferably having audio content, on a screen 1230. As noted above, the video content is not necessarily broadcast at a fixed time, but typically is served to screen 1230 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1232.

It is appreciated that since the video content seen by both John and Jane is the same, they both have an identical CST.

Typically, while watching the video content on screen 1230, Jane is holding a personal communicator 1234, such as a smartphone or alternatively a tablet or other suitable device, including an audio receiver which senses the audio content. When Jane reaches the CST timestamp 01:20:00 in the video content that she is currently watching, Jane receives, from message center 1210 to her personal communicator 1234, the same advertising message that was earlier sent to John. She also sees the advertising message at the point of time in the video content which is contextually associated with the advertising message.

Figure 13:
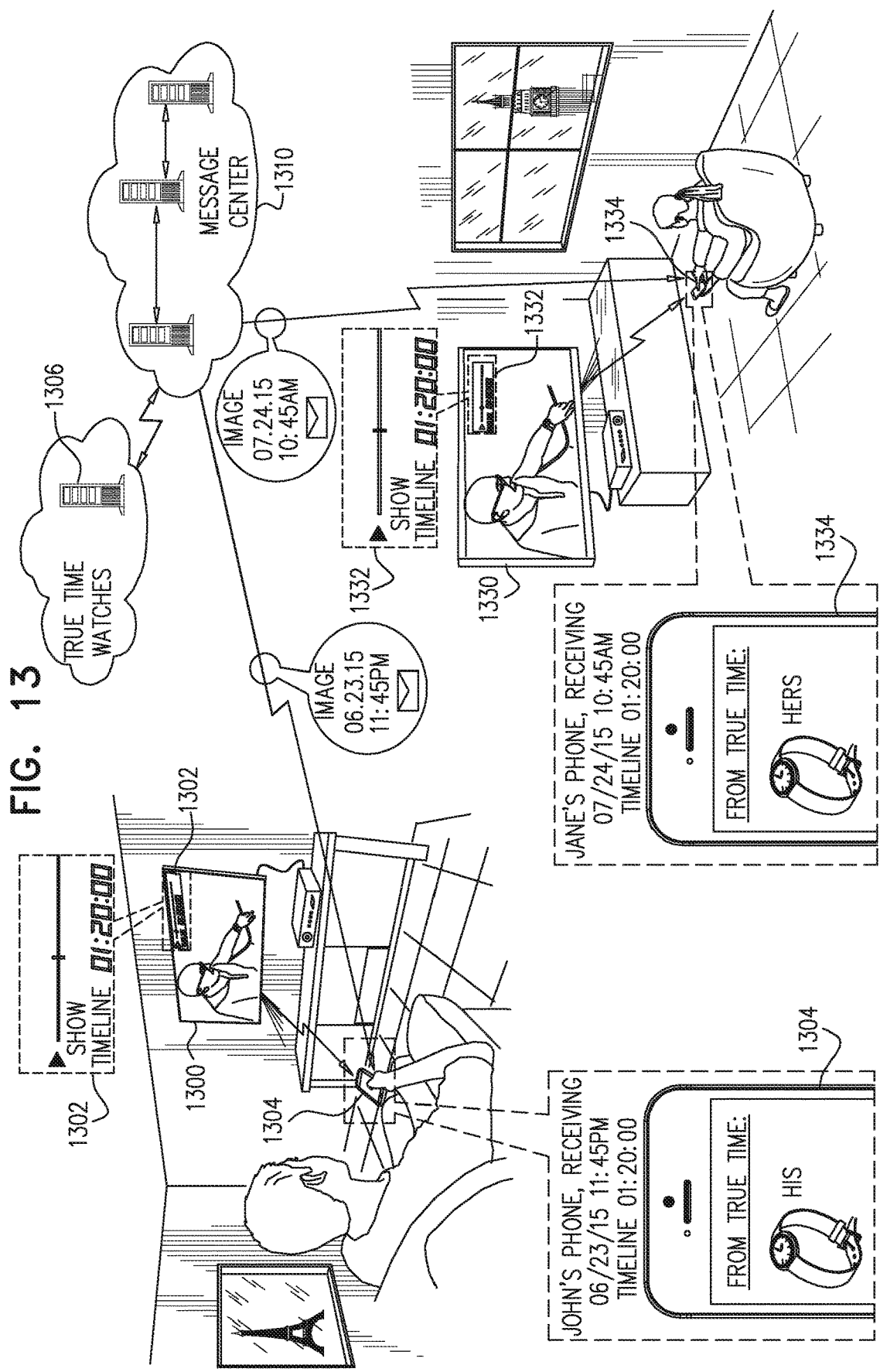
FIG. 13 is a simplified pictorial illustration of the operation of a method and system for associating messages with media during playing thereof in accordance with yet a further embodiment of the present invention.

Reference is now made to FIG. 13, which is a simplified pictorial illustration of the operation of a method and system for associating messages with media during playing thereof in accordance with yet another embodiment of the present invention.

As seen in FIG. 13, a first user, here designated as John, is watching video content, such as a television show or movie, preferably having audio content, on a screen 1300. The video content is not necessarily broadcast at a fixed time, but typically is served to screen 1300 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1302.

Typically, while watching the video content on screen 1300, John is holding a personal communicator 1304, such as a smartphone or alternatively a tablet or other suitable device, including an audio receiver which senses the audio content.

In accordance with a preferred embodiment of the present invention, a server 1306 of a commercial entity, here a watch company, provides, to a message center 1310, a CST keyed feed indicating one or more CST timestamps at which a certain product, here an unbranded watch, appears in the video content. Server 1306 also provides an advertising message to be sent by the message center 1310 to personal communicators of users watching the video content when they are at the specific CST timestamps and independently of the absolute time at which they are watching the content.

As seen in FIG. 13, when John reaches a CST timestamp, such as 01:20:00 at which a frame of the video content is showing a watch, he receives, from the message center 1310 to his personal communicator 1304, an at least partially personalized advertising image message, here an image of a branded man's watch.

As also seen in FIG. 13, a second user, here designated as Jane, is watching the same video content, such as a television show or movie, preferably having audio content, on a screen 1330. As noted above, the video content is not necessarily broadcast at a fixed time, but typically is served to screen 1330 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1332.

It is appreciated that since the video content seen by both John and Jane is the same, they both have an identical CST.

Typically, while watching the video content on screen 1330, Jane is holding a personal communicator 1334, such as a smartphone or alternatively a tablet or other suitable device, including an audio receiver which senses the audio content. When Jane reaches the CST timestamp 01:20:00 in the video content that she is currently watching, Jane receives, from message center 1310 to her personal communicator 1334, an at least partially personalized advertising image message, here an image of a woman's watch. She also sees the advertising message at the point of time in the video content which is contextually associated with the advertising message.

Figure 14:
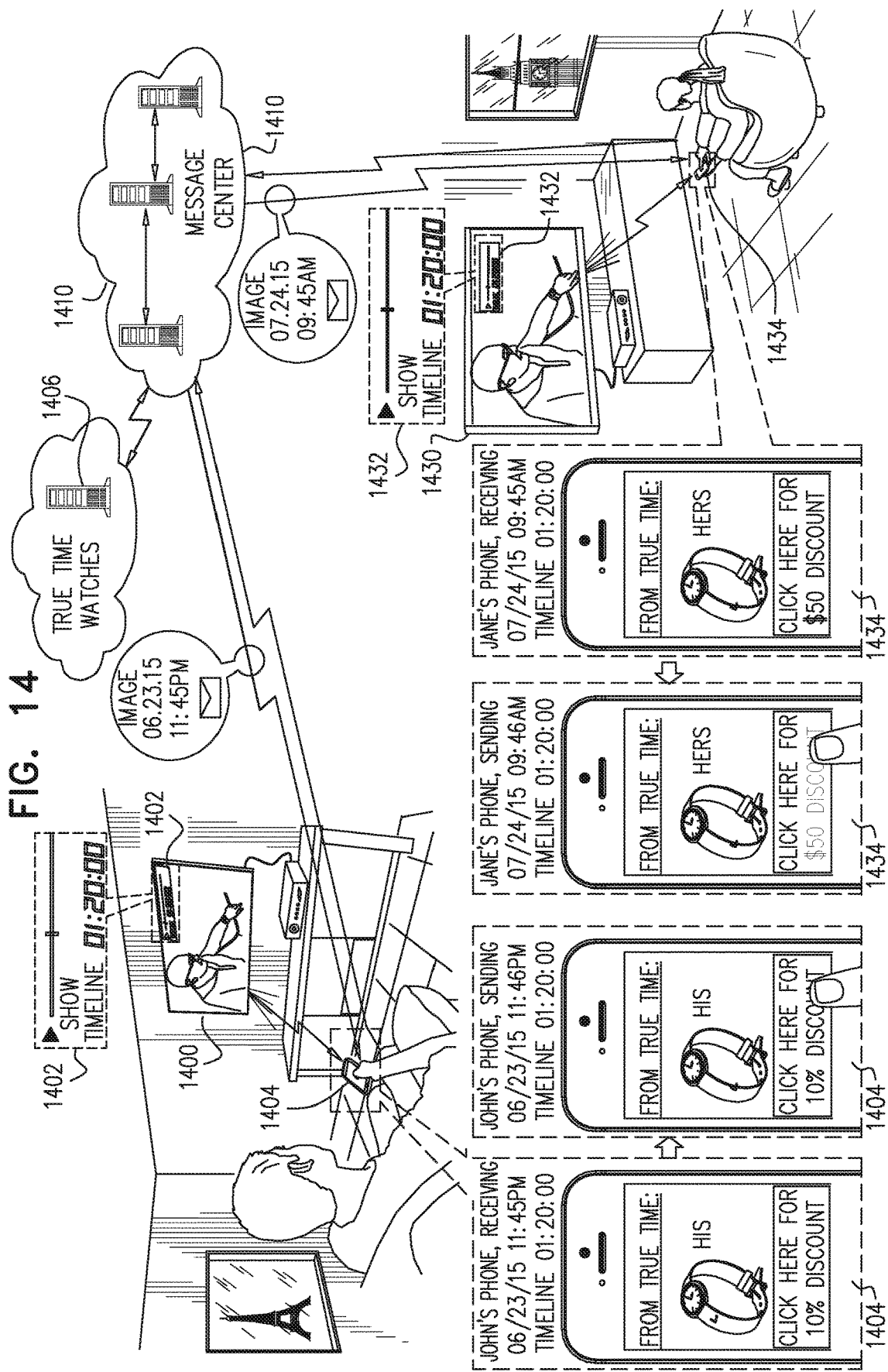
FIG. 14 is a simplified pictorial illustration of the operation of a method and system for associating messages with media during playing thereof in accordance with still a further embodiment of the present invention.

Reference is now made to FIG. 14, which is a simplified pictorial illustration of the operation of a method and system for associating messages with media during playing thereof in accordance with yet another embodiment of the present invention.

As seen in FIG. 14, a first user, here designated as John, is watching video content, such as a television show or movie, preferably having audio content, on a screen 1400. The video content is not necessarily broadcast at a fixed time, but typically is served to screen 1400 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1402.

Typically, while watching the video content on screen 1400, John is holding a personal communicator 1404, such as a smartphone or alternatively a tablet or other suitable device, including an audio receiver which senses the audio content.

In accordance with a preferred embodiment of the present invention, a server 1406 of a commercial entity, here a watch company, provides, to a message center 1410, a CST keyed feed indicating one or more CST timestamps at which a certain product, here an unbranded watch, appears in the video content. Server 1406 also provides an advertising message to be sent by the message center 1410 to personal communicators of users watching the video content when they are at the specific CST timestamps and independently of the absolute time at which they are watching the content.

As seen in FIG. 14, when John reaches a CST timestamp, such as 01:20:00 at which a frame of the video content is showing a watch, he receives, from the message center 1410 to his personal communicator 1404, an at least partially personalized interactive text and image advertising message including an at least partially personalized offer relating to a man's watch.

As also seen in FIG. 14, a second user, here designated as Jane, is watching the same video content, such as a television show or movie, preferably having audio content on a screen 1430. As noted above, the video content is not necessarily broadcast at a fixed time, but typically is served to screen 1430 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1432.

It is appreciated that since the video content seen by both John and Jane is the same, they both have an identical CST.

Typically, while watching the video content on screen 1430, Jane is holding a personal communicator 1434, such as a smartphone or alternatively a tablet or other suitable device, including an audio receiver which senses the audio content. When Jane reaches the CST timestamp 01:20:00 in the video content that she is currently watching, Jane receives, from message center 1410 to her personal communicator 1434, an at least partially personalized interactive text and image advertising message including an at least partially personalized offer relating to a woman's watch. It is noted that the offers to John and Jane may be different resulting from various commercial considerations, such as considerations based on gender and/or socioeconomic profiles. Jane also sees the advertising message at the point of time in the video content which is contextually associated with the advertising message.

Optionally, as seen in FIG. 14, Jane and John may elect to reply to the respective offers, via the message center 1410.

Figure 15:
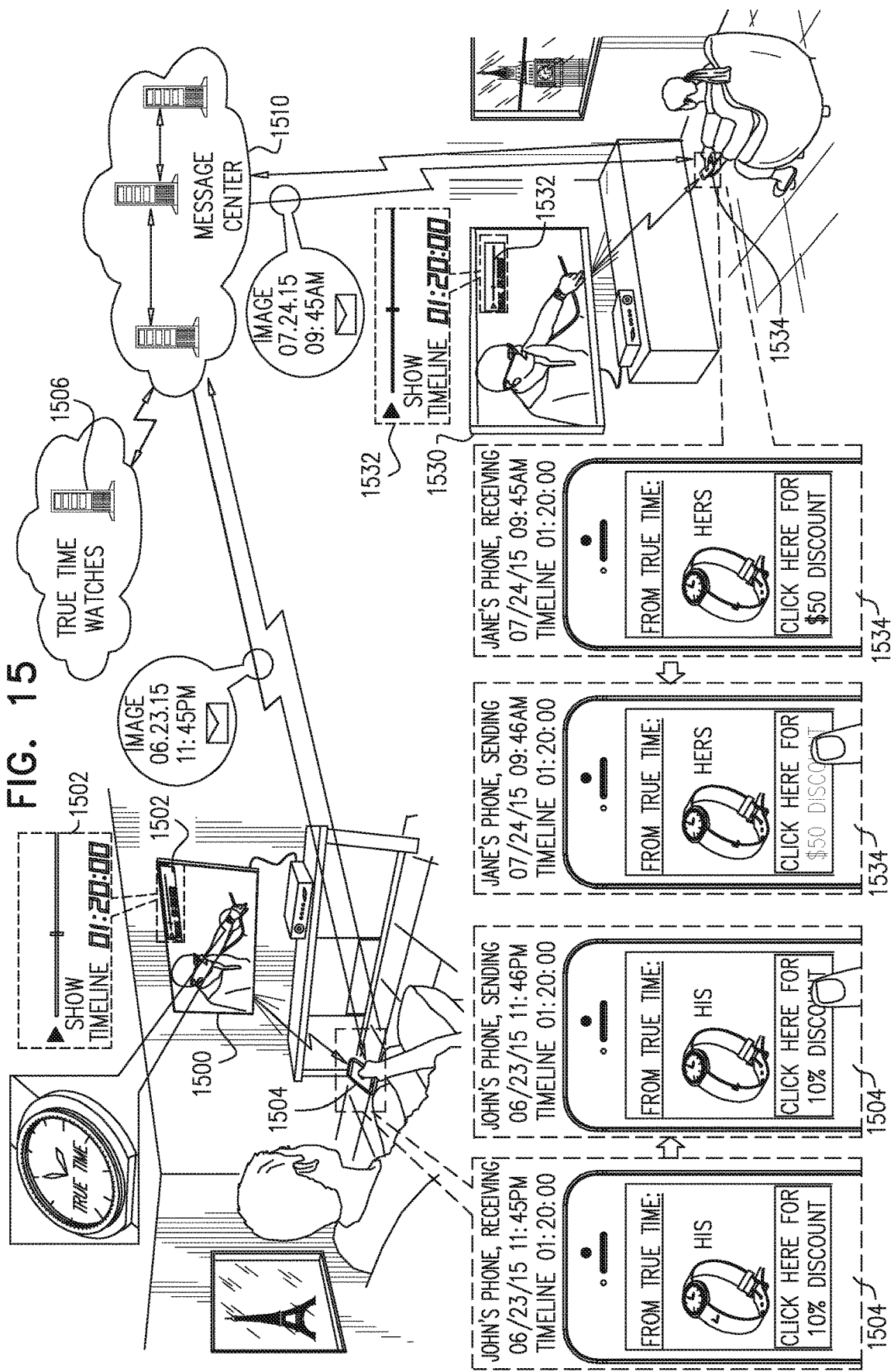
FIG. 15 is a simplified pictorial illustration of the operation of a method and system for associating messages with media during playing thereof in accordance with another embodiment of the present invention.

Reference is now made to FIG. 15, which is a simplified pictorial illustration of the operation of a method and system for associating messages with media during playing thereof in accordance with yet another embodiment of the present invention.

As seen in FIG. 15, a first user, here designated as John, is watching video content, such as a television show or movie, preferably having audio content, on a screen 1500. The video content is not necessarily broadcast at a fixed time, but typically is served to screen 1500 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1502.

Typically, while watching the video content on screen 1500, John is holding a personal communicator 1504, such as a smartphone or alternatively a tablet or other suitable device, including an audio receiver which senses the audio content.

In accordance with a preferred embodiment of the present invention, a server 1506 of a commercial entity, here a watch company, provides, to a message center 1510, a CST keyed feed indicating one or more CST timestamps at which a certain product, here a branded watch, appears in the video content, typically as a product placement. Server 1506 also provides an advertising message to be sent by the message center 1510 to personal communicators of users watching the video content when they are at the specific CST timestamps and independently of the absolute time at which they are watching the content.

As seen in FIG. 15, when John reaches a CST timestamp, such as 01:20:00 at which a frame of the video content is showing the branded watch, he receives, from the message center 1510 to his personal communicator 1504, an at least partially personalized interactive text and image advertising message including an at least partially personalized offer relating to a man's watch.

As also seen in FIG. 15, a second user, here designated as Jane, is watching the same video content, such as a television show or movie, preferably having audio content, on a screen 1530. As noted above, the video content is not necessarily broadcast at a fixed time, but typically is served to screen 1530 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1532.

It is appreciated that since the video content seen by both John and Jane is the same, they both have an identical CST.

Typically, while watching the video content on screen 1530, Jane is holding a personal communicator 1534, such as a smartphone or alternatively a tablet or other suitable device, including an audio receiver which senses the audio content. When Jane reaches the CST timestamp 01:20:00 in the video content that she is currently watching, Jane receives, from message center 1510 to her personal communicator 1534, an at least partially personalized interactive text and image advertising message including an at least partially personalized offer relating to a woman's watch. It is noted that the offers to John and Jane may be different resulting from various commercial considerations, such as considerations based on gender and/or socioeconomic profiles. Jane also sees the advertising message at the point of time in the video content which is contextually associated with the advertising message.

Optionally, Jane and John may elect to reply to the respective offers, via the message center 1510.

Figure 16:
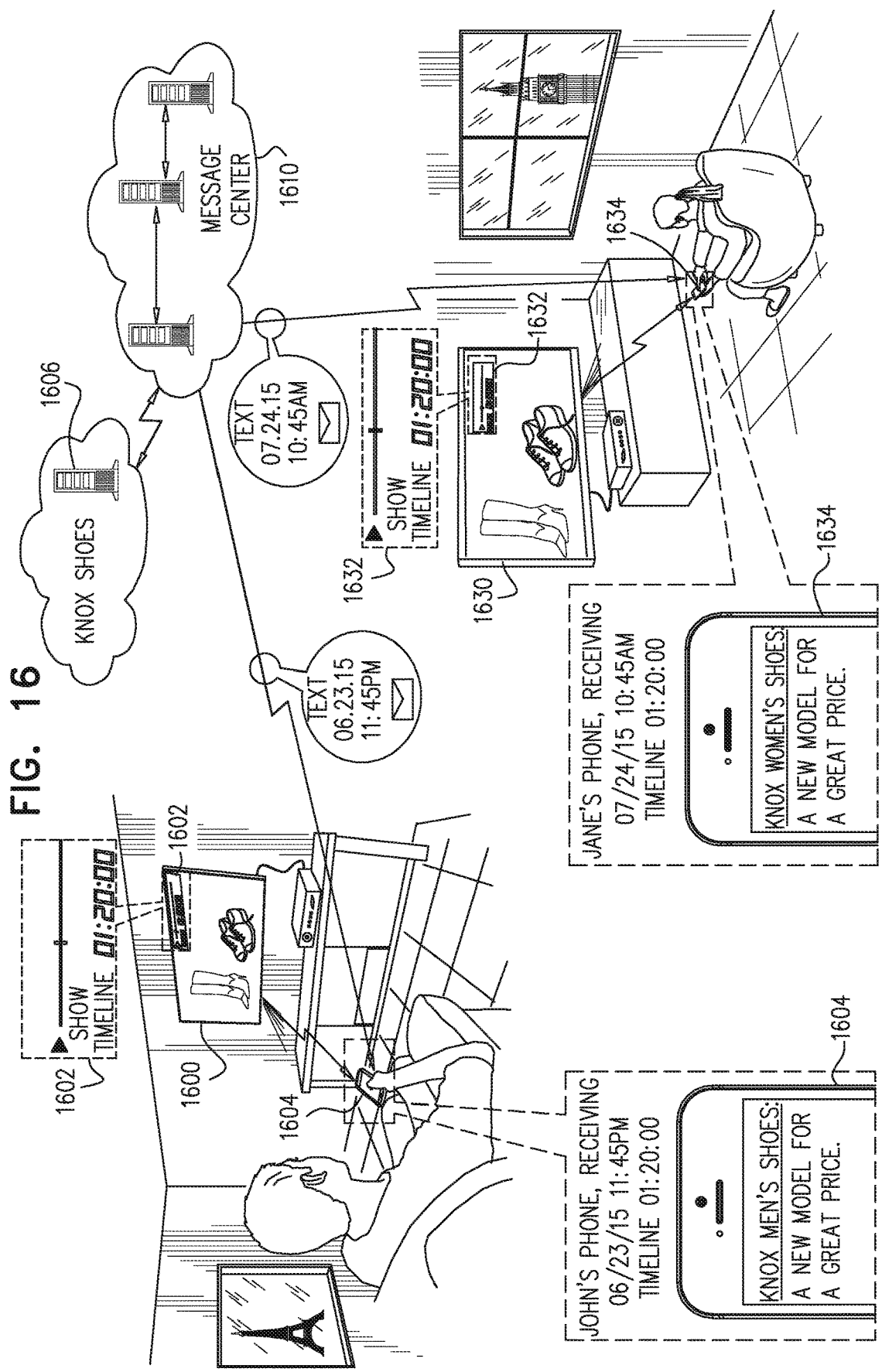
FIG. 16 is a simplified pictorial illustration of the operation of a method and system for associating messages with media during playing thereof in accordance with yet another embodiment of the present invention.

Reference is now made to FIG. 16, which is a simplified pictorial illustration of the operation of a method and system for associating messages with media during playing thereof in accordance with yet another embodiment of the present invention.

As seen in FIG. 16, a first user, here designated as John, is watching video content, in this case including a commercial message and preferably having audio content, on a screen 1600. The video content is not necessarily broadcast at a fixed time, but typically is served to screen 1600 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1602.

Typically, while watching the video content on screen 1600, John is holding a personal communicator 1604, such as a smartphone or alternatively a tablet or other suitable device, including an audio receiver which senses the audio content.

In accordance with a preferred embodiment of the present invention, a server 1606 of a commercial entity, here a shoe company, provides, to a message center 1610, a CST keyed feed indicating one or more CST timestamps at which a certain commercial message, here for shoes, appears in the video content. Server 1606 also provides an at least partially personalized supplementary advertising message to be sent by the message center 1610 to personal communicators of users watching the video content when they are at the specific CST timestamps and independently of the absolute time at which they are watching the content.

As seen in FIG. 16, when John reaches a CST timestamp, such as 01:20:00 at which a frame of the video content is showing a shoe commercial, he receives, from the message center 1610 to his personal communicator 1604, an at least partially personalized supplemental advertising message, here a text message related to men's shoes.

As also seen in FIG. 16, a second user, here designated as Jane, is watching the same video content, such as a television show or movie, preferably having audio content, on a screen 1630. As noted above, the video content is not necessarily broadcast at a fixed time, but typically is served to screen 1630 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1632.

It is appreciated that since the video content seen by both John and Jane is the same, they both have an identical CST.

Typically, while watching the video content on screen 1630, Jane is holding a personal communicator 1634, such as a smartphone or alternatively a tablet or other suitable device, including an audio receiver which senses the audio content. When Jane reaches the CST timestamp 01:20:00 in the video content that she is currently watching, Jane receives from message center 1610 to her personal communicator 1634 an at least partially personalized supplemental advertising message, here a text message related to women's shoes. She also sees the advertising message at the point of time in the video content which is contextually associated with the advertising message.

Figure 17:
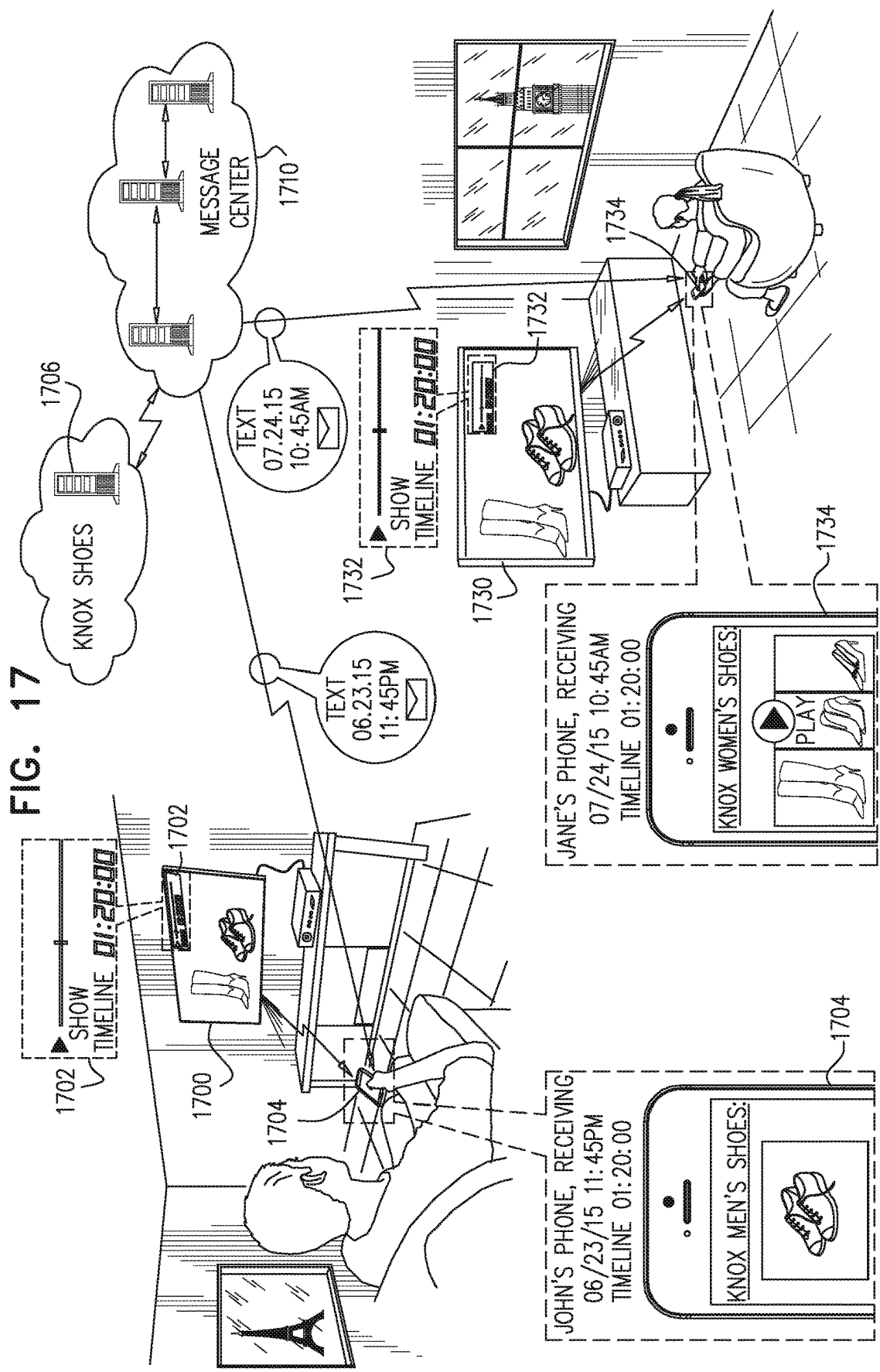
FIG. 17 is a simplified pictorial illustration of the operation of a method and system for associating messages with media during playing thereof in accordance with still another embodiment of the present invention.

Reference is now made to FIG. 17, which is a simplified pictorial illustration of the operation of a method and system for associating messages with media during playing thereof in accordance with yet another embodiment of the present invention.

As seen in FIG. 17, a first user, here designated as John, is watching video content, in this case including a commercial message and preferably having audio content, on a screen 1700. The video content is not necessarily broadcast at a fixed time, but typically is served to screen 1700 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1702.

Typically, while watching the video content on screen 1700, John is holding a personal communicator 1704, such as a smartphone or alternatively a tablet or other suitable device, including an audio receiver which senses the audio content.

In accordance with a preferred embodiment of the present invention, a server 1706 of a commercial entity, here a shoe company, provides, to a message center 1710, a CST keyed feed indicating one or more CST timestamps at which a certain commercial message, here for shoes, appears in the video content. Server 1706 also provides an at least partially personalized supplementary advertising message to be sent by the message center 1710 to personal communicators of users watching the video content when they are at the specific CST timestamps and independently of the absolute time at which they are watching the content.

As seen in FIG. 17, when John reaches a CST timestamp, such as 01:20:00, at which a frame of the video content is showing a shoe commercial, he receives, from the message center 1710 to his personal communicator 1704, an at least partially personalized supplemental advertising message, here a text and image message related to men's shoes.

As also seen in FIG. 17, a second user, here designated as Jane, is watching the same video content, such as a television show or movie, preferably having audio content, on a screen 1730. As noted above, the video content is not necessarily broadcast at a fixed time, but typically is served to screen 1730 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1732.

It is appreciated that since the video content seen by both John and Jane is the same, they both have an identical CST.

Typically, while watching the video content on screen 1730, Jane is holding a personal communicator 1734, such as a smartphone or alternatively a tablet or other suitable device, including an audio receiver which senses the audio content. When Jane reaches the CST timestamp 01:20:00 in the video content that she is currently watching, Jane receives, from message center 1710 to her personal communicator 1734, an at least partially personalized supplemental advertising message, here a text and video message related to women's shoes. She also sees the advertising message at the point of time in the video content which is contextually associated with the advertising message.

Figure 18:
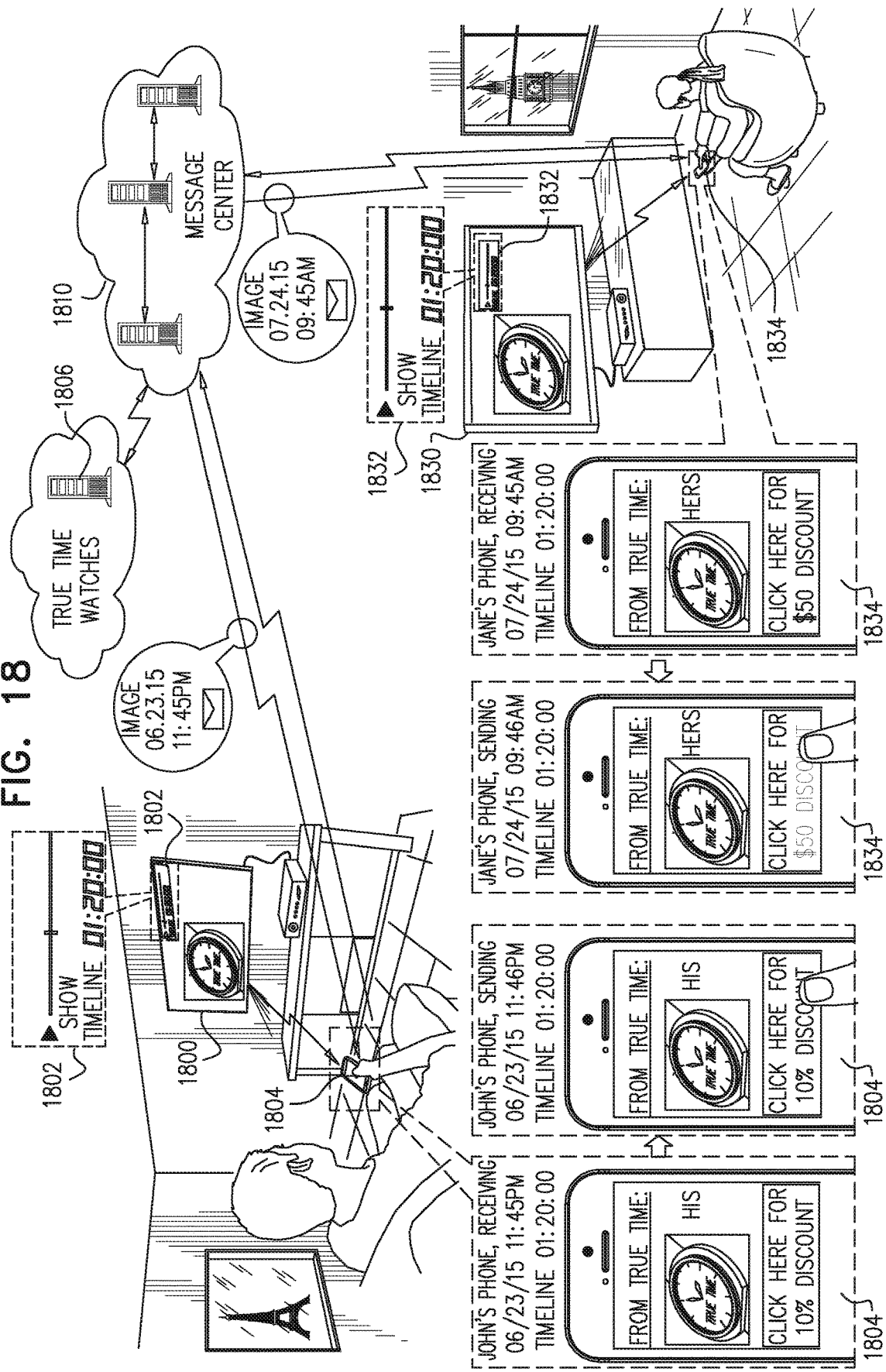
FIG. 18 is a simplified pictorial illustration of the operation of a method and system for associating messages with media during playing thereof in accordance with a further embodiment of the present invention.

Reference is now made to FIG. 18, which is a simplified pictorial illustration of the operation of a method and system for associating messages with media during playing thereof in accordance with yet another embodiment of the present invention.

As seen in FIG. 18, a first user, here designated as John, is watching video content, such as a television show or movie, preferably having audio content, on a screen 1800. The video content is not necessarily broadcast at a fixed time, but typically is served to screen 1800 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1802.

Typically, while watching the video content on screen 1800, John is holding a personal communicator 1804, such as a smartphone or alternatively a tablet or other suitable device, including an audio receiver which senses the audio content.

In accordance with a preferred embodiment of the present invention, server 1806 of a commercial entity, here a watch company, provides, to a message center 1810, a CST keyed feed indicating one or more CST timestamps at which a commercial for a certain product, here a watch, appears in the video content. Server 1806 also provides a supplemental interactive advertising message to be sent by the message center 1810 to personal communicators of users watching the video content when they are at the specific CST timestamps and independently of the absolute time at which they are watching the content.

As seen in FIG. 18, when John reaches a CST timestamp, such as 01:20:00, at which a frame of the video content is showing a watch commercial, he receives, from the message center 1810 to his personal communicator 1804, an at least partially personalized interactive text and image advertising message including an at least partially personalized offer relating to a man's watch.

As also seen in FIG. 18, a second user, here designated as Jane, is watching the same video content, such as a television show or movie, preferably having audio content on a screen 1830. As noted above, the video content is not necessarily broadcast at a fixed time, but typically is served to screen 1830 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1832.

It is appreciated that since the video content seen by both John and Jane is the same, they both have an identical CST.

Typically, while watching the video content on screen 1830, Jane is holding a personal communicator 1834, such as a smartphone or alternatively a tablet or other suitable device, including an audio receiver which senses the audio content. When Jane reaches the CST timestamp 01:20:00 in the video content that she is currently watching, Jane receives, from message center 1810 to her personal communicator 1834, an at least partially personalized interactive text and image advertising message including an at least partially personalized offer relating to a woman's watch. It is noted that the offers to John and Jane may be different resulting from various commercial considerations, such as considerations based on gender and/or socioeconomic profiles. Jane also sees the advertising message at the point of time in the video content which is contextually associated with the advertising message.

Optionally, Jane and John may elect to reply to the respective offers, via the message center 1810.

Figure 19:
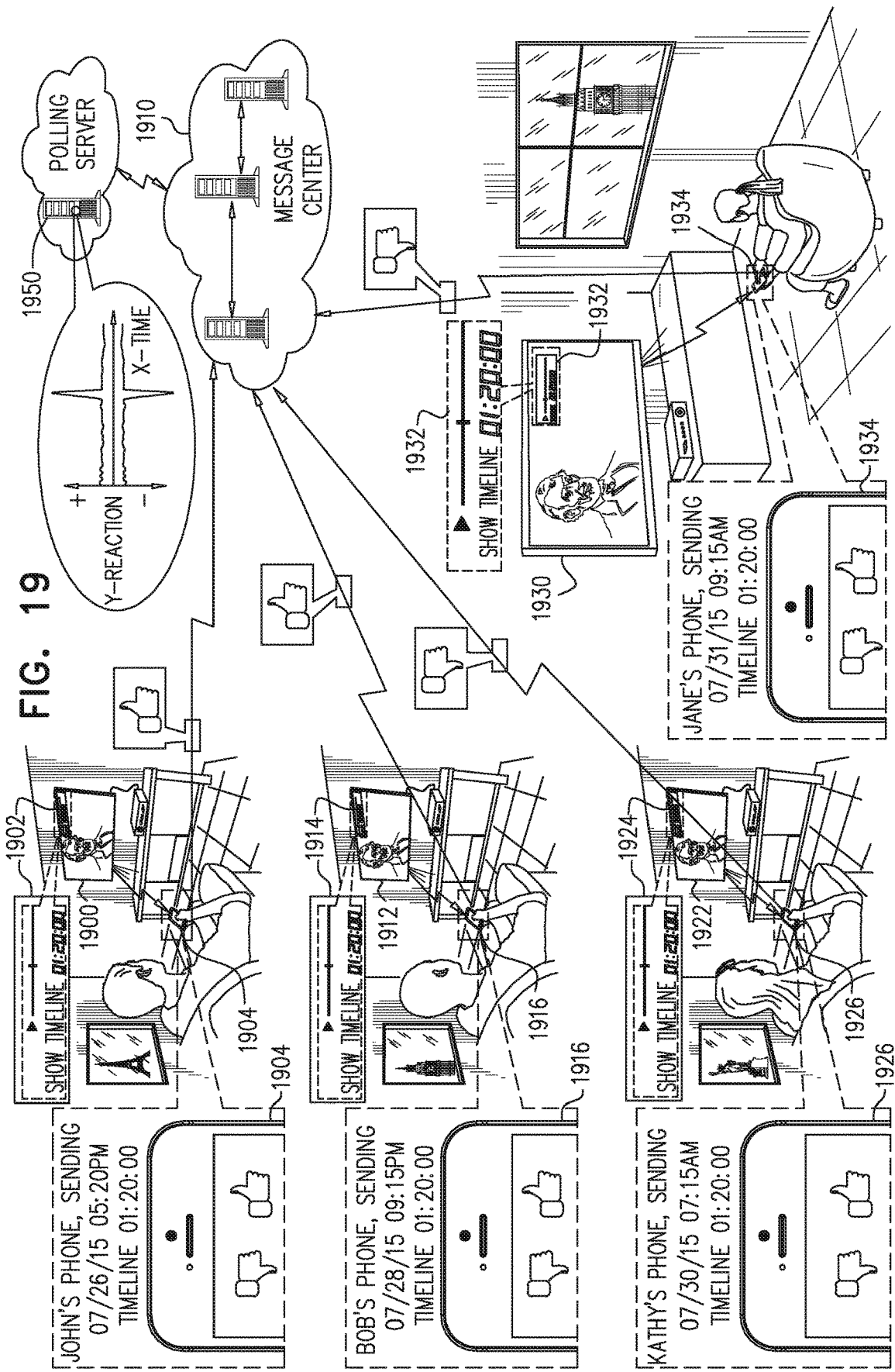
FIG. 19 is a simplified pictorial illustration of the operation of a method and system for associating messages with media during playing thereof in accordance with yet a further embodiment of the present invention.

Reference is now made to FIG. 19, which is a simplified pictorial illustration of the operation of a method and system for associating messages with media during playing thereof in accordance with a still further embodiment of the present invention.

As seen in FIG. 19, a first user, here designated as John, is watching video content, such as a television show or movie, preferably having audio content, on a screen 1900. The video content is not necessarily broadcast at a fixed time, but typically is served to screen 1900 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1902.

Typically, while watching the video content on screen 1900, John is holding a personal communicator 1904, such as a smartphone or alternatively a tablet or other suitable device, including an audio receiver which senses the audio content. John, upon viewing a portion of the video content at CST timestamp 01:20:00 is motivated to send a message, using his personal communicator 1904, here a thumbs up message commenting on the video content that he is currently watching. In the illustrated embodiment, John sends his message at 5:20 PM on Jul. 26, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that John initiates his message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with John's message and is typically embedded therein.

John's message, associated with the CST timestamp, is received by one or more servers, associated with memory, here collectively designated as message center 1910, and is preferably stored thereat.

A second user, here designated as Bob, is watching video content, such as a television show or movie, preferably having audio content, on a screen 1912. The video content is not necessarily broadcast at a fixed time, but typically is served to screen 1912 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1914.

Typically, while watching the video content on screen 1912, Bob is holding a personal communicator 1916, such as a smartphone or alternatively a tablet or other suitable device, including an audio receiver which senses the audio content. Bob, upon viewing a portion of the video content at CST timestamp 01:20:00 is motivated to send a message, using his personal communicator 1916, here a thumbs up message commenting on the video content that he is currently watching. In the illustrated embodiment, Bob sends his message at 9:15 PM on Jul. 28, 2015, London time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that Bob initiates his message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with Bob's message and is typically embedded therein.

Bob's message, associated with the CST timestamp, is received by message center 1910 and is preferably stored thereat.

A third user, here designated as Kathy, is watching video content, such as a television show or movie, preferably having audio content, on a screen 1922. The video content is not necessarily broadcast at a fixed time, but typically is served to screen 1922 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1924.

Typically, while watching the video content on screen 1922, Kathy is holding a personal communicator 1926, such as a smartphone or alternatively a tablet or other suitable device, including an audio receiver which senses the audio content. Kathy, upon viewing a portion of the video content at CST timestamp 01:20:00 is motivated to send a message, using her personal communicator 1926, here a thumbs down message commenting on the video content that she is currently watching. In the illustrated embodiment, Kathy sends her message at 7:15 AM on Jul. 30, 2015, New York time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the video content which appears at the time that Kathy initiates her message. Alternatively, the CST timestamp references the frame being shown at the time that the message is actually sent. As a further alternative, the CST timestamp may reference any other suitable frame in the video content which reflects the context of the message.

It is a particular feature of an embodiment of the present invention that the CST timestamp is associated with Kathy's message and is typically embedded therein, although it may not be visible to user recipients thereof.

Kathy's message, associated with the CST timestamp, is received by message center 1910, and is preferably stored thereat.

As also seen in FIG. 19, a fourth user, here designated as Jane, is watching the same video content, such as a television show or movie, preferably having audio content, on a screen 1930. As noted above, the video content is not necessarily broadcast at a fixed time, but typically is served to screen 1930 at such time as the user wishes. The video content has a Content Specific Timeline (CST), which is independent of when in absolute time the content is being viewed and is solely a function of which frame, preferably audio, but alternatively video, of the content is being played. An optional display of the CST is designated by reference numeral 1932.

Typically, while watching the video content on screen 1930, Jane is holding a personal communicator 1934, such as a smartphone or alternatively a tablet or other suitable device, including an audio receiver which senses the audio content. When Jane reaches the CST timestamp 01:20:00 in the video content that she is currently watching and that John, Bob and Kathy watched earlier, Jane upon viewing a portion of the video content at CST timestamp 01:20:00 is motivated to send a message, using her personal communicator 1934, here a thumbs down message commenting on the video content that she is currently watching.

A polling server 1950 communicating with the message center 1910 compiles the viewer reactions represented by the various messages and provides a CST timestamp specific report of viewer reactions to the video content.

Figure 20:
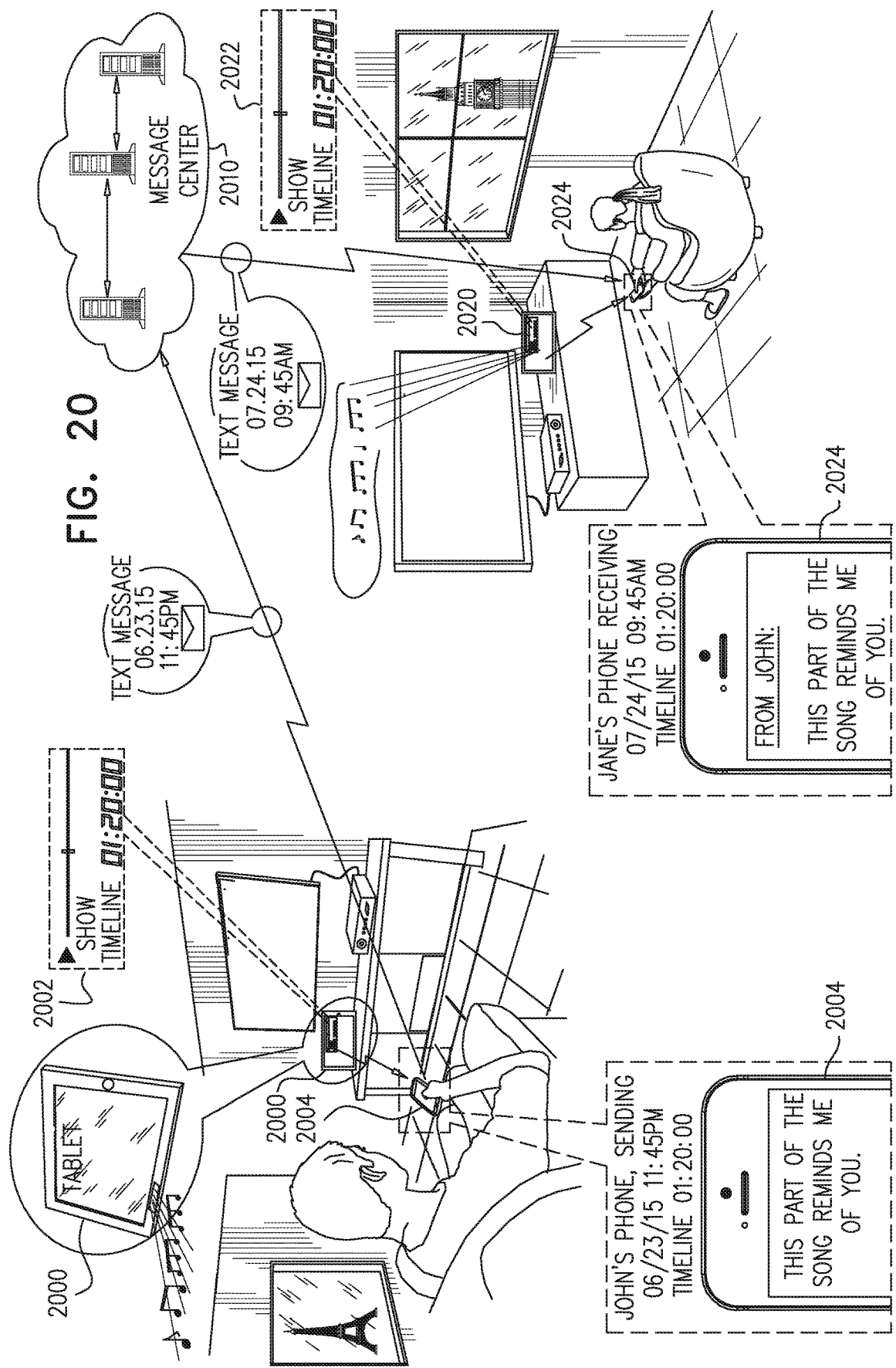
FIG. 20 is a simplified pictorial illustration of the operation of a method and system for associating messages with media during playing thereof in accordance with still a further embodiment of the present invention.

Reference is now made to FIG. 20, which is a simplified pictorial illustration of the operation of a method and system for associating messages with media during playing thereof in accordance with another embodiment of the present invention.

As seen in FIG. 20, a first user, here designated as John, is listening to audio content, such as a song, on an audio playing device 2000. The audio content is not necessarily broadcast at a fixed time, but typically is served to audio output device 2000 at such time as the user wishes. The audio content has a Content Specific Timeline (CST), which is independent of when in absolute time the content is being listened to and is solely a function of which audio frame of the content is being heard. An optional display of the CST is designated by reference numeral 2002.

Typically, while listening to the audio content on audio playing device 2000, John is holding a personal communicator 2004, such as a smartphone or alternatively a tablet or other suitable device, including an audio receiver which senses the audio content. John, upon hearing a certain part of a song, is motivated to send a message, using his personal communicator 2004, here a text message "THIS PART OF THE SONG REMINDS ME OF YOU", commenting on the audio content that he is currently listening to. In the illustrated embodiment, John sends his text message at 11:45 PM on Jun. 23, 2015, Paris time, with a CST timestamp of 01:20:00. It is appreciated that the CST timestamp is content specific and specific to a given frame in the specific content. It is appreciated that the content need not be stored.

In accordance with a preferred embodiment of the present invention, the CST timestamp references the frame in the audio content which appears at the time that John types the first letter of his text message. Alternatively, the CST timestamp references the frame being listened to at the time that the message is actually sent. As a further alternative, the CST timestamp may reference any other suitable frame in the audio content which reflects the context of the message.

It is a particular feature of an embodiment of the present invention that the CST timestamp is associated with John's message and is typically embedded therein.

John's message, associated with the CST timestamp, is received by one or more servers, associated with memory, here collectively designated as message center 2010, and is preferably stored thereat.

As also seen in FIG. 20, a second user, here designated as Jane, is listening to the same audio content on an audio playing device 2020. As noted above, the audio content is not necessarily broadcast at a fixed time, but typically is served to device 2020 at such time as the user wishes. The audio content has a Content Specific Timeline (CST), which is independent of when in absolute time the content is being listened to and is solely a function of which audio frame of the content is being listened to. An optional display of the CST is designated by reference numeral 2022.

It is appreciated that since the audio content heard by both John and Jane is the same, they both have an identical CST. In this case, Jane is listening to the content on Jul. 24, 2015 and reaches the CST timestamp associated with John's earlier message at 9:45 AM, London time, on Jul. 24, 2015.

Typically, while listening to the audio content on device 2020, Jane is holding a personal communicator 2024, such as a smartphone or alternatively a tablet or other suitable device, including an audio receiver which senses the audio content. When Jane reaches the CST timestamp 01:20:00 in the audio content that she is currently listening to and that John listened to earlier, Jane receives, from message center 2010 to her personal communicator 2024, John's text message that was earlier sent by John at 11:45 PM on Jun. 23, 2015, Paris time. She sees John's message, here a text message "THIS PART OF THE SONG REMINDS ME OF YOU", at the point of time in the song which is contextually associated with John's message.

Figure 21:
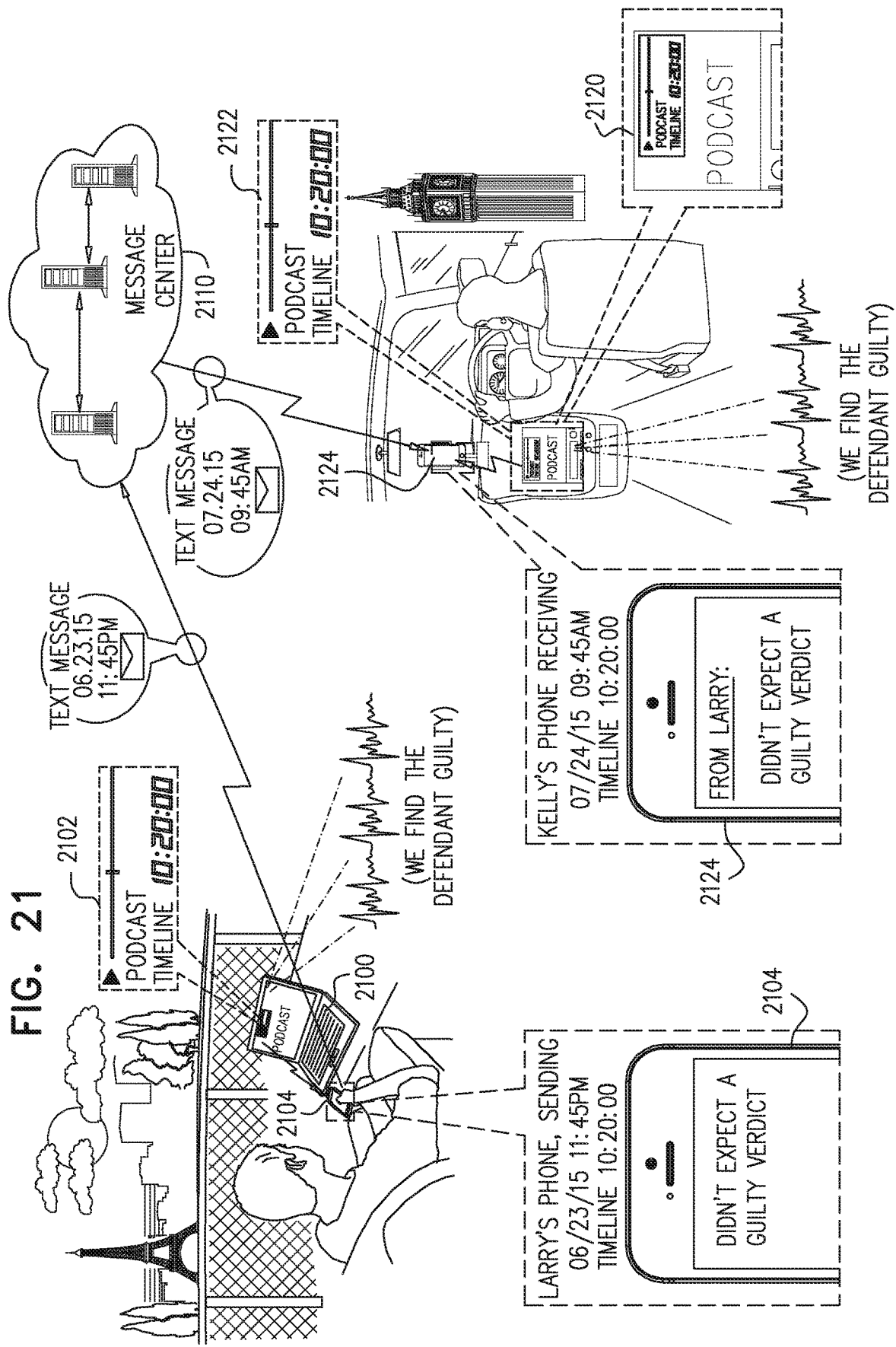
FIG. 21 is a simplified pictorial illustration of the operation of a method and system for associating messages with media during playing thereof in accordance with another embodiment of the present invention.

Reference is now made to FIG. 21, which is a simplified pictorial illustration of the operation of a method and system for associating messages with media during playing thereof in accordance with another embodiment of the present invention.

As seen in FIG. 21, a first user, here designated as Larry, is listening to podcast content on an audio playing device 2100. The podcast content includes any audio content, such as, for example, audio books, music, concerts, radio broadcasts and lectures. The podcast content is not typically broadcast at a fixed time, but typically is served to audio playing device 2100 at such time as the user wishes. The podcast content has a Content Specific Timeline (CST), which is independent of when in absolute time the content is being listened to and is solely a function of which audio frame of the content is being listened to. An optional display of the CST is designated by reference numeral 2102.

Typically, while listening to the podcast content on audio playing device 2100, Larry is holding a personal communicator 2014, such as a smartphone or alternatively a tablet or other suitable device, including an audio receiver which senses the podcast content. Larry, upon hearing the announcement of a guilty verdict, is motivated to send a message, using his personal communicator 2104, here a text message "DIDN'T EXPECT A GUILTY VERDICT!", commenting on the podcast content that he is currently listening to. In the illustrated embodiment, Larry sends his text message at 11:45 PM on Jun. 23, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry types the first letter of his text message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 2110, and is preferably stored thereat.

As also seen in FIG. 21, a second user, here designated as Kelly, is listening to the same podcast content on an audio playing device 2120. As noted above, the podcast content is not typically broadcast at a fixed time, but typically is served to audio playing device 2120 at such time as the user wishes. The podcast content has a Content Specific Timeline (CST), which is independent of when in absolute time the content is being listened to and is solely a function of which audio frame of the content is being listened to. An optional display of the CST is designated by reference numeral 2122.

It is appreciated that since the portions of the podcast content heard by both Larry and Kelly are the same, they both have an identical CST. In this case, Kelly is listening to the content on Jul. 24, 2015 and reaches the CST timestamp associated with Larry's earlier message at 9:45 AM, London time, on Jul. 24, 2015.

Typically, while listening to the podcast content on audio playing device 2120, Kelly is using a personal communicator 2124, such as a smartphone or alternatively a tablet or other suitable device, including an audio receiver which senses the podcast content. When Kelly reaches the CST timestamp 10:20:00 in the podcast content that she is currently listening to and that Larry listened to earlier, Kelly receives, from message center 2110 to her personal communicator 2124, Larry's text message that was earlier sent by Larry at 11:45 PM on Jun. 23, 2015, Paris time. She sees Larry's message, here a text message "DIDN'T EXPECT A GUILTY VERDICT!", at the point of time in the podcast content which is contextually associated with Larry's message.

Figure 22:
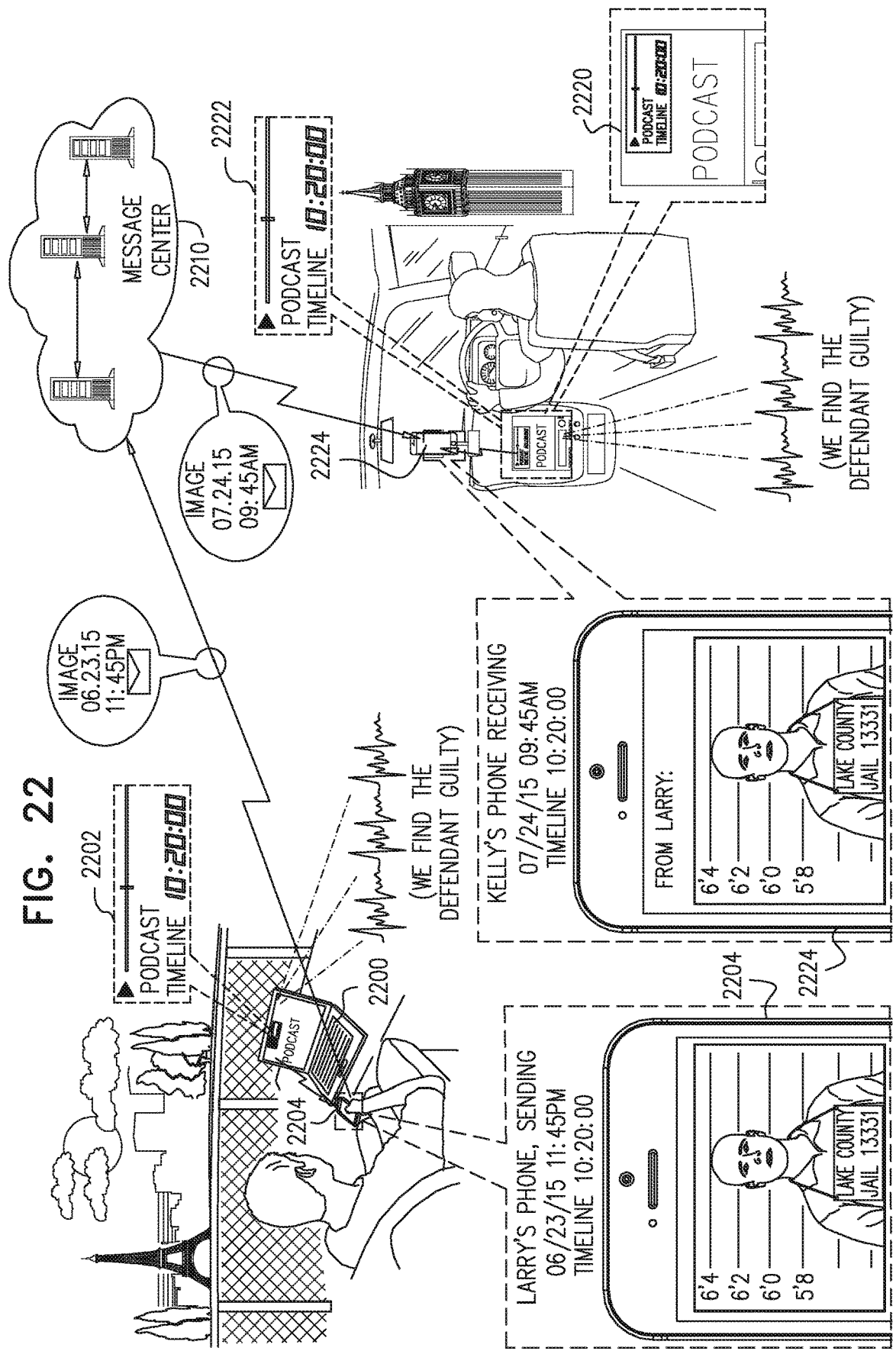
FIG. 22 is a simplified pictorial illustration of the operation of a method and system for associating messages with media during playing thereof in accordance with yet another embodiment of the present invention.

Reference is now made to FIG. 22, which is a simplified pictorial illustration of the operation of a method and system for associating messages with media during playing thereof in accordance with still another embodiment of the present invention.

As seen in FIG. 22, a first user, here designated as Larry, is listening to podcast content on an audio playing device 2200. The podcast content is not typically broadcast at a fixed time, but typically is served to audio playing device 2200 at such time as the user wishes. The podcast content has a Content Specific Timeline (CST), which is independent of when in absolute time the content is being listened to and is solely a function of which audio frame of the content is being listened to. An optional display of the CST is designated by reference numeral 2202.

Typically, while listening to the podcast content on audio playing device 2200, Larry is holding a personal communicator 2204, such as a smartphone or alternatively a tablet or other suitable device, including an audio receiver which senses the podcast content. Larry, upon hearing the announcement of a guilty verdict, is motivated to send a message, using his personal communicator 2204, here an image, such as a mugshot, as a comment on the podcast content that he is currently listening to. In the illustrated embodiment, Larry sends his message at 11:45 PM on Jun. 23, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry initiates a search for an image to appear in his image message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 2210, and is preferably stored thereat.

As also seen in FIG. 22, a second user, here designated as Kelly, is listening to the same podcast content on an audio playing device 2220. As noted above, the podcast content is not typically broadcast at a fixed time, but typically is served to audio playing device 2220 at such time as the user wishes. The podcast content has a Content Specific Timeline (CST), which is independent of when in absolute time the content is being listened to and is solely a function of which audio frame of the content is being listened to. An optional display of the CST is designated by reference numeral 2222.

It is appreciated that since the portions of the podcast content heard by both Larry and Kelly are the same, they both have an identical CST. In this case, Kelly is listening to the content on Jul. 24, 2015 and reaches the CST timestamp associated with Larry's earlier message at 9:45 AM, London time, on Jul. 24, 2015.

Typically, while listening to the podcast content on audio playing device 2220, Kelly is using a personal communicator 2224, such as a smartphone or alternatively a tablet or other suitable device, including an audio receiver which senses the podcast content. When Kelly reaches the CST timestamp 10:20:00 in the podcast content that she is currently listening to and that Larry listened to earlier, Kelly receives, from message center 2210 to her personal communicator 2224, Larry's image message that was earlier sent by Larry at 11:45 PM on Jun. 23, 2015, Paris time. She sees Larry's message, here a mugshot, at the point of time in the podcast content which is contextually associated with Larry's message.

Figure 23:
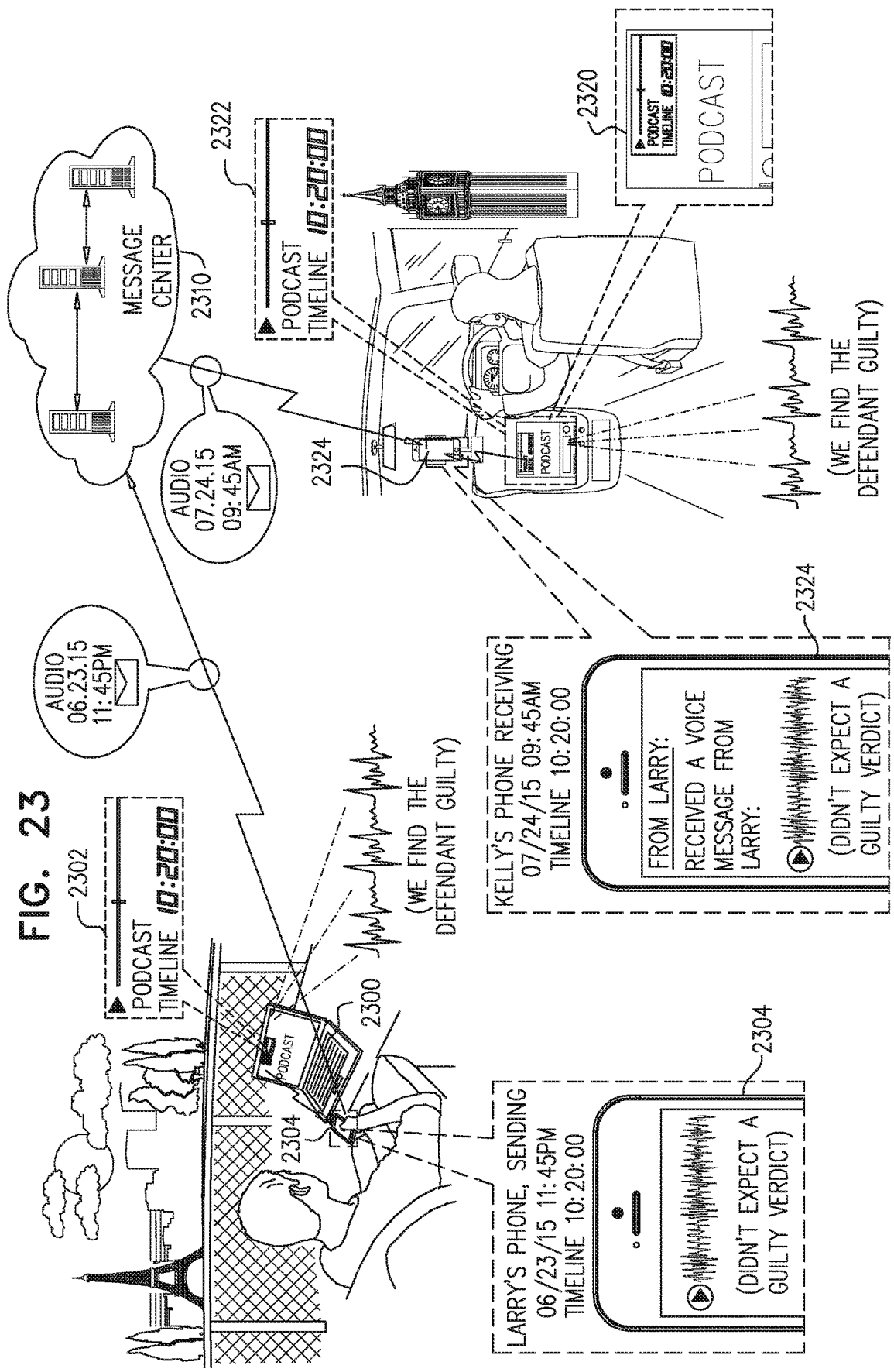
FIG. 23 is a simplified pictorial illustration of the operation of a method and system for associating messages with media during playing thereof in accordance with still another embodiment of the present invention.

Reference is now made to FIG. 23, which is a simplified pictorial illustration of the operation of a method and system for associating messages with media during playing thereof in accordance with yet another embodiment of the present invention.

As seen in FIG. 23, a first user, here designated as Larry, is listening to podcast content on an audio playing device 2300. The podcast content is not typically broadcast at a fixed time, but typically is served to audio playing device 2300 at such time as the user wishes. The podcast content has a Content Specific Timeline (CST), which is independent of when in absolute time the content is being listened to and is solely a function of which audio frame of the content is being listened to. An optional display of the CST is designated by reference numeral 2302.

Typically, while listening to the podcast content on audio playing device 2300, Larry is holding a personal communicator 2304, such as a smartphone or alternatively a tablet or other suitable device, including an audio receiver which senses the podcast content. Larry, upon hearing the announcement of a guilty verdict, is motivated to send a message, using his personal communicator 2304, here an audio message whose transcription is "DIDN'T EXPECT A GUILTY VERDICT!", commenting on the podcast content that he is currently listening to. In the illustrated embodiment, Larry sends his audio message at 11:45 PM on Jun. 23, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry initiates audio recording of his audio message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 2310, and is preferably stored thereat.

As also seen in FIG. 23, a second user, here designated as Kelly, is listening to the same podcast content on an audio playing device 2320. As noted above, the podcast content is not typically broadcast at a fixed time, but typically is served to audio playing device 2320 at such time as the user wishes. The podcast content has a Content Specific Timeline (CST), which is independent of when in absolute time the content is being listened to and is solely a function of which audio frame of the content is being listened to. An optional display of the CST is designated by reference numeral 2322.

It is appreciated that since the portions of the podcast content heard by both Larry and Kelly are the same, they both have an identical CST. In this case, Kelly is listening to the content on Jul. 24, 2015 and reaches the CST timestamp associated with Larry's earlier message at 9:45 AM, London time, on Jul. 24, 2015.

Typically, while listening to the podcast content on audio playing device 2320, Kelly is using a personal communicator 2324, such as a smartphone or alternatively a tablet or other suitable device, including an audio receiver which senses the podcast content. When Kelly reaches the CST timestamp 10:20:00 in the podcast content that she is currently listening to and that Larry listened to earlier, Kelly receives, from message center 2310 to her personal communicator 2324, Larry's audio message that was earlier sent by Larry at 11:45 PM on Jun. 23, 2015, Paris time. She hears Larry's message, here "DIDN'T EXPECT A GUILTY VERDICT!", at the point of time in the podcast content which is contextually associated with Larry's message.

Figure 24:
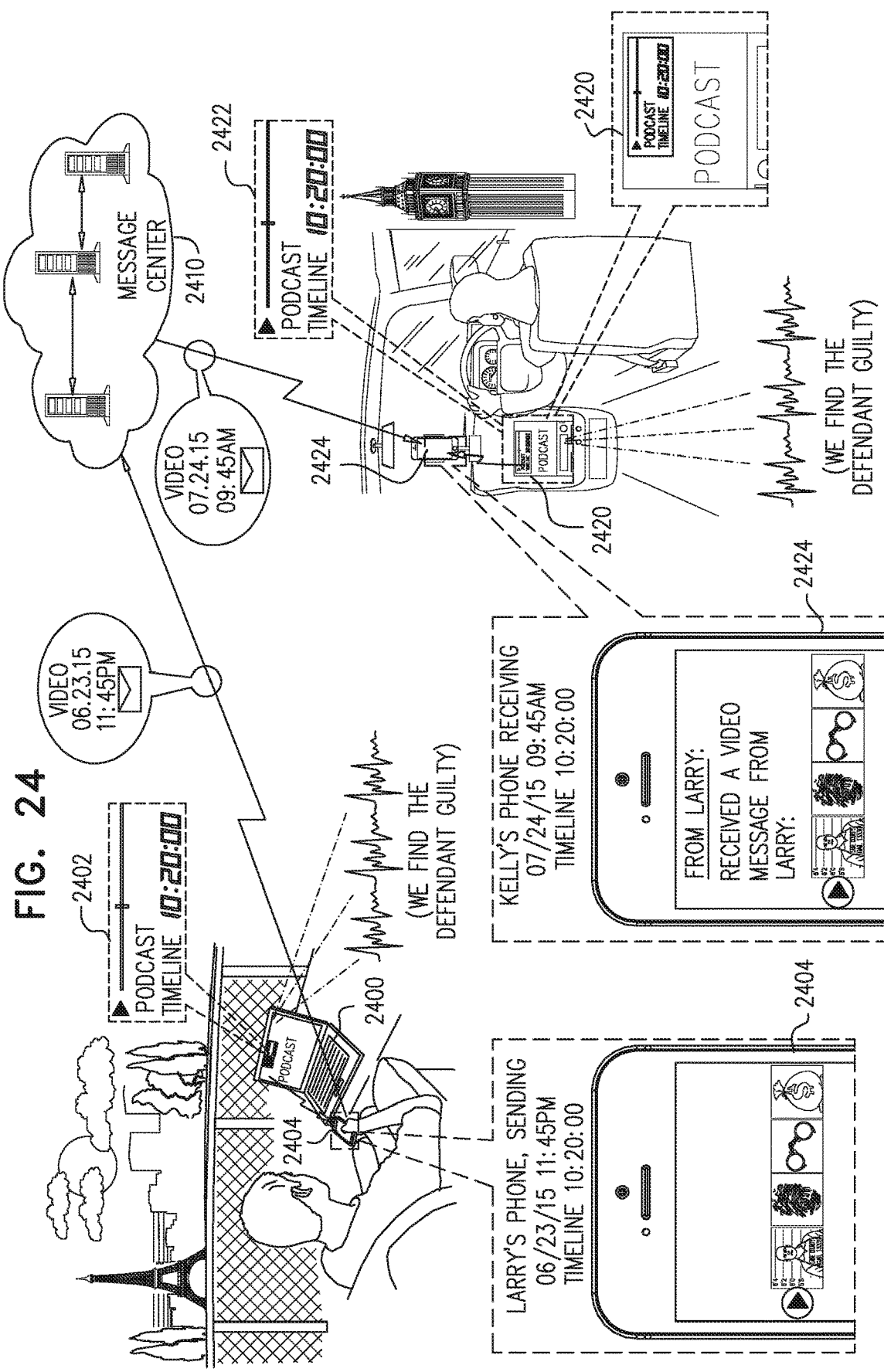
FIG. 24 is a simplified pictorial illustration of the operation of a method and system for associating messages with media during playing thereof in accordance with another embodiment of the present invention.

Reference is now made to FIG. 24, which is a simplified pictorial illustration of the operation of a method and system for associating messages with media during playing thereof in accordance with an embodiment of the present invention.

As seen in FIG. 24, a first user, here designated as Larry, is listening to podcast content on an audio playing device 2400. The podcast content is not typically broadcast at a fixed time, but typically is served to audio playing device 2400 at such time as the user wishes. The podcast content has a Content Specific Timeline (CST), which is independent of when in absolute time the content is being listened to and is solely a function of which audio frame of the content is being listened to. An optional display of the CST is designated by reference numeral 2402.

Typically, while listening to the podcast content on audio playing device 2400, Larry is holding a personal communicator 2404, such as a smartphone or alternatively a tablet or other suitable device, including an audio receiver which senses the podcast content. Larry, upon hearing the announcement of a guilty verdict, is motivated to send a message, using his personal communicator 2404, here a video message, here showing a perp walk, as a comment on the podcast content that he is currently listening to. In the illustrated embodiment, Larry sends his video message at 11:45 PM on Jun. 23, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry initiates video recording, downloading or searching for his video message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 2410, and is preferably stored thereat.

As also seen in FIG. 24, a second user, here designated as Kelly, is listening to the same podcast content on an audio playing device 2420. As noted above, the podcast content is not typically broadcast at a fixed time, but typically is served to audio playing device 2420 at such time as the user wishes. The podcast content has a Content Specific Timeline (CST), which is independent of when in absolute time the content is being listened to and is solely a function of which audio frame of the content is being listened to. An optional display of the CST is designated by reference numeral 2422.

It is appreciated that since the portions of the podcast content heard by both Larry and Kelly are the same, they both have an identical CST. In this case, Kelly is listening to the content on Jul. 24, 2015 and reaches the CST timestamp associated with Larry's earlier message at 9:45 AM, London time, on Jul. 24, 2015.

Typically, while listening to the podcast content on audio playing device 2420, Kelly is using a personal communicator 2424, such as a smartphone or alternatively a tablet or other suitable device, including an audio receiver which senses the podcast content. When Kelly reaches the CST timestamp 10:20:00 in the podcast content that she is currently listening to and that Larry listened to earlier, Kelly receives, from message center 2410 to her personal communicator 2424, Larry's video message that was earlier sent by Larry at 11:45 PM on Jun. 23, 2015, Paris time. She views Larry's video message at the point of time in the podcast content which is contextually associated with Larry's message.

Figure 25:
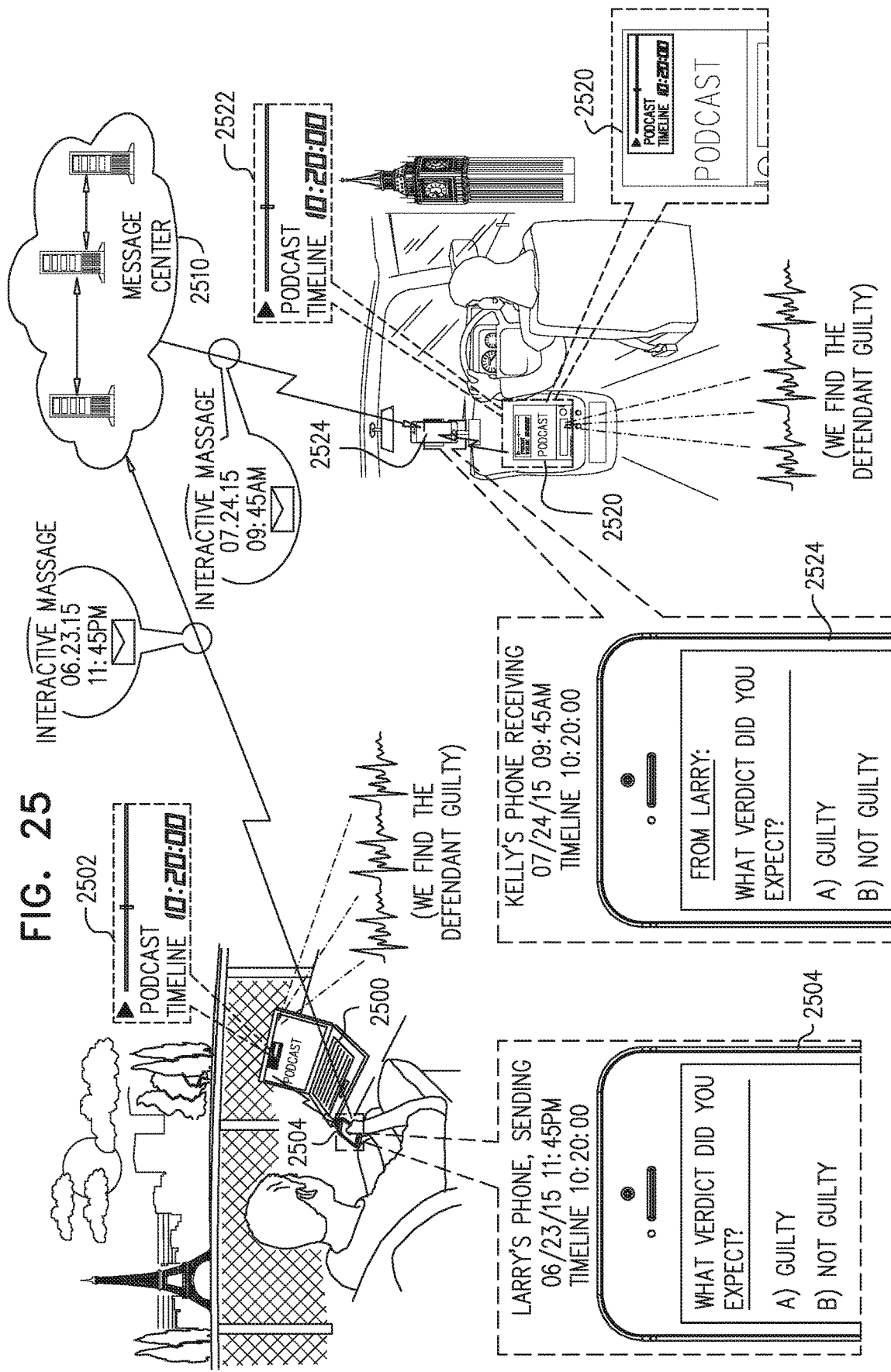
FIG. 25 is a simplified pictorial illustration of the operation of a method and system for associating messages with media during playing thereof in accordance with a further embodiment of the present invention.

Reference is now made to FIG. 25, which is a simplified pictorial illustration of the operation of a method and system for associating messages with media during playing thereof in accordance with another embodiment of the present invention.

As seen in FIG. 25, a first user, here designated as Larry, is listening to podcast content on an audio playing device 2500. The podcast content is not typically broadcast at a fixed time, but typically is served to audio playing device 2500 at such time as the user wishes. The podcast content has a Content Specific Timeline (CST), which is independent of when in absolute time the content is being listened to and is solely a function of which audio frame of the content is being listened to. An optional display of the CST is designated by reference numeral 2502.

Typically, while listening to the podcast content on audio playing device 2500, Larry is holding a personal communicator 2504, such as a smartphone or alternatively a tablet or other suitable device, including an audio receiver which senses the podcast content. Larry, upon hearing the announcement of a guilty verdict, is motivated to send a message, using his personal communicator 2504, here an interactive message, such as a message asking verdict related questions, as a comment on the podcast content that he is currently listening to. In the illustrated embodiment, Larry sends his interactive message at 11:45 PM on Jun. 23, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry initiates his interactive message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 2510, and is preferably stored thereat.

As also seen in FIG. 25, a second user, here designated as Kelly, is listening to the same podcast content on an audio playing device 2520. As noted above, the podcast content is not typically broadcast at a fixed time, but typically is served to audio playing device 2520 at such time as the user wishes. The podcast content has a Content Specific Timeline (CST), which is independent of when in absolute time the content is being listened to and is solely a function of which audio frame of the content is being listened to. An optional display of the CST is designated by reference numeral 2522.

It is appreciated that since the portions of the podcast content heard by both Larry and Kelly are the same, they both have an identical CST. In this case, Kelly is listening to the content on Jul. 24, 2015 and reaches the CST timestamp associated with Larry's earlier message at 9:45 AM, London time, on Jul. 24, 2015.

Typically, while listening to the podcast content on audio playing device 2520, Kelly is using a personal communicator 2524, such as a smartphone or alternatively a tablet or other suitable device, including an audio receiver which senses the podcast content. When Kelly reaches the CST timestamp 10:20:00 in the podcast content that she is currently listening to and that Larry listened to earlier, Kelly receives, from message center 2510 to her personal communicator 2524, Larry's interactive message that was earlier sent by Larry at 11:45 PM on Jun. 23, 2015, Paris time. She receives Larry's interactive message at the point of time in the podcast content which is contextually associated with Larry's message.

Figure 26:
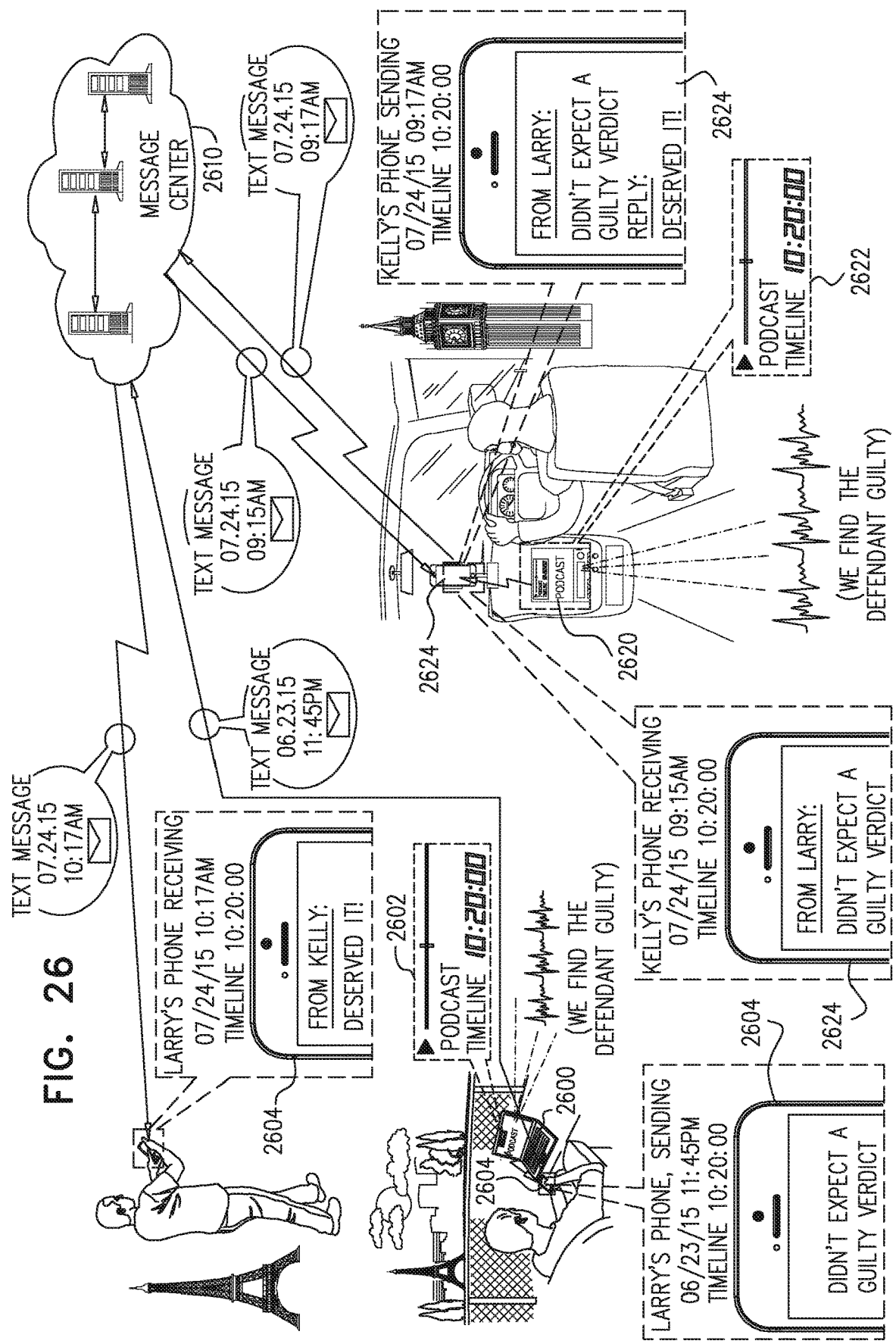
FIG. 26 is a simplified pictorial illustration of the operation of a method and system for associating messages with media during playing thereof in accordance with yet a further embodiment of the present invention.

Reference is now made to FIG. 26, which is a simplified pictorial illustration of the operation of a method and system for associating messages with media during playing thereof in accordance with yet another embodiment of the present invention.

As seen in FIG. 26, a first user, here designated as Larry, is listening to podcast content on an audio playing device 2600. The podcast content is not typically broadcast at a fixed time, but typically is served to audio playing device 2600 at such time as the user wishes. The podcast content has a Content Specific Timeline (CST), which is independent of when in absolute time the content is being listened to and is solely a function of which audio frame of the content is being listened to. An optional display of the CST is designated by reference numeral 2602.

Typically, while listening to the podcast content on audio playing device 2600, Larry is holding a personal communicator 2604, such as a smartphone or alternatively a tablet or other suitable device, including an audio receiver which senses the podcast content. Larry, upon hearing the announcement of a guilty verdict, is motivated to send a message, using his personal communicator 2604, here a text message "DIDN'T EXPECT A GUILTY VERDICT!", commenting on the podcast content that he is currently listening to. In the illustrated embodiment, Larry sends his text message at 11:45 PM on Jun. 23, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry types the first letter of his text message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 2610, and is preferably stored thereat.

As also seen in FIG. 26, a second user, here designated as Kelly, is listening to the same podcast content on an audio playing device 2620. As noted above, the podcast content is not typically broadcast at a fixed time, but typically is served to audio playing device 2620 at such time as the user wishes. The podcast content has a Content Specific Timeline (CST), which is independent of when in absolute time the content is being listened to and is solely a function of which audio frame of the content is being listened to. An optional display of the CST is designated by reference numeral 2622.

It is appreciated that since the portions of the podcast content heard by both Larry and Kelly are the same, they both have an identical CST. In this case, Kelly is listening to the content on Jul. 24, 2015 and reaches the CST timestamp associated with Larry's earlier message at 9:15 AM, London time, on Jul. 24, 2015.

Typically, while listening to the podcast content on audio playing device 2620, Kelly is using a personal communicator 2624, such as a smartphone or alternatively a tablet or other suitable device, including an audio receiver which senses the podcast content. When Kelly reaches the CST timestamp 10:20:00 in the podcast content that she is currently listening to and that Larry listened to earlier, Kelly receives, from message center 2610 to her personal communicator 2624, Larry's text message that was earlier sent by Larry at 11:45 PM on Jun. 23, 2015, Paris time. She sees Larry's message, here a text message "DIDN'T EXPECT A GUILTY VERDICT!", at the point of time in the podcast content which is contextually associated with Larry's message.

Upon receiving Larry's text message, Kelly chooses to reply using her personal communicator 2624, here preferably by voice actuated texting "DESERVED IT". She can reply upon receipt of Larry's text message or at any later time. Kelly's reply is received by the message center 2610.

Message center 2610 makes Kelly's reply available to Larry immediately and makes it available for download, review and response in the future. Additionally, or, alternatively, Kelly's reply may be sent directly to Larry's phone by conventional messaging applications.

Figure 27:
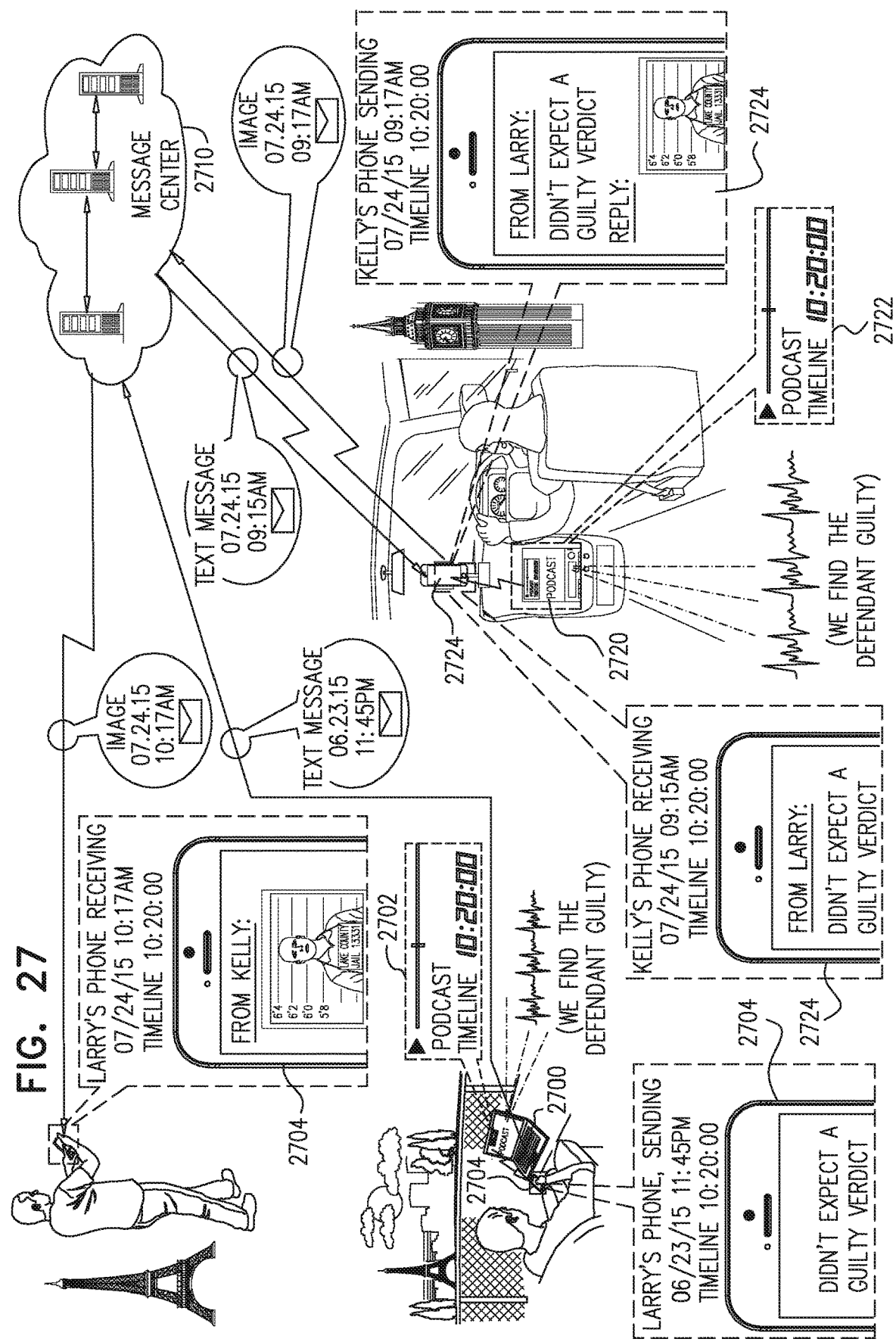
FIG. 27 is a simplified pictorial illustration of the operation of a method and system for associating messages with media during playing thereof in accordance with still a further embodiment of the present invention.

Reference is now made to FIG. 27, which is a simplified pictorial illustration of the operation of a method and system for associating messages with media during playing thereof in accordance with still another embodiment of the present invention.

As seen in FIG. 27, a first user, here designated as Larry, is listening to podcast content on an audio playing device 2700. The podcast content is not typically broadcast at a fixed time, but typically is served to audio playing device 2700 at such time as the user wishes. The podcast content has a Content Specific Timeline (CST), which is independent of when in absolute time the content is being listened to and is solely a function of which audio frame of the content is being listened to. An optional display of the CST is designated by reference numeral 2702.

Typically, while listening to the podcast content on audio playing device 2700, Larry is holding a personal communicator 2704, such as a smartphone or alternatively a tablet or other suitable device, including an audio receiver which senses the podcast content. Larry, upon hearing the announcement of a guilty verdict, is motivated to send a message, using his personal communicator 2704, here a text message "DIDN'T EXPECT A GUILTY VERDICT!", commenting on the podcast content that he is currently listening to. In the illustrated embodiment, Larry sends his text message at 11:45 PM on Jun. 23, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry types the first letter of his text message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 2710, and is preferably stored thereat.

As also seen in FIG. 27, a second user, here designated as Kelly, is listening to the same podcast content on an audio playing device 2720. As noted above, the podcast content is not typically broadcast at a fixed time, but typically is served to audio playing device 2720 at such time as the user wishes. The podcast content has a Content Specific Timeline (CST), which is independent of when in absolute time the content is being listened to and is solely a function of which audio frame of the content is being listened to. An optional display of the CST is designated by reference numeral 2722.

It is appreciated that since the portions of the podcast content heard by both Larry and Kelly are the same, they both have an identical CST. In this case, Kelly is listening to the content on Jul. 24, 2015 and reaches the CST timestamp associated with Larry's earlier message at 9:15 AM, London time, on Jul. 24, 2015.

Typically, while listening to the podcast content on audio playing device 2720, Kelly is using a personal communicator 2724, such as a smartphone or alternatively a tablet or other suitable device, including an audio receiver which senses the podcast content. When Kelly reaches the CST timestamp 10:20:00 in the podcast content that she is currently listening to and that Larry listened to earlier, Kelly receives, from message center 2710 to her personal communicator 2724, Larry's text message that was earlier sent by Larry at 11:45 PM on Jun. 23, 2015, Paris time. She sees Larry's message, here a text message "DIDN'T EXPECT A GUILTY VERDICT!", at the point of time in the podcast content which is contextually associated with Larry's message.

Upon receiving Larry's text message, Kelly chooses to reply, here by sending an image, such as a mugshot. She can reply upon receipt of Larry's text message or at any later time. Kelly's reply is received by the message center 2710. Message center 2710 makes Kelly's reply available to Larry immediately and makes it available for download, review and response in the future. Additionally, or, alternatively, Kelly's reply may be sent directly to Larry's phone by conventional messaging applications.

Figure 28:
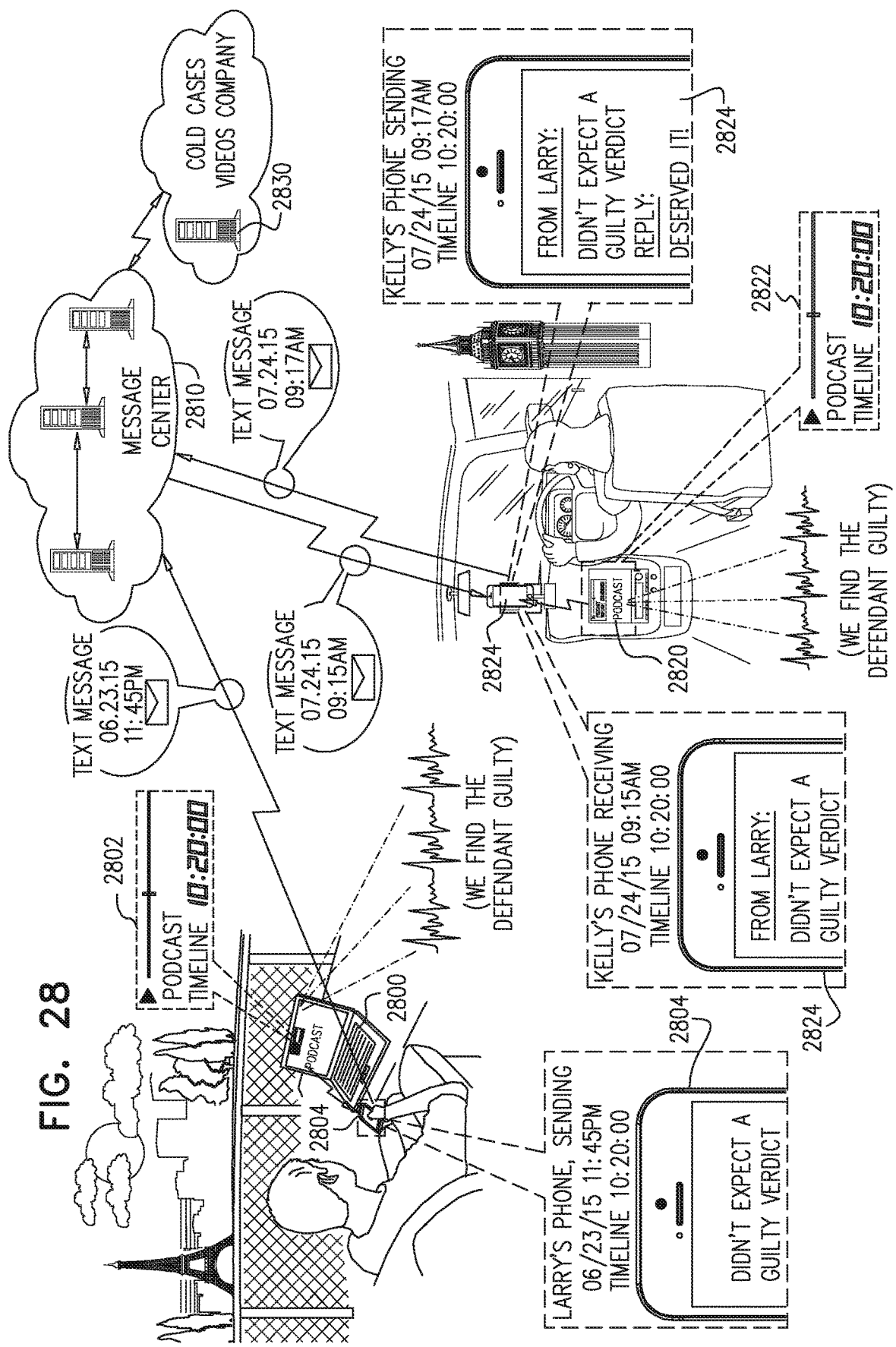
FIG. 28 is a simplified pictorial illustration of the operation of a method and system for associating messages with media during playing thereof in accordance with another embodiment of the present invention.

Reference is now made to FIG. 28, which is a simplified pictorial illustration of the operation of a method and system for associating messages with media during playing thereof in accordance with a further embodiment of the present invention.

As seen in FIG. 28, a first user, here designated as Larry, is listening to podcast content on an audio playing device 2800. The podcast content is not typically broadcast at a fixed time, but typically is served to audio playing device 2800 at such time as the user wishes. The podcast content has a Content Specific Timeline (CST), which is independent of when in absolute time the content is being listened to and is solely a function of which audio frame of the content is being listened to. An optional display of the CST is designated by reference numeral 2802.

Typically, while listening to the podcast content on audio playing device 2800, Larry is holding a personal communicator 2804, such as a smartphone or alternatively a tablet or other suitable device, including an audio receiver which senses the podcast content. Larry, upon hearing the announcement of a guilty verdict, is motivated to send a message, using his personal communicator 2804, here a text message "DIDN'T EXPECT A GUILTY VERDICT!", commenting on the podcast content that he is currently listening to. In the illustrated embodiment, Larry sends his text message at 11:45 PM on Jun. 23, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry types the first letter of his text message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 2810, and is preferably stored thereat.

As also seen in FIG. 28, a second user, here designated as Kelly, is listening to the same podcast content on an audio playing device 2820. As noted above, the podcast content is not typically broadcast at a fixed time, but typically is served to audio playing device 2820 at such time as the user wishes. The podcast content has a Content Specific Timeline (CST), which is independent of when in absolute time the content is being listened to and is solely a function of which audio frame of the content is being listened to. An optional display of the CST is designated by reference numeral 2822.

It is appreciated that since the portions of the podcast content heard by both Larry and Kelly are the same, they both have an identical CST. In this case, Kelly is listening to the content on Jul. 24, 2015 and reaches the CST timestamp associated with Larry's earlier message at 9:15 AM, London time, on Jul. 24, 2015.

Typically, while listening to the podcast content on audio playing device 2820, Kelly is using a personal communicator 2824, such as a smartphone or alternatively a tablet or other suitable device, including an audio receiver which senses the podcast content. When Kelly reaches the CST timestamp 10:20:00 in the podcast content that she is currently listening to and that Larry listened to earlier, Kelly receives, from message center 2810 to her personal communicator 2824, Larry's text message that was earlier sent by Larry at 11:45 PM on Jun. 23, 2015, Paris time. She sees Larry's message, here a text message "DIDN'T EXPECT A GUILTY VERDICT!", at the point of time in the podcast content which is contextually associated with Larry's message.

Upon receiving Larry's text message, Kelly chooses to reply, here preferably by voice actuated texting "DESERVED IT". She can reply upon receipt of Larry's text message or at any later time. Kelly's reply is received by the message center 2810. Message center 2810 makes Kelly's reply available to Larry immediately and makes it available for download, review and response in the future. Additionally, or, alternatively, Kelly's reply may be sent directly to Larry's phone by conventional messaging applications.

In accordance with a preferred embodiment of the present invention, a server 2830 of a commercial entity, here a company offering videos of cold cases, receives an identity-agnostic feed of parsed extracts from the messages received by the message center 2810. This feed is preferably associated with the CST timestamps of the relevant video context. The identity-agnostic feed of parsed extracts can be used by the commercial entity for various commercial purposes, for example to gauge consumer response to specific portions of video context, such as a product placement.

Figure 29:
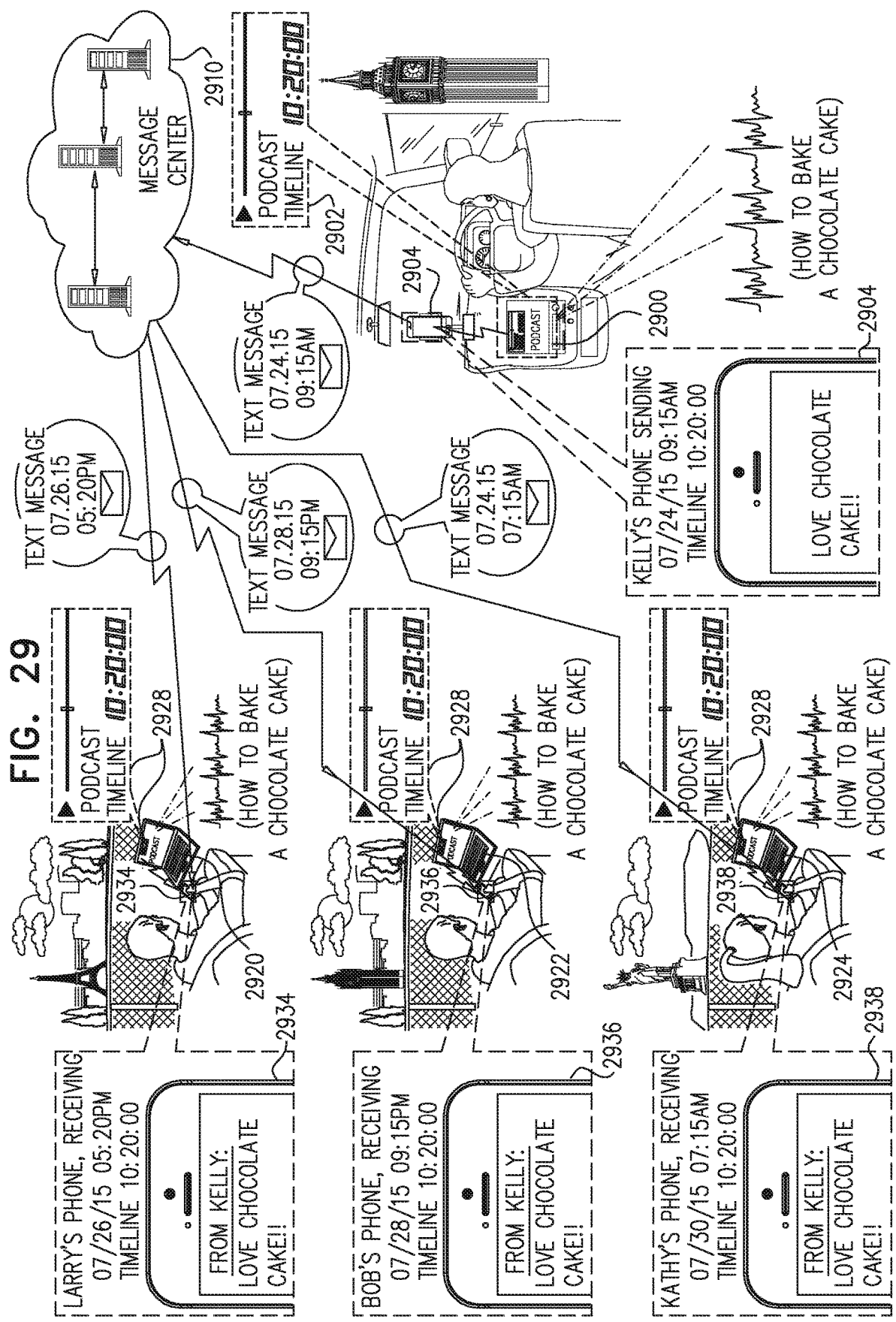
FIG. 29 is a simplified pictorial illustration of the operation of a method and system for associating messages with media during playing thereof in accordance with yet another embodiment of the present invention.

Reference is now made to FIG. 29, which is a simplified pictorial illustration of the operation of a method and system for associating messages with media during playing thereof in accordance with yet another embodiment of the present invention.

As seen in FIG. 29, a first user, here designated as Kelly, is listening to podcast content on an audio playing device 2900. The podcast content is not typically broadcast at a fixed time, but typically is served to audio playing device 2900 at such time as the user wishes. The podcast content has a Content Specific Timeline (CST), which is independent of when in absolute time the content is being listened to and is solely a function of which audio frame of the content is being listened to. An optional display of the CST is designated by reference numeral 2902.

Typically, while listening to the podcast content on audio playing device 2900, Kelly is using a personal communicator 2904, such as a smartphone or alternatively a tablet or other suitable device, including an audio receiver which senses the podcast content. Kelly, upon listening to a cooking podcast is motivated to send a message, using her personal communicator 2904, here a text message "LOVE CHOCOLATE CAKE!!", commenting on the podcast content that she is currently listening to. In the illustrated embodiment, Kelly sends her text message at 9:15 AM on Jul. 24, 2015, London time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Kelly types the first letter of her text message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Kelly's message and is typically embedded therein, although it may not be visible to user recipients thereof.

Kelly's message, associated with the CST timestamp, is received by one or more servers, associated with memory, here collectively designated as message center 2910, and is preferably stored thereat.

As also seen in FIG. 29, second, third and fourth users, here designated respectively as Larry, Bob and Kathy, are listening to the same podcast content on respective audio playing devices 2920, 2922 and 2924. As noted above, the podcast content is not typically broadcast at a fixed time, but typically is served to audio playing devices 2920, 2922 and 2924 at such time as each user wishes. The podcast content has a Content Specific Timeline (CST), which is independent of when in absolute time the content is being listened to and is solely a function of which audio frame of the content is being listened to. An optional display of the CST is designated by reference numeral 2928 on each of audio playing devices 2920, 2922 and 2924.

It is appreciated that since the portions of the podcast content heard by Kelly, Larry, Bob and Kathy are the same, they all have an identical CST. In this case, Larry is listening to the content on Jul. 26, 2015 and reaches the CST timestamp associated with Kelly's earlier message at 05:20 PM, Paris time, on Jul. 26, 2015, Bob is listening to the content on Jul. 28, 2015 and reaches the CST timestamp associated with Kelly's earlier message at 9:15 PM, London time, on Jul. 28, 2015 and Kathy is listening to the content on Jul. 30, 2015 and reaches the CST timestamp associated with Kelly's earlier message at 7:15 AM, New York time, on Jul. 30, 2015

Typically, while listening to the podcast content on audio playing device 2920, Larry is holding a personal communicator 2934, such as a smartphone or alternatively a tablet or other suitable device, including an audio receiver which senses the podcast content. When Larry reaches the CST timestamp 10:20:00 in the podcast content that he is currently listening to and that Kelly listened to earlier, Larry receives, from message center 2910 to his personal communicator 2934, Kelly's text message that was earlier sent by Kelly at 9:15 AM, London time, on Jul. 24, 2015. He sees Kelly's message, here a text message "LOVE CHOCOLATE CAKE!!", at the point of time in the podcast content which is contextually associated with Kelly's message.

Typically, while listening to the podcast content on audio playing device 2922, Bob is holding a personal communicator 2936, such as a smartphone or alternatively a tablet or other suitable device, including an audio receiver which senses the podcast content. When Bob reaches the CST timestamp 10:20:00 in the podcast content that he is currently listening to and that Kelly listened to earlier, Bob receives, from message center 2910 to his personal communicator 2936, Kelly's text message that was earlier sent by Kelly at 9:15 AM, London time, on Jul. 24, 2015. He sees Kelly's message, here a text message "LOVE CHOCOLATE CAKE!!", at the point of time in the podcast content which is contextually associated with Kelly's message.

Typically, while listening to the podcast content on audio playing device 2924, Kathy is holding a personal communicator 2938, such as a smartphone or alternatively a tablet or other suitable device, including an audio receiver which senses the podcast content. When Kathy reaches the CST timestamp 10:20:00 in the podcast content that she is currently listening to and that Kelly listened to earlier, Kathy receives, from message center 2910 to her personal communicator 2938, Kelly's text message that was earlier sent by Kelly at 9:15 AM, London time, on Jul. 24, 2015. She sees Kelly's message, here a text message "LOVE CHOCOLATE CAKE!!", at the point of time in the podcast content which is contextually associated with Kelly's message.

Figure 30:
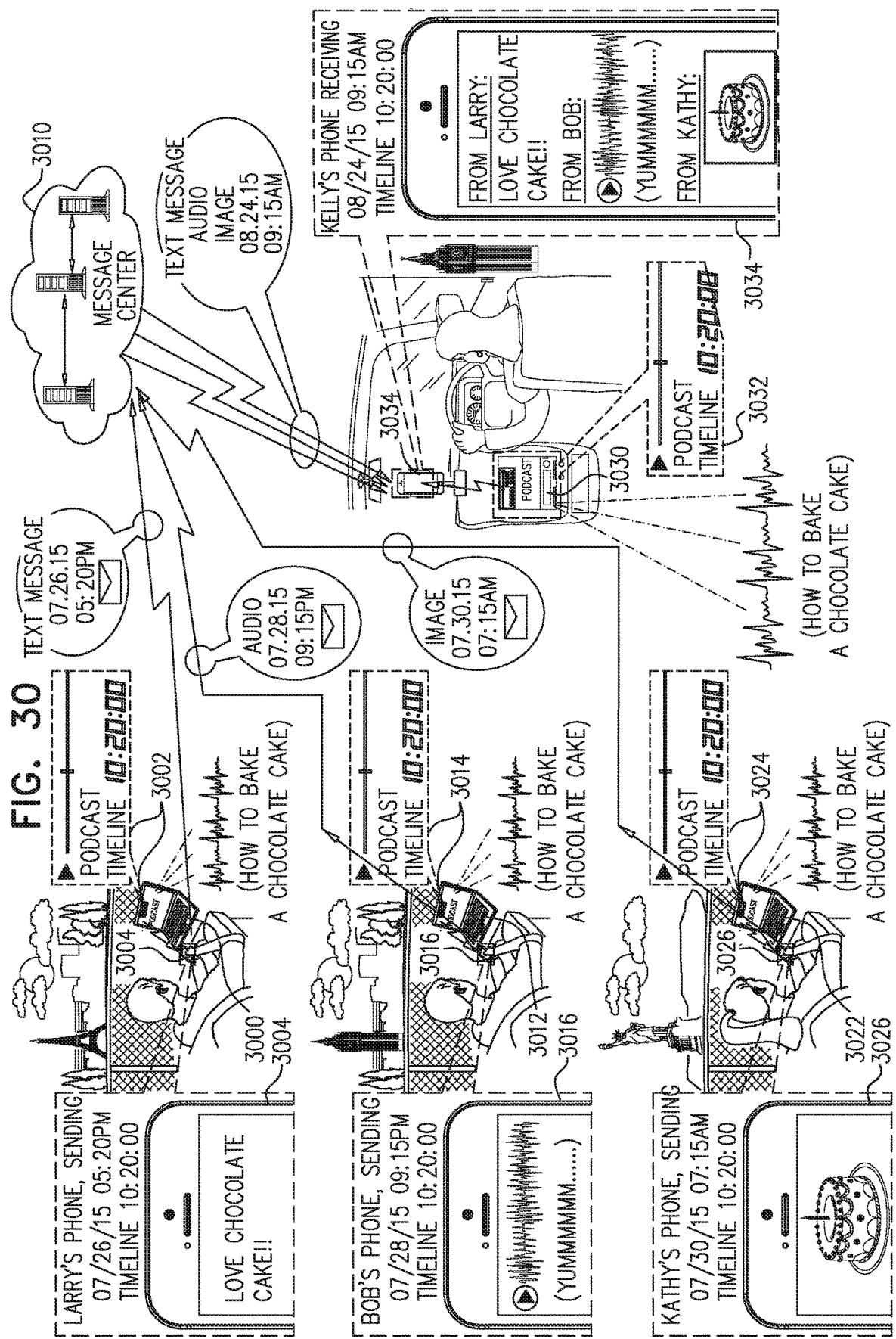
FIG. 30 is a simplified pictorial illustration of the operation of a method and system for associating messages with media during playing thereof in accordance with still another embodiment of the present invention.

Reference is now made to FIG. 30, which is a simplified pictorial illustration of the operation of a method and system for associating messages with media during playing thereof in accordance with yet a further embodiment of the present invention.

As seen in FIG. 30, a first user, here designated as Larry, is listening to podcast content on an audio playing device 3000. The podcast content is not typically broadcast at a fixed time, but typically is served to audio playing device 3000 at such time as the user wishes. The podcast content has a Content Specific Timeline (CST), which is independent of when in absolute time the content is being listened to and is solely a function of which audio frame of the content is being listened to. An optional display of the CST is designated by reference numeral 3002.

Typically, while listening to the podcast content on audio playing device 3000, Larry is holding a personal communicator 3004, such as a smartphone or alternatively a tablet or other suitable device, including an audio receiver which senses the podcast content. Larry, upon listening to a cooking podcast is motivated to send a message, using his personal communicator 3004, here a text message "LOVE CHOCOLATE CAKE!!", commenting on the podcast content that he is currently listening to. In the illustrated embodiment, Larry sends his text message at 5:20 PM on Jul. 26, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry types the first letter of his text message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein, although it may not be visible to user recipients thereof.

Larry's message, associated with the CST timestamp, is received by one or more servers, associated with memory, here collectively designated as message center 3010, and is preferably stored thereat.

A second user, here designated as Bob, is listening to podcast content on an audio playing device 3012. The podcast content is not typically broadcast at a fixed time, but typically is served to audio playing device 3012 at such time as the user wishes. The podcast content has a Content Specific Timeline (CST), which is independent of when in absolute time the content is being listened to and is solely a function of which audio frame of the content is being listened to. An optional display of the CST is designated by reference numeral 3014.

Typically, while listening to the podcast content on audio playing device 3012, Bob is holding a personal communicator 3016, such as a smartphone or alternatively a tablet or other suitable device, including an audio receiver which senses the podcast content. Bob, upon listening to a cooking podcast is motivated to send a message, using his personal communicator 3016, here an audio message whose transcription is "YUMMMMMM . . . ", commenting on the podcast content that he is currently listening to. In the illustrated embodiment, Bob sends his audio message at 9:15 PM on Jul. 28, 2015, London time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Bob initiates audio recording of his audio message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Bob's message and is typically embedded therein, although it may not be visible to user recipients thereof.

Bob's message, associated with the CST timestamp, is received by message center 3010 and is preferably stored thereat.

A third user, here designated as Kathy, is listening to podcast content on an audio playing device 3022. The podcast content is not typically broadcast at a fixed time, but typically is served to audio playing device 3022 at such time as the user wishes. The podcast content has a Content Specific Timeline (CST), which is independent of when in absolute time the content is being listened to and is solely a function of which audio frame of the content is being listened to. An optional display of the CST is designated by reference numeral 3024.

Typically, while listening to the podcast content on audio playing device 3022, Kathy is holding a personal communicator 3026, such as a smartphone or alternatively a tablet or other suitable device, including an audio receiver which senses the podcast content. Kathy, upon listening to a cooking podcast is motivated to send a message, using her personal communicator 3026, here an image message of a cake, as a comment on the podcast content that she is currently listening to. In the illustrated embodiment, Kathy sends her image message at 7:15 AM on Jul. 30, 2015, New York time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Kathy initiates a search for an image to appear in her image message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Kathy's message and is typically embedded therein, although it may not be visible to user recipients thereof.

Kathy's message, associated with the CST timestamp, is received by message center 3010 and is preferably stored thereat.

As also seen in FIG. 30, a fourth user, here designated as Kelly, is listening to the same podcast content on an audio playing device 3030. As noted above, the podcast content is not typically broadcast at a fixed time, but typically is served to audio playing device 3030 at such time as the user wishes. The podcast content has a Content Specific Timeline (CST), which is independent of when in absolute time the content is being listened to and is solely a function of which audio frame of the content is being listened to. An optional display of the CST is designated by reference numeral 3032.

It is appreciated that since the podcast content heard by Larry, Bob, Kathy and Kelly is the same, they all have an identical CST. In this case, Kelly is listening to the content on Aug. 24, 2015 and reaches the CST timestamp associated with Larry's, Bob's and Kathy's earlier messages at 9:15 AM, London time, on Aug. 24, 2015.

Typically, while listening to the podcast content on audio playing device 3030, Kelly is using a personal communicator 3034, such as a smartphone or alternatively a tablet or other suitable device, including an audio receiver which senses the podcast content. When Kelly reaches the CST timestamp 10:20:00 in the podcast content that she is currently listening to and that Larry, Bob and Kathy listened to earlier, Kelly receives, from message center 3010 to her personal communicator 3034, Larry's text message that was earlier sent by Larry at 11:45 PM on Jun. 23, 2015, Paris time, Bob's audio message that was earlier sent by Bob at 9:15 PM on Jul. 28, 2015, London time, and Kathy's image message that was earlier sent by Kathy at 7:15 AM, New York time, on Jul. 30, 2015. She receives all of these messages at the point of time in the podcast content which is contextually associated therewith.

Figure 31:
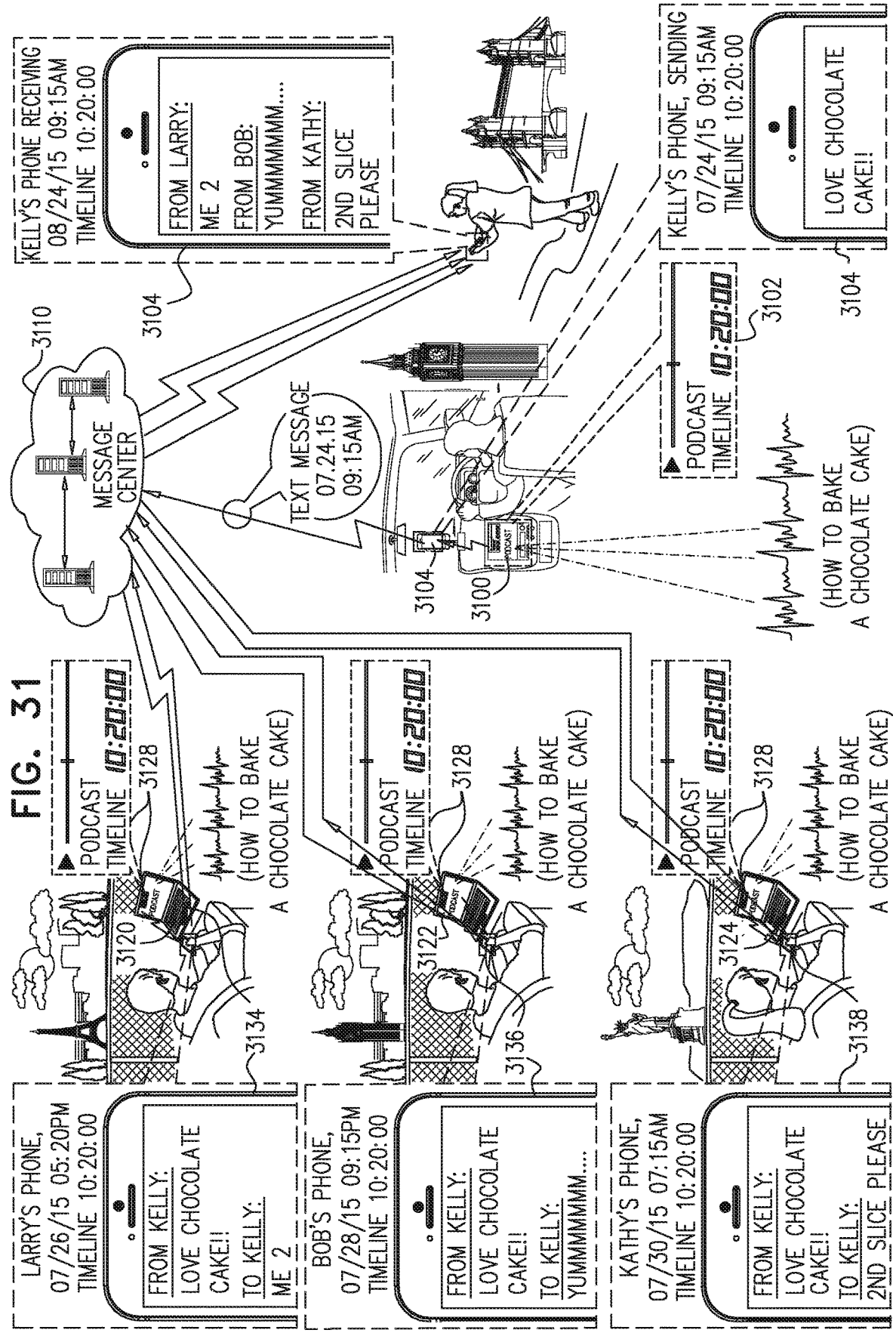
FIG. 31 is a simplified pictorial illustration of the operation of a method and system for associating messages with media during playing thereof in accordance with yet still another embodiment of the present invention.

Reference is now made to FIG. 31, which is a simplified pictorial illustration of the operation of a method and system for associating messages with media during playing thereof in accordance with yet another embodiment of the present invention.

As seen in FIG. 31, a first user, here designated as Kelly, is listening to podcast content on an audio playing device 3100. The podcast content is not typically broadcast at a fixed time, but typically is served to audio playing device 3100 at such time as the user wishes. The podcast content has a Content Specific Timeline (CST), which is independent of when in absolute time the content is being listened to and is solely a function of which audio frame of the content is being listened to. An optional display of the CST is designated by reference numeral 3102.

Typically, while listening to the podcast content on audio playing device 3100, Kelly is using a personal communicator 3104, such as a smartphone or alternatively a tablet or other suitable device, including an audio receiver which senses the podcast content. Kelly, upon listening to a cooking podcast is motivated to send a message, using her personal communicator 3104, here a text message "LOVE CHOCOLATE CAKE!!", commenting on the podcast content that she is currently listening to. In the illustrated embodiment, Kelly sends her text message at 9:15 AM on Jul. 24, 2015, London time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Kelly types the first letter of her text message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Kelly's message and is typically embedded therein, although it may not be visible to user recipients thereof.

Kelly's message, associated with the CST timestamp, is received by one or more servers, associated with memory, here collectively designated as message center 3110, and is preferably stored thereat.

As also seen in FIG. 31, second, third and fourth users, here designated respectively as Larry, Bob and Kathy, are listening to the same podcast content on respective audio playing devices 3120, 3122 and 3124. As noted above, the podcast content is not typically broadcast at a fixed time, but typically is served to audio playing devices 3120, 3122 and 3124 at such time as each user wishes. The podcast content has a Content Specific Timeline (CST), which is independent of when in absolute time the content is being listened to and is solely a function of which audio frame of the content is being listened to. An optional display of the CST is designated by reference numeral 3128 on each of audio playing devices 3120, 3122 and 3124.

It is appreciated that since the podcast content heard by Kelly, Larry, Bob and Kathy is the same, they all have an identical CST. In this case, Larry is listening to the content on Jul. 26, 2015 and reaches the CST timestamp associated with Kelly's earlier message at 5:20 PM, Paris time, on Jul. 26, 2015, Bob is listening to the content on Jul. 28, 2015 and reaches the CST timestamp associated with Kelly's earlier message at 9:15 PM, London time, on Jul. 28, 2015 and Kathy is listening to the content on Jul. 30, 2015 and reaches the CST timestamp associated with Kelly's earlier message at 7:15 AM, New York time, on Jul. 30, 2015

Typically, while listening to the podcast content on audio playing device 3120, Larry is holding a personal communicator 3134, such as a smartphone or alternatively a tablet or other suitable device, including an audio receiver which senses the podcast content. When Larry reaches the CST timestamp 10:20:00 in the podcast content that he is currently listening to and that Kelly listened to earlier, Larry receives, from message center 3110 to his personal communicator 3134, Kelly's text message that was earlier sent by Kelly at 9:15 AM, London time, on Jul. 24, 2015. He sees Kelly's message, here a text message "LOVE CHOCOLATE CAKE!!", at the point of time in the podcast content which is contextually associated with Kelly's message.

Typically, while listening to the podcast content on audio playing device 3122, Bob is holding a personal communicator 3136, such as a smartphone or alternatively a tablet or other suitable device, including an audio receiver which senses the podcast content. When Bob reaches the CST timestamp 10:20:00 in the podcast content that he is currently listening to and that Kelly listened to earlier, Bob receives, from message center 3110 to his personal communicator 3136, Kelly's text message that was earlier sent by Kelly at 9:15 AM, London time, on Jul. 24, 2015. He sees Kelly's message, here a text message "LOVE CHOCOLATE CAKE!!", at the point of time in the podcast content which is contextually associated with Kelly's message.

Typically, while listening to the podcast content on audio playing device 3124, Kathy is holding a personal communicator 3138, such as a smartphone or alternatively a tablet or other suitable device, including an audio receiver which senses the podcast content. When Kathy reaches the CST timestamp 10:20:00 in the podcast content that she is currently listening to and that Kelly listened to earlier, Kathy receives, from message center 3110 to her personal communicator 3138, Kelly's text message that was earlier sent by Kelly at 9:15 AM, London time, on Jul. 24, 2015. She sees Kelly's message, here a text message "LOVE CHOCOLATE CAKE!!", at the point of time in the podcast content which is contextually associated with Kelly's message.

Upon receiving Kelly's text message, Larry, Bob and Kathy choose to reply, in this example in text messages. Larry, Bob and Kathy can each reply upon receipt of Kelly's text message or at any later time. The replies are received by the message center 3110. Message center 3110 makes the replies available to Kelly, and preferably also to Larry, Bob and Kathy, immediately and makes the replies available for download, review and response in the future. Additionally or alternatively, the replies may be sent directly to each user's phone by conventional messaging applications.

Figure 32:
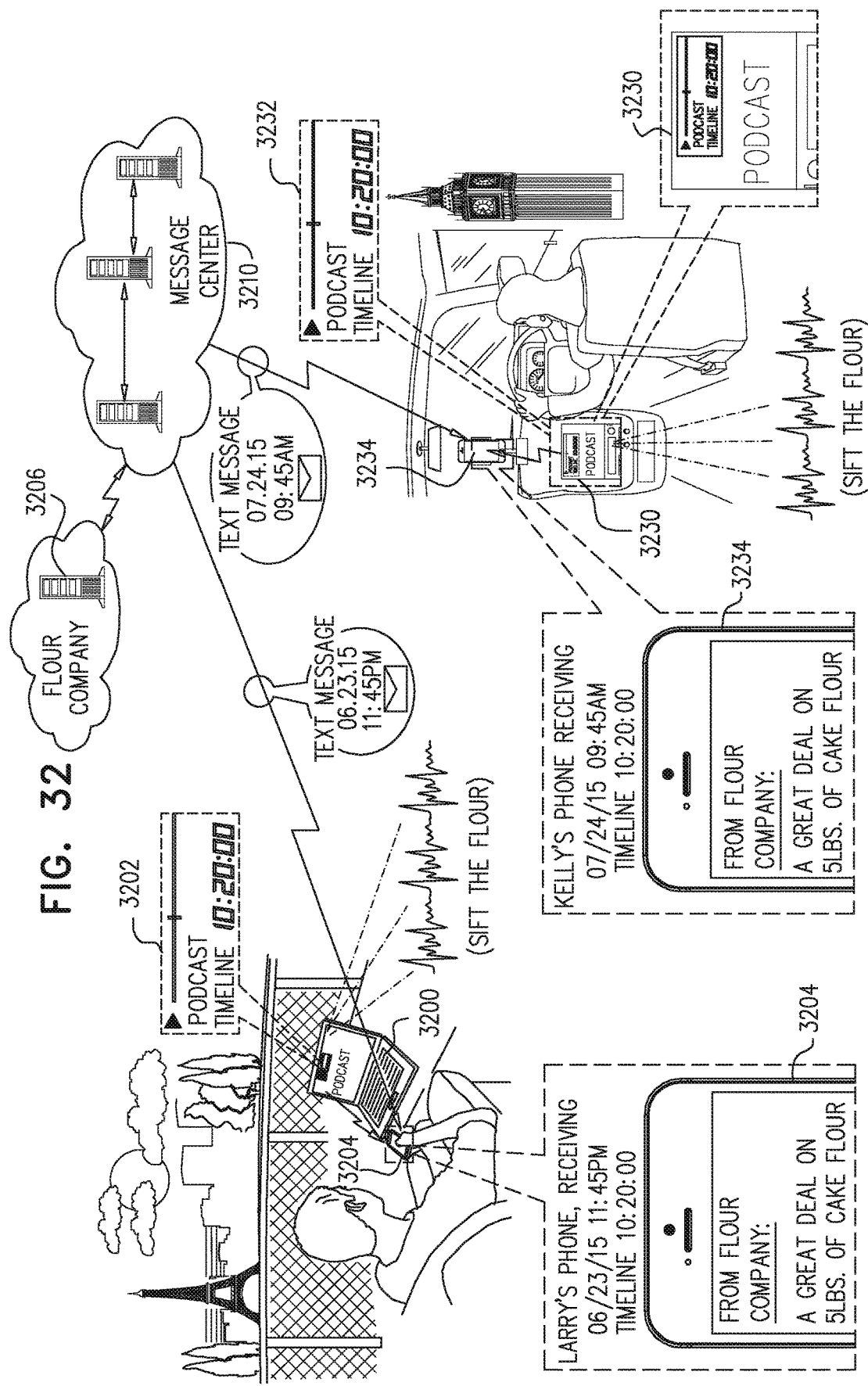
FIG. 32 is a simplified pictorial illustration of the operation of a method and system for associating messages with media during playing thereof in accordance with a further embodiment of the present invention.

Reference is now made to FIG. 32, which is a simplified pictorial illustration of the operation of a method and system for associating messages with media during playing thereof in accordance with yet another embodiment of the present invention.

As seen in FIG. 32, a first user, here designated as Larry, is listening to podcast content on an audio playing device 3200. The podcast content is not typically broadcast at a fixed time, but typically is served to audio playing device 3200 at such time as the user wishes. The podcast content has a Content Specific Timeline (CST), which is independent of when in absolute time the content is being listened to and is solely a function of which audio frame of the content is being listened to. An optional display of the CST is designated by reference numeral 3202.

Typically, while listening to the podcast content on audio playing device 3200, Larry is holding a personal communicator 3204, such as a smartphone or alternatively a tablet or other suitable device, including an audio receiver which senses the podcast content.

In accordance with a preferred embodiment of the present invention, server 3206 of a commercial entity, here a flour company, provides, to a message center 3210, a CST keyed feed indicating one or more CST timestamps at which a certain product, here unbranded flour, is mentioned in the podcast content. Server 3206 also provides an advertising message to be sent by the message center 3210 to personal communicators of users listening to the podcast content when they are at the specific CST timestamps and independently of the absolute time at which they are listening to the content.

As seen in FIG. 32, when Larry reaches a CST timestamp, such as 10:20:00 at which a frame of the podcast content is mentioning sifting of flour, he receives, from the message center 3210 to his personal communicator 3204, an advertising message, here "A GREAT DEAL ON 5 LBS. OF CAKE FLOUR".

As also seen in FIG. 32, a second user, here designated as Kelly, is listening to the same podcast content on an audio playing device 3230. As noted above, the podcast content is not typically broadcast at a fixed time, but typically is served to audio playing device 3230 at such time as the user wishes. The podcast content has a Content Specific Timeline (CST), which is independent of when in absolute time the content is being listened to and is solely a function of which audio frame of the content is being listened to. An optional display of the CST is designated by reference numeral 3232.

It is appreciated that since the podcast content heard by both Larry and Kelly is the same, they both have an identical CST.

Typically, while listening to the podcast content on audio playing device 3230, Kelly is using a personal communicator 3234, such as a smartphone or alternatively a tablet or other suitable device, including an audio receiver which senses the podcast content. When Kelly reaches the CST timestamp 10:20:00 in the podcast content that she is currently listening to, Kelly receives, from message center 3210 to her personal communicator 3234, the advertising message that was earlier sent to Larry. She also sees the advertising message at the point of time in the podcast content which is contextually associated with the advertising message.

Figure 33:
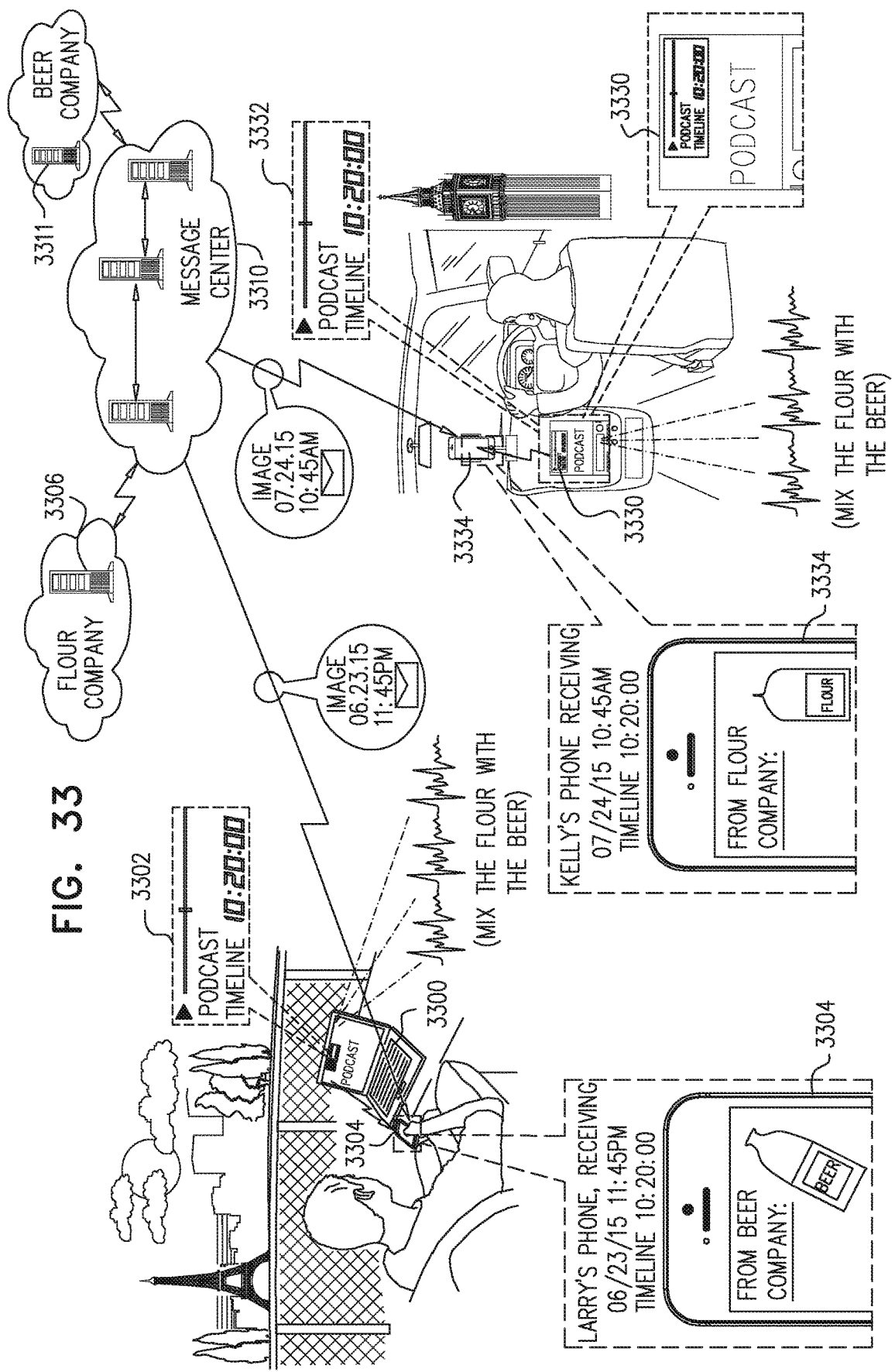
FIG. 33 is a simplified pictorial illustration of the operation of a method and system for associating messages with media during playing thereof in accordance with yet a further embodiment of the present invention.

Reference is now made to FIG. 33, which is a simplified pictorial illustration of the operation of a method and system for associating messages with media during playing thereof in accordance with yet another embodiment of the present invention.

As seen in FIG. 33, a first user, here designated as Larry, is listening to podcast content on an audio playing device 3300. The podcast content is not typically broadcast at a fixed time, but typically is served to audio playing device 3300 at such time as the user wishes. The podcast content has a Content Specific Timeline (CST), which is independent of when in absolute time the content is being listened to and is solely a function of which audio frame of the content is being listened to. An optional display of the CST is designated by reference numeral 3302.

Typically, while listening to the podcast content on audio playing device 3300, Larry is holding a personal communicator 3304, such as a smartphone or alternatively a tablet or other suitable device, including an audio receiver which senses the podcast content.

In accordance with a preferred embodiment of the present invention, a server 3306 of a commercial entity, here a flour company, provides, to a message center 3310, a CST keyed feed indicating one or more CST timestamps at which a certain product, here unbranded flour, is mentioned in the podcast content. Server 3306 also provides an advertising message to be sent by the message center 3310 to personal communicators of users listening to the podcast content when they are at the specific CST timestamps and independently of the absolute time at which they are listening to the content.

Further in accordance with a preferred embodiment of the present invention, server 3311 of another commercial entity, here a beer company, provides, to message center 3310, a CST keyed feed indicating one or more CST timestamps at which a certain product, here unbranded beer, is mentioned in the podcast content. Server 3311 also provides an advertising message to be sent by the message center 3310 to personal communicators of users listening to the podcast content when they are at the specific CST timestamps and independently of the absolute time at which they are listening to the content.

As seen in FIG. 33, when Larry reaches a CST timestamp, such as 10:20:00 at which a frame of the podcast content is mentioning both flour and beer, he receives, from the message center 3310 to his personal communicator 3304, an at least partially personalized advertising image message, here an image of a branded beer.

As also seen in FIG. 33, a second user, here designated as Kelly, is listening to the same podcast content on an audio playing device 3330. As noted above, the podcast content is not typically broadcast at a fixed time, but typically is served to audio playing device 3330 at such time as the user wishes. The podcast content has a Content Specific Timeline (CST), which is independent of when in absolute time the content is being listened to and is solely a function of which audio frame of the content is being listened to. An optional display of the CST is designated by reference numeral 3332.

It is appreciated that since the podcast content heard by both Larry and Kelly is the same, they both have an identical CST.

Typically, while listening to the podcast content on audio playing device 3330, Kelly is using a personal communicator 3334, such as a smartphone or alternatively a tablet or other suitable device, including an audio receiver which senses the podcast content. When Kelly reaches the CST timestamp 10:20:00 in the podcast content that she is currently listening to, Kelly receives, from message center 3310 to her personal communicator 3334, an at least partially personalized advertising image message, here an image of a bag of branded flour. She also sees the advertising message at the point of time in the podcast content which is contextually associated with the advertising message.

Figure 34:
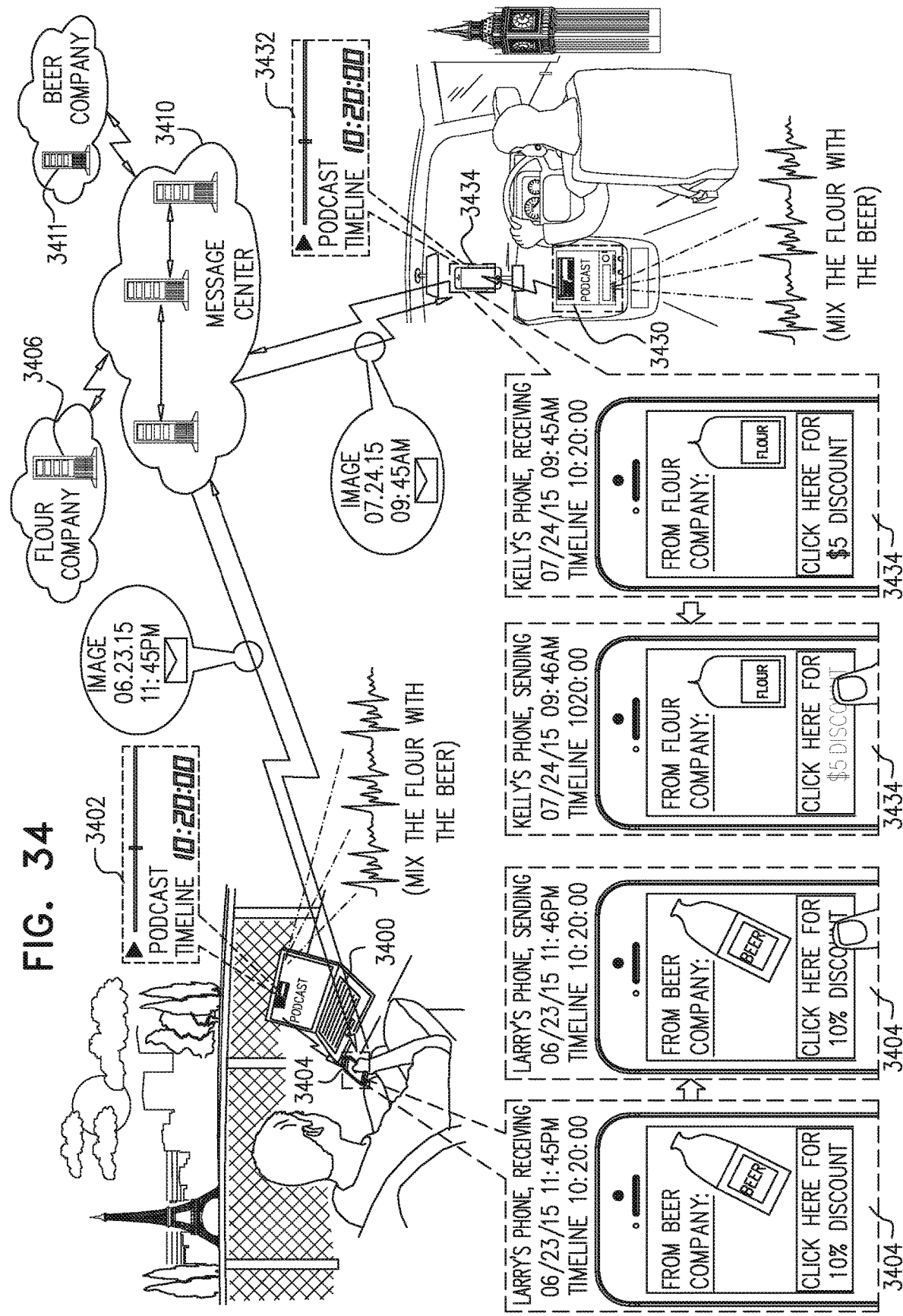
FIG. 34 is a simplified pictorial illustration of the operation of a method and system for associating messages with media during playing thereof in accordance with still a further embodiment of the present invention.

Reference is now made to FIG. 34, which is a simplified pictorial illustration of the operation of a method and system for associating messages with media during playing thereof in accordance with yet another embodiment of the present invention.

As seen in FIG. 34, a first user, here designated as Larry, is listening to podcast content on an audio playing device 3400. The podcast content is not typically broadcast at a fixed time, but typically is served to audio playing device 3400 at such time as the user wishes. The podcast content has a Content Specific Timeline (CST), which is independent of when in absolute time the content is being listened to and is solely a function of which audio frame of the content is being listened to. An optional display of the CST is designated by reference numeral 3402.

Typically, while listening to the podcast content on audio playing device 3400, Larry is holding a personal communicator 3404, such as a smartphone or alternatively a tablet or other suitable device, including an audio receiver which senses the podcast content.

In accordance with a preferred embodiment of the present invention, server 3406 of a commercial entity, here a flour company, provides, to a message center 3410, a CST keyed feed indicating one or more CST timestamps at which a certain product, here unbranded flour, is mentioned in the podcast content. Server 3406 also provides an advertising message to be sent by the message center 3410 to personal communicators of users listening to the podcast content when they are at the specific CST timestamps and independently of the absolute time at which they are listening to the content.

Further in accordance with a preferred embodiment of the present invention, server 3411 of another commercial entity, here a beer company, provides, to a message center 3410, a CST keyed feed indicating one or more CST timestamps at which a certain product, here unbranded beer, is mentioned in the podcast content. Server 3411 also provides an advertising message to be sent by the message center 3410 to personal communicators of users listening to the podcast content when they are at the specific CST timestamps and independently of the absolute time at which they are listening to the content.

As seen in FIG. 34, when Larry reaches a CST timestamp, such as 10:20:00 at which a frame of the podcast content is mentioning both flour and beer, he receives, from the message center 3410 to his personal communicator 3404, an at least partially personalized advertising image message, here an image of a branded beer.

As also seen in FIG. 34, a second user, here designated as Kelly, is listening to the same podcast content on an audio playing device 3430. As noted above, the podcast content is not typically broadcast at a fixed time, but typically is served to audio playing device 3430 at such time as the user wishes. The podcast content has a Content Specific Timeline (CST), which is independent of when in absolute time the content is being listened to and is solely a function of which audio frame of the content is being listened to. An optional display of the CST is designated by reference numeral 3432.

It is appreciated that since the podcast content heard by both Larry and Kelly is the same, they both have an identical CST.

Typically, while listening to the podcast content on audio playing device 3430, Kelly is using a personal communicator 3434, such as a smartphone or alternatively a tablet or other suitable device, including an audio receiver which senses the podcast content. When Kelly reaches the CST timestamp 10:20:00 in the podcast content that she is currently listening to, Kelly receives from message center 3410 to her personal communicator 3434 an at least partially personalized interactive text and image advertising message including an at least partially personalized offer relating to branded flour. It is noted that the offers to Larry and Kelly may be different resulting from various commercial considerations, such as considerations based on gender and/or socioeconomic profiles. Kelly also sees the advertising message at the point of time in the podcast content which is contextually associated with the advertising message.

Optionally, Kelly and Larry may elect to reply to the respective offers, via the message center 3410.

Figure 35:
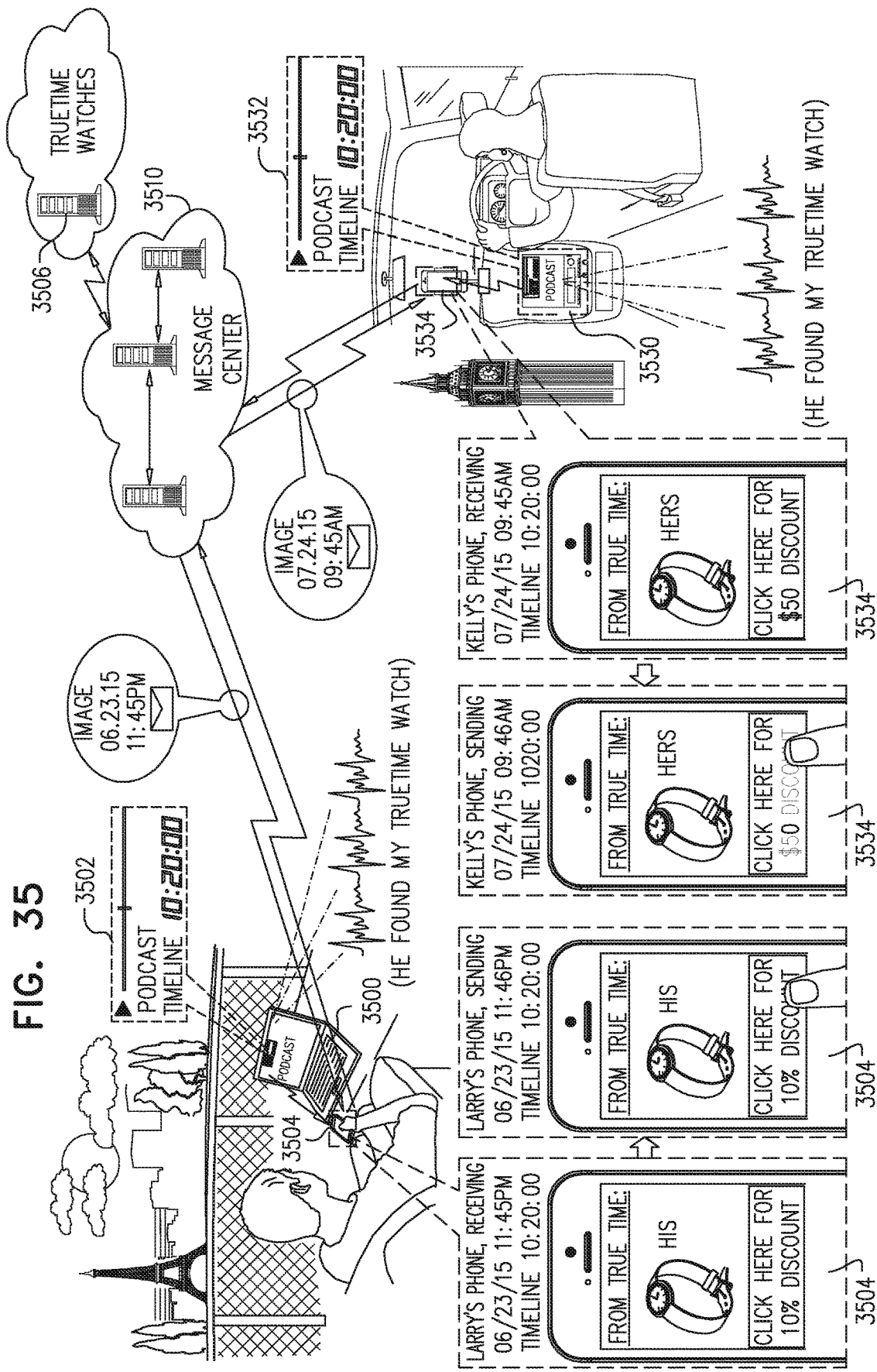
FIG. 35 is a simplified pictorial illustration of the operation of a method and system for associating messages with media during playing thereof in accordance with another embodiment of the present invention.

Reference is now made to FIG. 35, which is a simplified pictorial illustration of the operation of a method and system for associating messages with media during playing thereof in accordance with yet another embodiment of the present invention.

As seen in FIG. 35, a first user, here designated as Larry, is listening to podcast content on an audio playing device 3500. The podcast content is not typically broadcast at a fixed time, but typically is served to audio playing device 3500 at such time as the user wishes. The podcast content has a Content Specific Timeline (CST), which is independent of when in absolute time the content is being listened to and is solely a function of which audio frame of the content is being listened to. An optional display of the CST is designated by reference numeral 3502.

Typically, while listening to the podcast content on audio playing device 3500, Larry is holding a personal communicator 3504, such as a smartphone or alternatively a tablet or other suitable device, including an audio receiver which senses the podcast content.

In accordance with a preferred embodiment of the present invention, server 3506 of a commercial entity, here a watch company, provides, to a message center 3510, a CST keyed feed indicating one or more CST timestamps at which a certain product, here a branded watch, is mentioned in the podcast content, typically as a product placement. Server 3506 also provides an advertising message to be sent by the message center 3510 to personal communicators of users listening to the podcast content when they are at the specific CST timestamps and independently of the absolute time at which they are listening to the content.

As seen in FIG. 35, when Larry reaches a CST timestamp, such as 10:20:00 at which a frame of the podcast content is mentioning the branded watch, he receives, from the message center 3510 to his personal communicator 3504, an at least partially personalized interactive text and image advertising message including an at least partially personalized offer relating to a man's watch.

As also seen in FIG. 35, a second user, here designated as Kelly, is listening to the same podcast content on an audio playing device 3530. As noted above, the podcast content is not typically broadcast at a fixed time, but typically is served to audio playing device 3530 at such time as the user wishes. The podcast content has a Content Specific Timeline (CST), which is independent of when in absolute time the content is being listened to and is solely a function of which audio frame of the content is being listened to. An optional display of the CST is designated by reference numeral 3532.

It is appreciated that since the podcast content heard by both Larry and Kelly is the same, they both have an identical CST.

Typically, while listening to the podcast content on audio playing device 3530, Kelly is using a personal communicator 3534, such as a smartphone or alternatively a tablet or other suitable device, including an audio receiver which senses the podcast content. When Kelly reaches the CST timestamp 10:20:00 in the podcast content that she is currently listening to, Kelly receives, from message center 3510 to her personal communicator 3534, an at least partially personalized interactive text and image advertising message including an at least partially personalized offer relating to a woman's watch. It is noted that the offers to Larry and Kelly may be different resulting from various commercial considerations, such as considerations based on gender and/or socioeconomic profiles. Kelly also sees the advertising message at the point of time in the podcast content which is contextually associated with the advertising message.

Optionally, Kelly and Larry may elect to reply to the respective offers, via the message center 3510.

Figure 36:
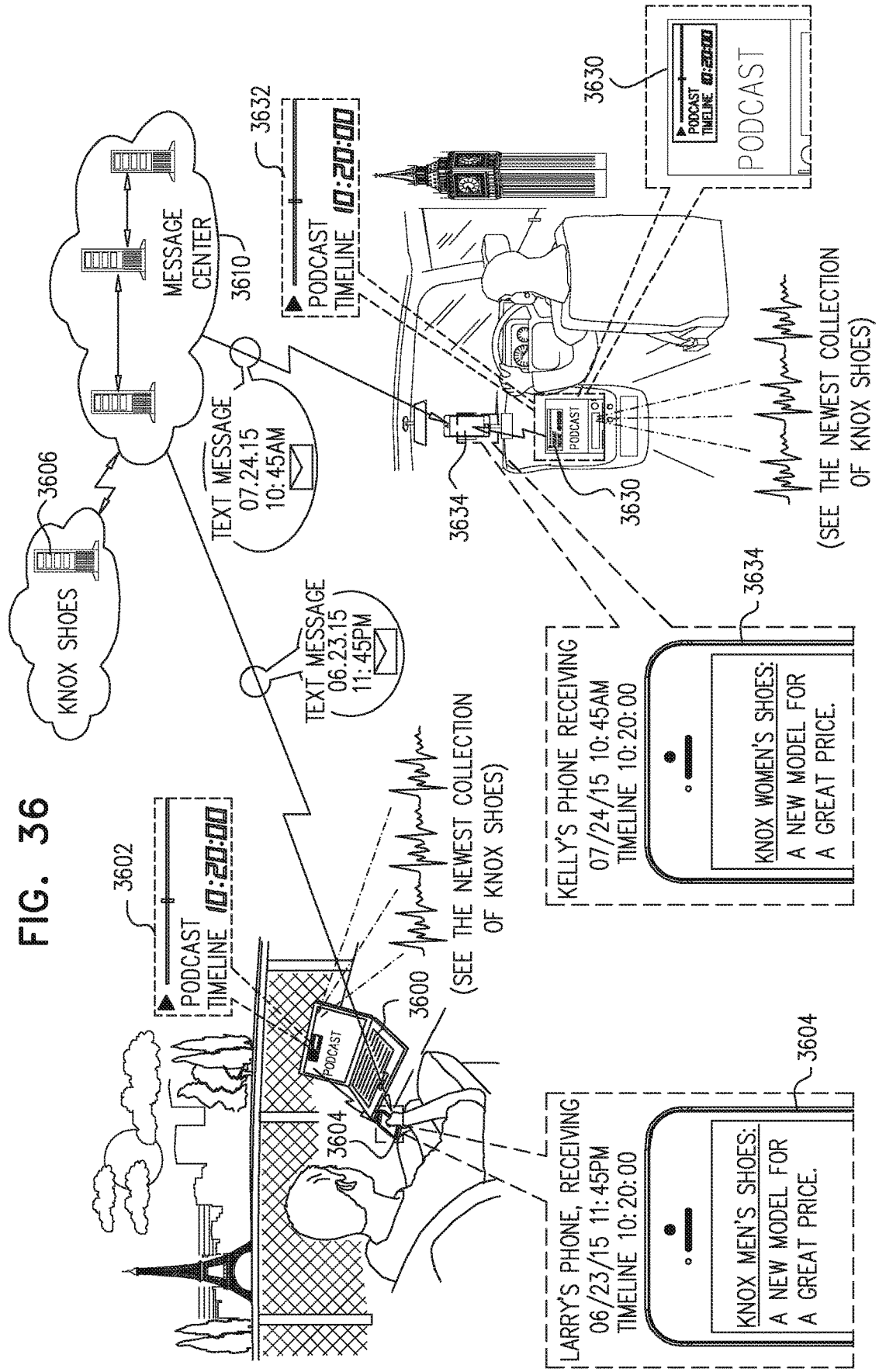
FIG. 36 is a simplified pictorial illustration of the operation of a method and system for associating messages with media during playing thereof in accordance with yet another embodiment of the present invention.

Reference is now made to FIG. 36, which is a simplified pictorial illustration of the operation of a method and system for associating messages with media during playing thereof in accordance with yet another embodiment of the present invention.

As seen in FIG. 36, a first user, here designated as Larry, is listening to podcast content, in this case including a commercial message, on an audio playing device 3600. The podcast content is not typically broadcast at a fixed time, but typically is served to audio playing device 3600 at such time as the user wishes. The podcast content has a Content Specific Timeline (CST), which is independent of when in absolute time the content is being listened to and is solely a function of which audio frame of the content is being listened to. An optional display of the CST is designated by reference numeral 3602.

Typically, while listening to the podcast content on audio playing device 3600, Larry is holding a personal communicator 3604, such as a smartphone or alternatively a tablet or other suitable device, including an audio receiver which senses the podcast content.

In accordance with a preferred embodiment of the present invention, a server 3606 of a commercial entity, here a shoe company, provides, to a message center 3610, a CST keyed feed indicating one or more CST timestamps at which a certain commercial message, here for shoes, is heard in the podcast content. Server 3606 also provides an at least partially personalized supplementary advertising message to be sent by the message center 3610 to personal communicators of users listening to the podcast content when they are at the specific CST timestamps and independently of the absolute time at which they are listening to the content.

As seen in FIG. 36, when Larry reaches a CST timestamp, such as 10:20:00 at which a frame of the podcast content is part of a shoe commercial, he receives, from the message center 3610 to his personal communicator 3604, an at least partially personalized supplemental advertising message, here a text message related to men's shoes.

As also seen in FIG. 36, a second user, here designated as Kelly, is listening to the same podcast content on an audio playing device 3630. As noted above, the podcast content is not typically broadcast at a fixed time, but typically is served to audio playing device 3630 at such time as the user wishes. The podcast content has a Content Specific Timeline (CST), which is independent of when in absolute time the content is being listened to and is solely a function of which audio frame of the content is being listened to. An optional display of the CST is designated by reference numeral 3632.

It is appreciated that since the podcast content heard by both Larry and Kelly is the same, they both have an identical CST.

Typically, while listening to the podcast content on audio playing device 3630, Kelly is using a personal communicator 3634, such as a smartphone or alternatively a tablet or other suitable device, including an audio receiver which senses the podcast content. When Kelly reaches the CST timestamp 10:20:00 in the podcast content that she is currently listening to, Kelly receives, from message center 3610 to her personal communicator 3634, an at least partially personalized advertising message, here a text message related to women's shoes. She also sees the advertising message at the point of time in the podcast content which is contextually associated with the advertising message.

Figure 37:
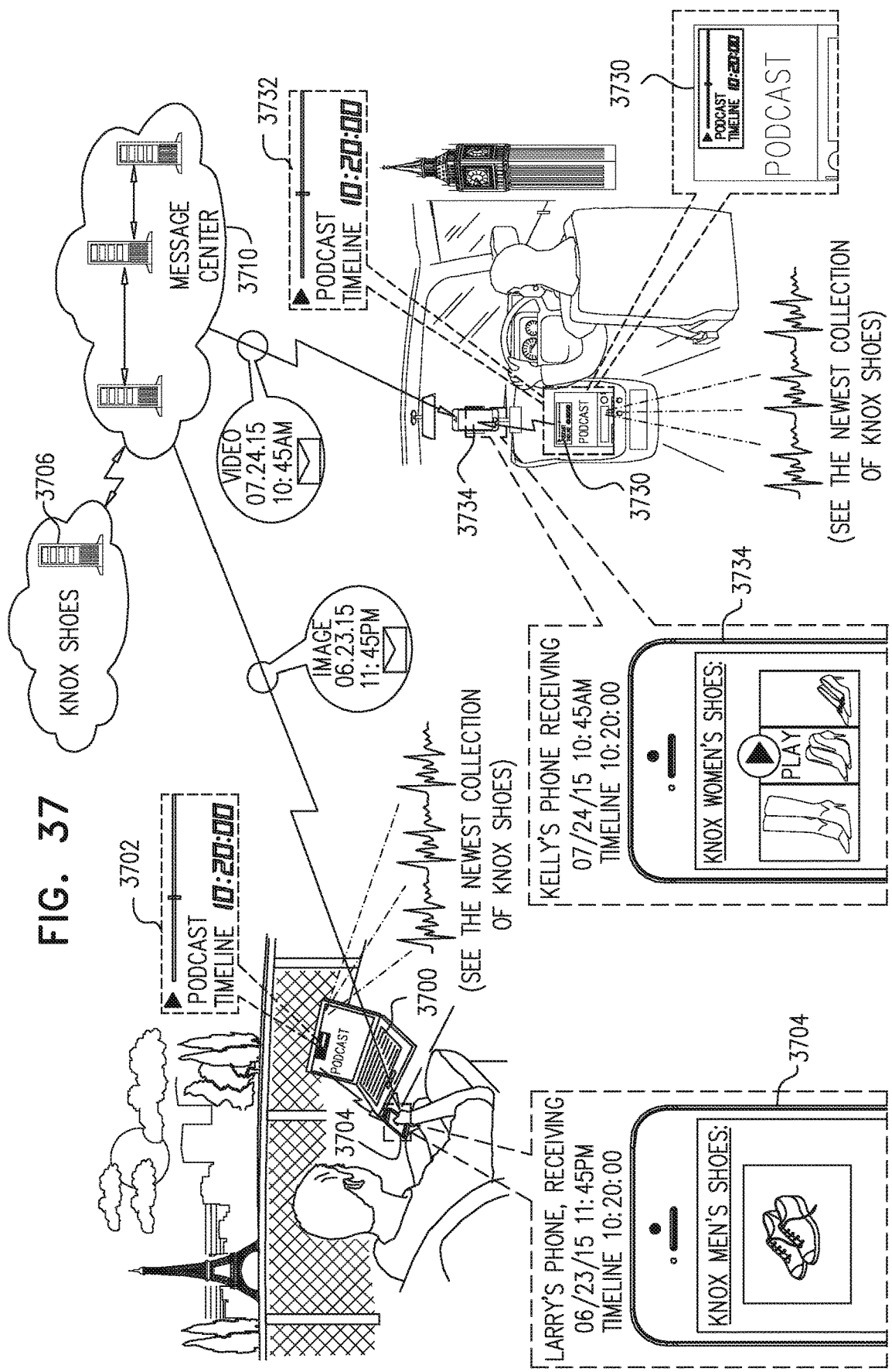
FIG. 37 is a simplified pictorial illustration of the operation of a method and system for associating messages with media during playing thereof in accordance with still another embodiment of the present invention.

Reference is now made to FIG. 37, which is a simplified pictorial illustration of the operation of a method and system for associating messages with media during playing thereof in accordance with yet another embodiment of the present invention.

As seen in FIG. 37, a first user, here designated as Larry, is listening to podcast content, in this case including a commercial message, on an audio playing device 3700. The podcast content is not typically broadcast at a fixed time, but typically is served to audio playing device 3700 at such time as the user wishes. The podcast content has a Content Specific Timeline (CST), which is independent of when in absolute time the content is being listened to and is solely a function of which audio frame of the content is being listened to. An optional display of the CST is designated by reference numeral 3702.

Typically, while listening to the podcast content on audio playing device 3700, Larry is holding a personal communicator 3704, such as a smartphone or alternatively a tablet or other suitable device, including an audio receiver which senses the podcast content.

In accordance with a preferred embodiment of the present invention, a server 3706 of a commercial entity, here a shoe company, provides, to a message center 3710, a CST keyed feed from indicating one or more CST timestamps at which a certain commercial message, here for shoes, is heard in the podcast content. Server 3706 also provides an at least partially personalized supplementary advertising message to be sent by the message center 3710 to personal communicators of users listening to the podcast content when they are at the specific CST timestamps and independently of the absolute time at which they are listening to the content.

As seen in FIG. 37, when Larry reaches a CST timestamp, such as 10:20:00 at which a frame of the podcast content is part of a shoe commercial, he receives, from the message center 3710 to his personal communicator 3704, an at least partially personalized supplemental advertising message, here a text and image message related to men's shoes.

As also seen in FIG. 37, a second user, here designated as Kelly, is listening to the same podcast content on an audio playing device 3730. As noted above, the podcast content is not typically broadcast at a fixed time, but typically is served to audio playing device 3730 at such time as the user wishes. The podcast content has a Content Specific Timeline (CST), which is independent of when in absolute time the content is being listened to and is solely a function of which audio frame of the content is being listened to. An optional display of the CST is designated by reference numeral 3732.

It is appreciated that since the podcast content heard by both Larry and Kelly is the same, they both have an identical CST.

Typically, while listening to the podcast content on audio playing device 3730, Kelly is using a personal communicator 3734, such as a smartphone or alternatively a tablet or other suitable device, including an audio receiver which senses the podcast content. When Kelly reaches the CST timestamp 10:20:00 in the podcast content that she is currently listening to, Kelly receives, from message center 3710 to her personal communicator 3734, an at least partially personalized supplemental advertising message, here a text and video message related to women's shoes. She also sees the supplemental advertising message at the point of time in the podcast content which is contextually associated with the advertising message.

Figure 38:
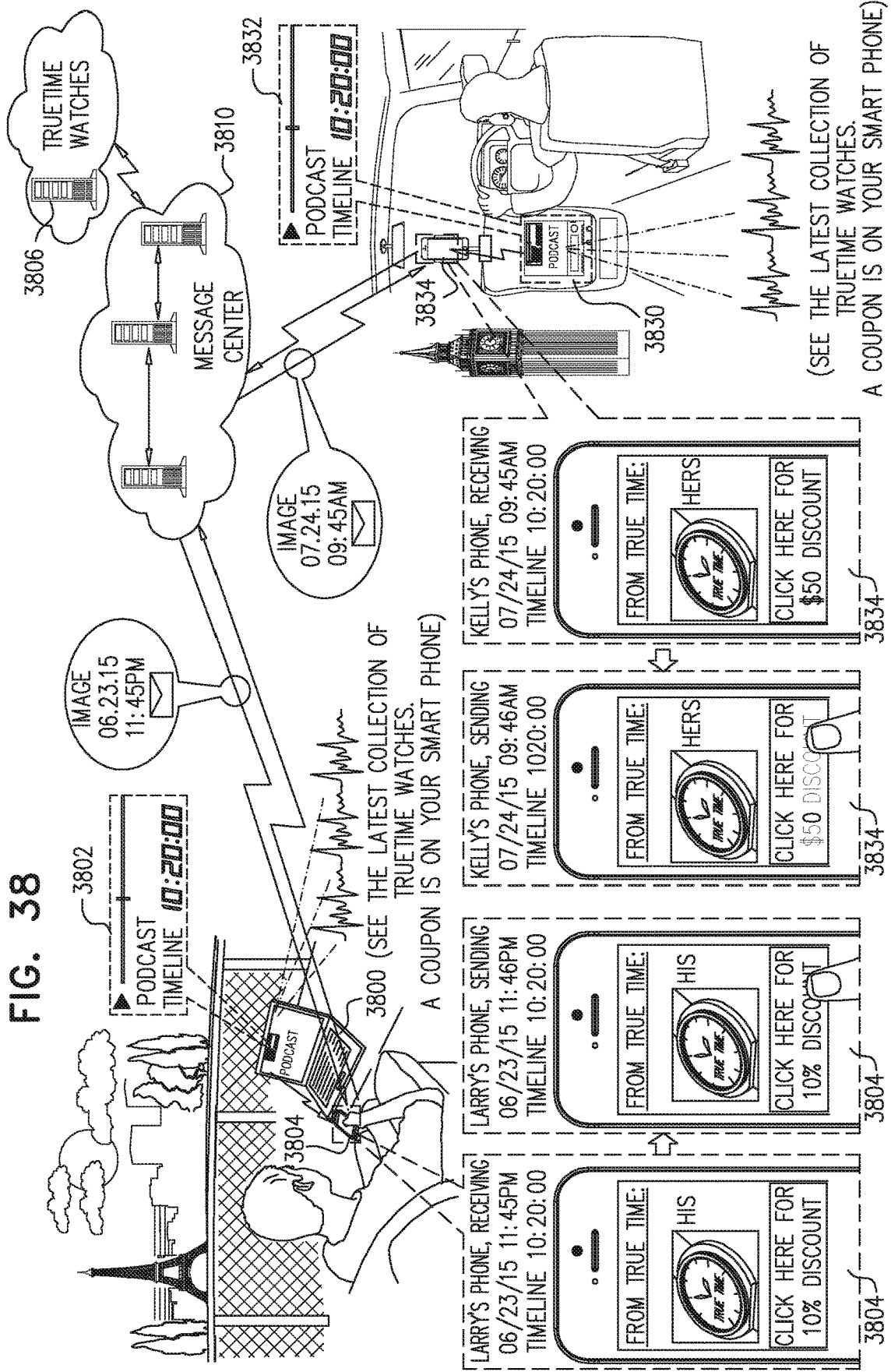
FIG. 38 is a simplified pictorial illustration of the operation of a method and system for associating messages with media during playing thereof in accordance with a further embodiment of the present invention.

Reference is now made to FIG. 38, which is a simplified pictorial illustration of the operation of a method and system for associating messages with media during playing thereof in accordance with yet another embodiment of the present invention.

As seen in FIG. 38, a first user, here designated as Larry, is listening to podcast content on an audio playing device 3800. The podcast content is not typically broadcast at a fixed time, but typically is served to audio playing device 3800 at such time as the user wishes. The podcast content has a Content Specific Timeline (CST), which is independent of when in absolute time the content is being listened to and is solely a function of which audio frame of the content is being listened to. An optional display of the CST is designated by reference numeral 3802.

Typically, while listening to the podcast content on audio playing device 3800, Larry is holding a personal communicator 3804, such as a smartphone or alternatively a tablet or other suitable device, including an audio receiver which senses the podcast content.

In accordance with a preferred embodiment of the present invention, server 3806 of a commercial entity, here a watch company, provides, to a message center 3810, a CST keyed feed indicating one or more CST timestamps at which a commercial for a certain product, here a watch, is mentioned in the podcast content, typically as a product placement. Server 3806 also provides a supplemental interactive advertising message to be sent by the message center 3810 to personal communicators of users listening to the podcast content when they are at the specific CST timestamps and independently of the absolute time at which they are listening to the content.

As seen in FIG. 38, when John reaches a CST timestamp, such as 10:20:00, at which a frame of the podcast content is part a shoe commercial, he receives, from the message center 3810 to his personal communicator 3804, an at least partially personalized interactive text and image advertising message including an at least partially personalized offer relating to a man's watch.

As also seen in FIG. 38, a second user, here designated as Kelly, is listening to the same podcast content on an audio playing device 3830. As noted above, the podcast content is not typically broadcast at a fixed time, but typically is served to audio playing device 3830 at such time as the user wishes. The podcast content has a Content Specific Timeline (CST), which is independent of when in absolute time the content is being listened to and is solely a function of which audio frame of the content is being listened to. An optional display of the CST is designated by reference numeral 3832.

It is appreciated that since the portions of the podcast content heard by both Larry and Kelly are the same, they both have an identical CST.

Typically, while listening to the podcast content on audio playing device 3830, Kelly is using a personal communicator 3834, such as a smartphone or alternatively a tablet or other suitable device, including an audio receiver which senses the podcast content. When Kelly reaches the CST timestamp 10:20:00 in the podcast content that she is currently listening to, Kelly receives, from message center 3810 to her personal communicator 3834, an at least partially personalized interactive text and image advertising message including an at least partially personalized offer relating to a woman's watch. It is noted that the offers to Larry and Kelly may be different resulting from various commercial considerations, such as considerations based on gender and/or socioeconomic profiles. Kelly also sees the advertising message at the point of time in the podcast content which is contextually associated with the advertising message.

Optionally, Kelly and Larry may elect to reply to the respective offers, via the message center 3810.

Figure 39:
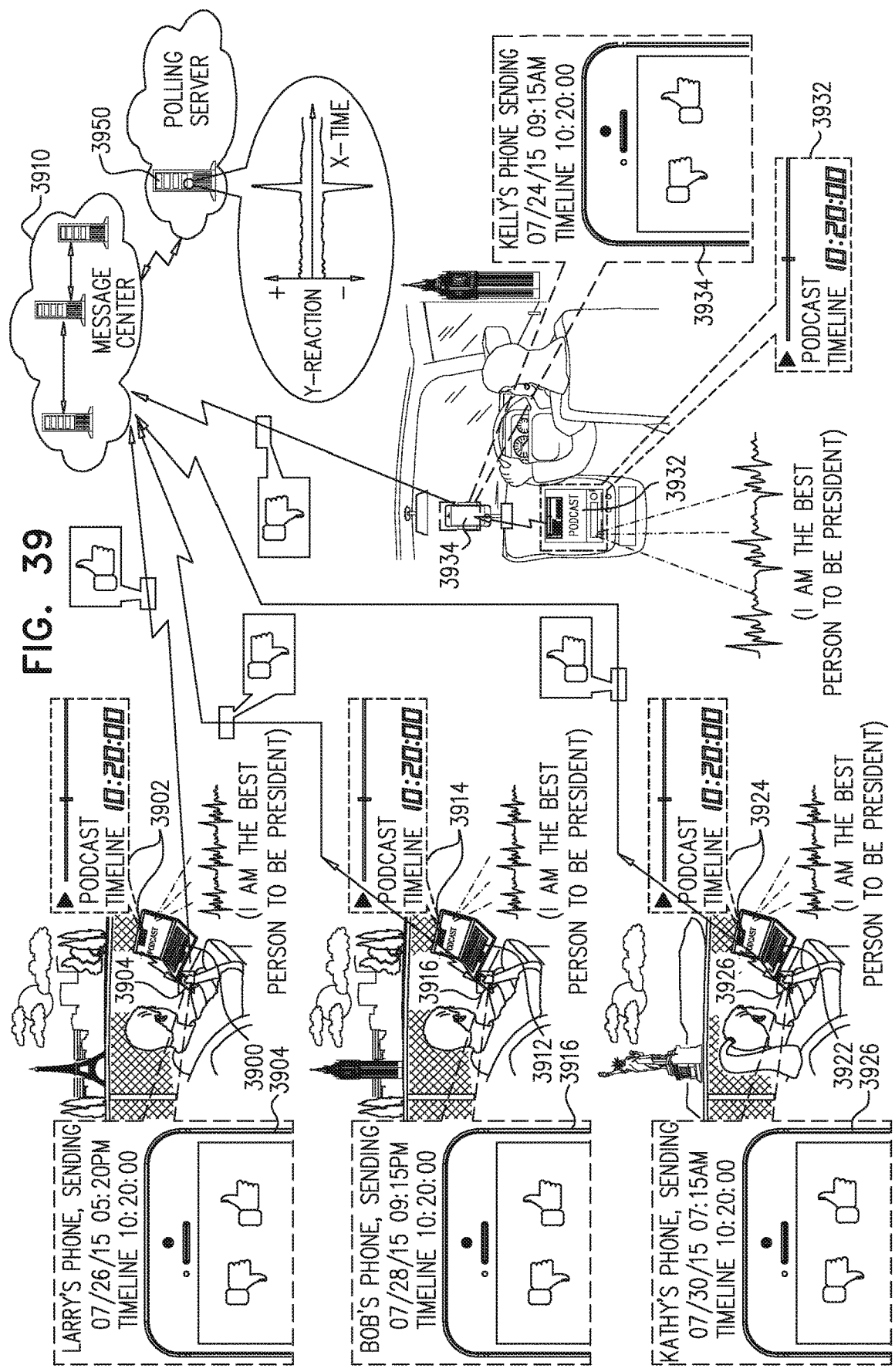
FIG. 39 is a simplified pictorial illustration of the operation of a method and system for associating messages with media during playing thereof in accordance with yet a further embodiment of the present invention.

Reference is now made to FIG. 39, which is a simplified pictorial illustration of the operation of a method and system for associating messages with media during playing thereof in accordance with a further embodiment of the present invention.

As seen in FIG. 39, a first user, here designated as Larry, is listening to podcast content on an audio playing device 3900. The podcast content is not typically broadcast at a fixed time, but typically is served to audio playing device 3900 at such time as the user wishes. The podcast content has a Content Specific Timeline (CST), which is independent of when in absolute time the content is being listened to and is solely a function of which audio frame of the content is being listened to. An optional display of the CST is designated by reference numeral 3902.

Typically, while listening to the podcast content on audio playing device 3900, Larry is holding a personal communicator 3904, such as a smartphone or alternatively a tablet or other suitable device, including an audio receiver which senses the podcast content. Larry, upon listening to a portion of the podcast content at CST timestamp 10:20:00 is motivated to send a message, using his personal communicator 3904, here a thumbs up message commenting on the podcast content that he is currently listening to. In the illustrated embodiment, Larry sends his message at 5:20 PM on Jul. 26, 2015, Paris time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Larry initiates his message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Larry's message and is typically embedded therein.

Larry's message, associated with the CST timestamp, is received by one or more servers, associated with memory, here collectively designated as message center 3910, and is preferably stored thereat.

A second user, here designated as Bob, is listening to podcast content on an audio playing device 3912. The podcast content is not typically broadcast at a fixed time, but typically is served to audio playing device 3912 at such time as the user wishes. The podcast content has a Content Specific Timeline (CST), which is independent of when in absolute time the content is being listened to and is solely a function of which audio frame of the content is being listened to. An optional display of the CST is designated by reference numeral 3914.

Typically, while listening to the podcast content on audio playing device 3912, Bob is holding a personal communicator 3916, such as a smartphone or alternatively a tablet or other suitable device, including an audio receiver which senses the podcast content. Bob, upon listening to a portion of the podcast content at CST timestamp 10:20:00 is motivated to send a message, using his personal communicator 3916, here a thumbs down message commenting on the podcast content that he is currently listening to. In the illustrated embodiment, Bob sends his message at 9:15 PM on Jul. 28, 2015, London time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Bob initiates his message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Bob's message and is typically embedded therein.

Bob's message, associated with the CST timestamp, is received by message center 3910 and is preferably stored thereat.

A third user, here designated as Kathy, is listening to podcast content on an audio playing device 3922. The podcast content is not typically broadcast at a fixed time, but typically is served to audio playing device 3922 at such time as the user wishes. The podcast content has a Content Specific Timeline (CST), which is independent of when in absolute time the content is being listened to and is solely a function of which audio frame of the content is being listened to. An optional display of the CST is designated by reference numeral 3924.

Typically, while listening to the podcast content on audio playing device 3922, Kathy is holding a personal communicator 3926, such as a smartphone or alternatively a tablet or other suitable device, including an audio receiver which senses the podcast content. Kathy, upon listening to a portion of the podcast content at CST timestamp 10:20:00 is motivated to send a message, using her personal communicator 3926, here a thumbs up message commenting on the podcast content that she is currently listening to. In the illustrated embodiment, Kathy sends her image message at 7:15 AM on Jul. 30, 2015, New York time, with a CST timestamp of 10:20:00. It is appreciated that the CST timestamp is content specific and specific to a given frame in the specific content. It is appreciated that the content need not be stored.

In accordance with a preferred embodiment of the present invention, the CST timestamp references the frame in the podcast content which is heard at the time that Kathy initiates her message. Alternatively, the CST timestamp references the frame being played at the time that the message is actually sent. As a further alternative, the CST timestamp may reference any other suitable frame in the podcast content which reflects the context of the message.

It is a particular feature of an embodiment of the present invention that the CST timestamp is associated with Kathy's message and is typically embedded therein, although it may not be visible to user recipients thereof.

Kathy's message, associated with the CST timestamp, is received by message center 3910 and is preferably stored thereat.

As also seen in FIG. 39, a fourth user, here designated as Kelly, is listening to the same podcast content on an audio playing device 3930. As noted above, the podcast content is not typically broadcast at a fixed time, but typically is served to audio playing device 3930 at such time as the user wishes. The podcast content has a Content Specific Timeline (CST), which is independent of when in absolute time the content is being listened to and is solely a function of which audio frame of the content is being listened to. An optional display of the CST is designated by reference numeral 3932.

Typically, while listening to the podcast content on audio playing device 3930, Kelly is using a personal communicator 3934, such as a smartphone or alternatively a tablet or other suitable device, including an audio receiver which senses the podcast content. When Kelly reaches the CST timestamp 10:20:00 in the podcast content that she is currently listening to and that Larry, Bob and Kathy listened to earlier, Kelly upon listening to a portion of the podcast content at CST timestamp 10:20:00 is motivated to send a message, using her personal communicator 3934, here a thumbs down message commenting on the podcast content that she is currently listening to.

A polling server 3950 communicating with the message center 3910 compiles the viewer reactions represented by the various messages and provides a CST timestamp specific report of viewer reactions to the podcast content.

A preferred embodiment of technology which underlies the methodologies described hereinabove will now be described in detail with reference to FIGS. 40-42.

Figure 40:
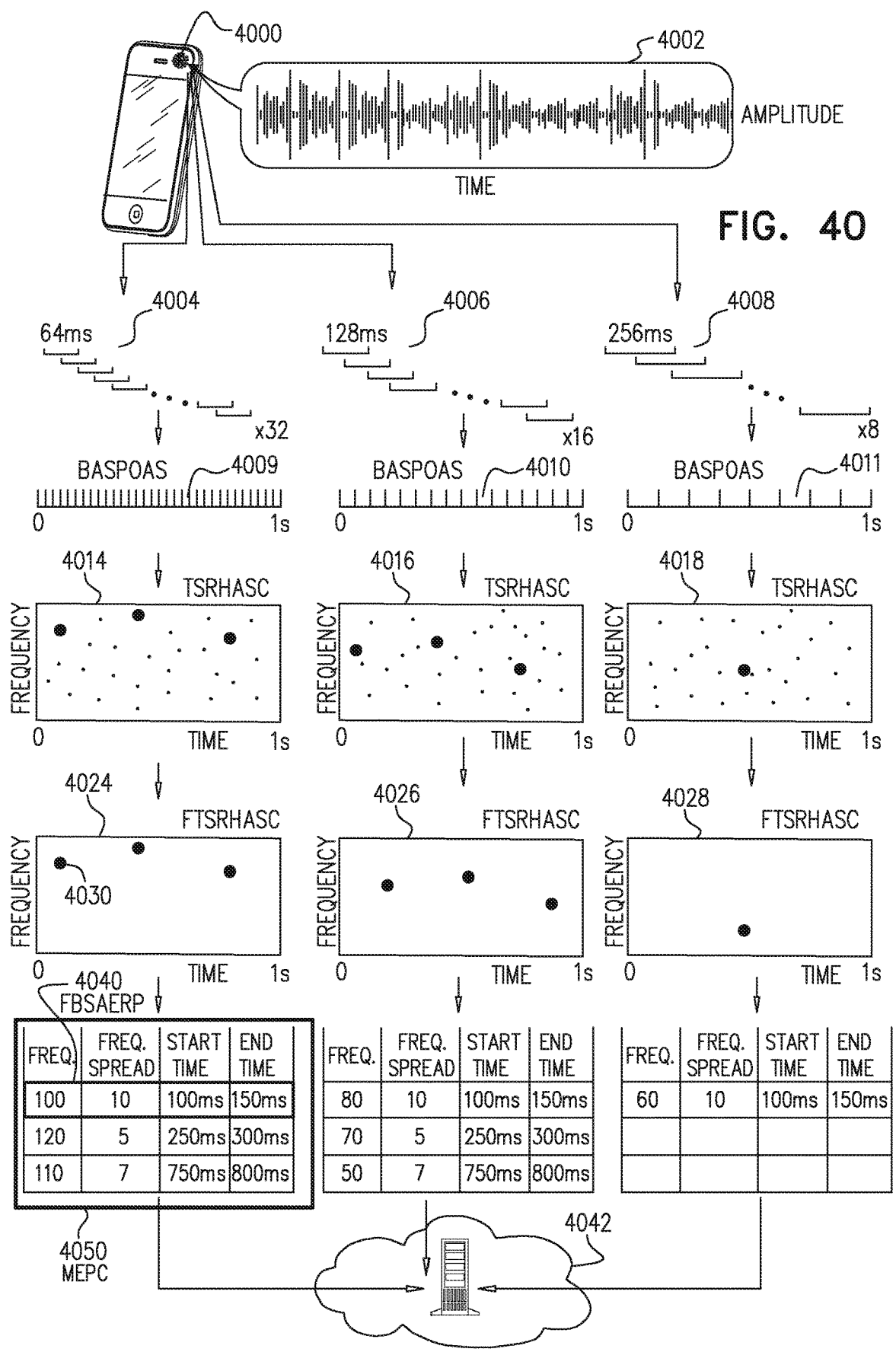
FIG. 40 is a simplified illustration of the technology for creation of time synchronization timelines used in the present invention.

Reference is made initially to FIG. 40, which illustrates the technology for creation of time synchronization timelines, such as CSTs. In the embodiments of FIGS. 1-5 & 9, John is watching media, in this case a television show, having audio content. A microphone 4000, typically incorporated in John's personal communicator, picks up ambient audio information during playing of the media by John. John's Microphone Timeline begins at the instant that the microphone 4000 begins to output the ambient audio information.

The ambient audio information includes the audio content of the media as well as typically other ambient audio contents, such as sounds of people speaking, the doorbell ringing and John's baby crying in the vicinity. A simplified amplitude vs. time representation of the ambient audio information picked up by microphone 4000 is indicated by reference numeral 4002.

Preferably, conventional software, which typically resides on the personal communicator, causes the microphone 4000 to produce a digital output having a sampling rate of 8000 samples per second.

It is a particular feature of a preferred embodiment of the present invention that the digitally sampled ambient audio information 4002, picked up by microphone 4000, is processed in a plurality of multiplicities of partially overlapping audio segments of different lengths. In a preferred example, one multiplicity of partially overlapping audio segments includes segments 4004, each of length 64 msecs, a second multiplicity of partially overlapping audio segments includes segments 4006 of length 128 msecs and a third multiplicity of partially overlapping audio segments includes segments 4008 of length 256 msecs. Preferably, the extent of overlap is 50%.

Preferably, each multiplicity of partially overlapping audio segments is supplied to a separate buffer. In the present example the multiplicity of partially overlapping audio segments including segments 4004 of length 64 msecs is supplied to a buffer 4009, the multiplicity of partially overlapping audio segments including segments 4006 of length 128 msecs is supplied to a buffer 4010 and the multiplicity of partially overlapping audio segments including segments 4008 of length 256 msecs is supplied to a buffer 4011. Each buffer preferably temporarily retains one second's worth of partially overlapping audio segments, which is termed a Buffered Aggregated Series of Partially Overlapping Audio Segments (BASPOAS), each BASPOAS being identified in FIG. 40 by the reference numeral of the buffer in which it is stored.

It is a further particular feature of a preferred embodiment of the present invention that each BASPOAS, corresponding to one of the multiplicities of partially overlapping audio segments 4004, 4006 and 4008, is separately subject to time-based spectral analysis. Preferably, the time-based spectral analysis employs a short time Fourier transform which produces a Time-Specific Representation of High Amplitude Spectral Components (TSRHASC) in each BASPOAS. Representative time-specific representations of high amplitude spectral components (TSRHASCs) for partially overlapping audio segments 4004, 4006 and 4008 are shown respectively at reference numerals 4014, 4016 and 4018.

Preferably, the TSRHASCs 4014, 4016 and 4018 are high pass filtered to attenuate audio information at frequencies below approximately 30 Hz. The corresponding Filtered Time-Specific Representations, here termed FTSRHASCs, are shown at reference numerals 4024, 4026 and 4028.

It is appreciated that the time-based spectral analysis of a plurality of multiplicities of partially overlapping audio segments of different lengths provides High Frequency Resolution Time-Specific Representations of High Amplitude Spectral Components (HFRTSRHASCs) 4030, also termed media elements, for a plurality of frequency bands within a frequency range picked up by the microphone 4000. Typically, the microphone outputs ambient audio information 4002 within a frequency range of 0-4000 Hz and the processing of three multiplicities of partially overlapping audio segments of three different lengths, namely 32, 64 and 128 msecs, provides HFRTSRHASCs 4030 in partially overlapping frequency bands of 32-4000 Hz, 16-4000 Hz and 8-4000 Hz.

In accordance with a preferred embodiment of the present invention the following parameters preferably are recorded for each of the media elements (HFRTSRHASCs) 4030:

central frequency;
frequency spread;
start time on John's viewing timeline; and
end time on John's viewing timeline.

Optionally, amplitude of the audio event may also be recorded. Typically, occurrences having multiple frequency components, such as gunshots, screams, screeching tires and dogs barking will appear as multiple events. The recorded parameters for each of the HFRTSRHASC 4030, also termed media elements, are here termed Frequency Band Specific Audio Event Recorded Parameters (FBSAERP) 4040.

Preferably, once per second the above-described recorded parameters (FBSAERP) for each of the events for each of the multiplicities are separately sent to server 4042 which separately attempts to match the parameters of the events for each multiplicity separately to an existing event parameter collection which is stored in a database on server 4042. The parameter collection includes a plurality of Media Element Parameter Collections (MEPCs) 4050 corresponding to various media content, such as movies, television shows, concerts, podcasts, sporting events and speeches. Preferably there are three MEPCs, one for each frequency band of interest for each separate item of media content.

It is thus appreciated that the matching function is preferably carried out separately for each frequency band of interest. Thus, three MEPCs are stored for each media content.

It is further appreciated that for the multiplicity of partially overlapping audio segments including segments 4004 of length 64 msecs, the matching is carried out over 32 partially overlapping audio segments. Correspondingly, for the multiplicity of partially overlapping audio segments including segments 4006 of length 128 msecs, the matching is carried out over 16 partially overlapping audio segments and for the multiplicity of partially overlapping audio segments including segments 4006 of length 256 msecs, the matching is carried out over 8 partially overlapping audio segments.

Matching is preferably carried out in the following manner:

Separately for each frequency band of interest, an initial result is obtained indicating how many MEPCs contain an FBSAERP which is identical to the FBSAERP which is output by a given buffer. This initial result preferably takes the form of three MEPC tables, each corresponding to a frequency band of interest. Each of the MEPC tables preferably contains an identifier of each MEPC that contains at least one FBSAERP which is identical to an FBSAERP which is output by a given buffer and a matching score indicating how many different FBSAERPs which are identical to an FBSAERP which is output by a given buffer are contained in each MEPC.

For each frequency band of interest, a difference in the matching scores between the MEPC having the highest matching score and the MEPC having the second highest matching score is measured against a threshold. Preferably, if the difference in the matching scores between the MEPC having the highest matching score and the MEPC having the second highest matching score is equal to or greater than a predetermined threshold, such as 20, for at least one frequency band of interest, a successful match exists.

If a successful match is not yet found to exist, typically because the difference in the matching scores between the MEPC having the highest matching score and the MEPC having the second highest matching score is less than the predetermined threshold for all of the frequency bands of interest, the foregoing attempted matching process takes place again, typically, when an additional one second's worth of partially overlapping audio segments, which is termed a Buffered Aggregated Series of Partially Overlapping Audio Segments (BASPOAS), is output from each of the three buffers. This step is repeated for subsequent BASPOASs until a successful match is found to exist or when no further BASPOAS is output by the buffers. Each time the step is repeated, the matching scores are incremented based on matching of the additional BASPOASs.

If ultimately a successful match is not found, all of the FBSAERPs are compiled in a manner which retains their precise time sequence as a new MEPC for each frequency band of interest and are stored in the database of server 4042.

If ultimately a single successful match is found, this means that an earlier MEPC having an identical identifier already exists in the database, based on inputs received from a microphone of an earlier user. In such a case, the MEPC based on inputs from John's microphone is given the same identifier as that of the MEPC already in the database. This means that both John and an earlier user were listening to or viewing the same media content.

The foregoing takes place for FBSAERPs for every subsequent user, such that eventually multiple MEPCs having the same identifier are stored in the database. This means that multiple users listened to or viewed the same media content.

If there exist more than two MEPCs in the database based on inputs from multiple previous users a Mixing Functionality (MF) is initiated. The Mixing Functionality considers each FBSAERP in each MEPC having the same identifier and seeks to find identical FBSAERPs in at least two of the more than two MEPCs. If there exist identical FBSAERPs in at least two of the more than two MEPCs, a silver FBSAERP match result is awarded to that FBSAERP. An identical process is carried out for every FBSAERP in the MEPC.

If identical FBSAERPs are found to exist in at least a predetermined number of MEPCs, a gold FBSAERP match result is awarded to that FBSAERP. When at least a given percentage of all of the FBSAERPs in the MEPCs having the same identifier have been awarded a gold FBSAERP match result, a GOLD STANDARD MEPC is compiled from all of the FBSAERPs having a gold FBSAERP match result and stored in the database. The remaining MEPCs having the same identifier as the GOLD STANDARD MEPC are discarded. No further MEPCs having the same identifier are subsequently created.

Figure 41:
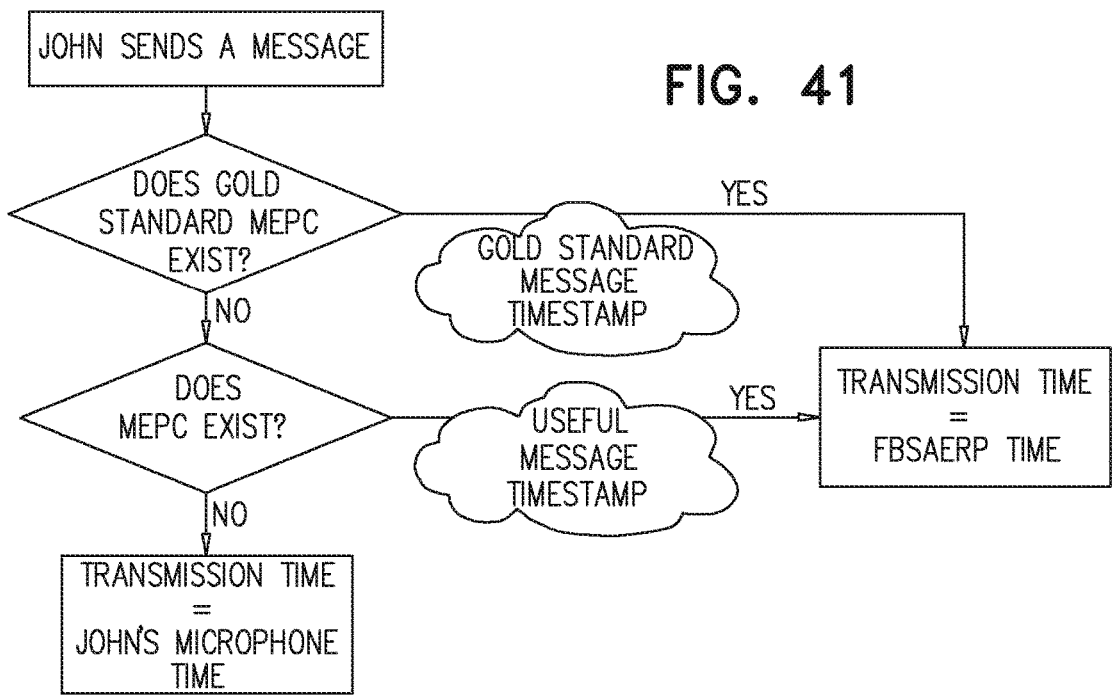
FIG. 41 is a simplified flow chart illustrating a method for message time stamping and transmission functionality forming part of method and system of the present invention.

Reference is now made to FIG. 41, which illustrates message time stamping and transmission functionality. As described hereinabove with reference to FIGS. 1-5 and 9, when John sees dogs dancing in the media content that he is watching, John is inspired to send a message. He sends this message using his mobile communicator in a manner exemplified in any of FIGS. 1-5. John may specify one or more intended recipients for his message or may make his message available to any subscriber to a message sharing service utilizing the system and method of the present invention. John can sign his message or indicate that his message is to be sent anonymously. Upon transmission of the message, the message center server receiving the message time-stamps the message by associating the transmission of the message with a given FBSAERP in a stored MEPC.

The technology for associating the transmission of the message with a given FBSAERP in a stored MEPC will now be described.

The time of transmission of John's message is known in absolute time at John's location, for example, 11:45 PM, Paris time, Jun. 23, 2015, and is coincident with a time along a time line of audio content being picked up by John's microphone, here termed John's Microphone Time Line.

If a GOLD STANDARD MEPC exists, the Microphone Time Line is matched to the show timeline, which is inherent in the GOLD STANDARD MEPC. Thus the server links the transmission time of John's message to a given FBSAERP in the GOLD STANDARD MEPC. This is a GOLD STANDARD message timestamp.

If a GOLD STANDARD MEPC does not yet exist, the Microphone Time Line may be matched to the show timeline, which is generally the same for all of the stored MEPCs having the same identifier. Thus, the message center server links the transmission time of John's message to a given FBSAERP in any one of the stored MEPCs having the same identifier. This is a useful message timestamp.

If a stored MEPC for the media content being viewed by John does not yet exist, the Microphone Time Line is deemed to be the show timeline as currently being viewed by John. Thus the message center server links the transmission time of John's message to a Microphone Timeline. This is a useful, but not entirely reliable, message timestamp.

It is appreciated that even subsequent to transmission of John's message to the message center server, creation of new MEPCs having the same identifier or even of a GOLD STANDARD MEPC can automatically and retrospectively enhance the reliability of the message timestamp of John's message.

Figure 42:
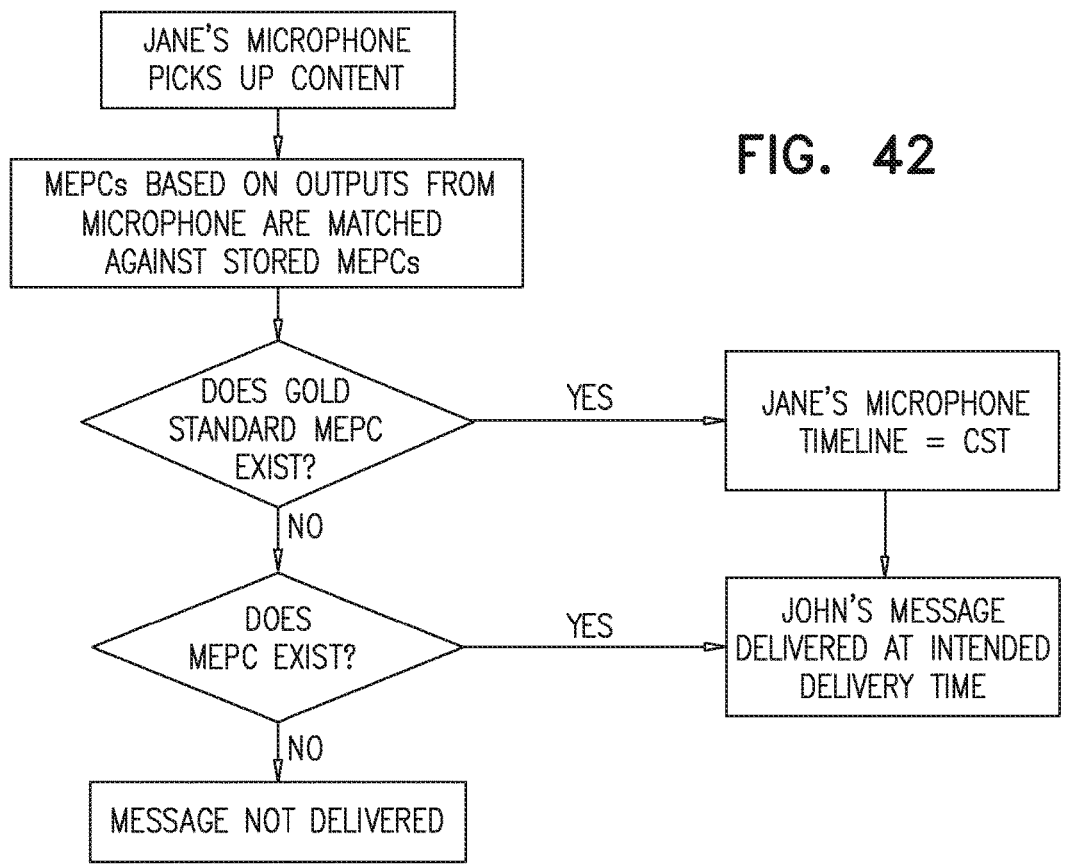
FIG. 42 is a simplified flow chart illustrating message delivery functionality forming part of the method and system of the present invention.

Reference is now made to FIG. 42, which illustrates message delivery functionality. As described hereinabove with reference to FIGS. 1-5, when Jane sees dogs dancing in the media content that she is watching, Jane receives John's message, preferably via her mobile communicator, preferably in a manner exemplified in any of FIGS. 1-5. As noted above, Jane may specify one or more potential senders from whom she is willing to receive messages or may elect to receive messages from any subscriber to a message sharing service utilizing the system and method of the present invention.

The technology for associating the delivery of the message at a time when Jane is watching a particular media element will now be described.

The time of receipt by Jane of John's message, which occurs in absolute time, for example, at 9:15 AM, London time, on Jul. 24, 2015, is linked to a time along a time line of audio content being picked up by Jane's microphone, here termed Jane's Microphone Time Line. The message center server matches an MEPC based on outputs of Jane's microphone with a stored MEPC. If the message center server is unable to match an MEPC based on outputs of Jane's microphone, Jane does not receive the message.

If a GOLD STANDARD MEPC exists, Jane's Microphone Time Line is matched to the show timeline, also referred to herein as the CST, which is inherent in the GOLD STANDARD MEPC. Thus the message center server links the intended delivery time of John's message to a given FBSAERP in the GOLD STANDARD MEPC and thus to a given FBSAERP in Jane's MEPC. This is the GOLD STANDARD message timestamp of John's message.

If a GOLD STANDARD MEPC does not yet exist, Jane's Microphone Time Line may be matched to the show timeline, or CST, which is generally the same for all of the stored MEPCs having the same identifier. Thus, the message center server links the delivery time of John's message to a given FBSAERP in any one of the stored MEPCs having the same identifier and thus to a given FBSAERP in Jane's MEPC.

The foregoing description referencing FIGS. 1-5 is also relevant to the scenario of FIGS. 9 & 10.

Referring back to FIGS. 6 and 7, it is appreciated that Jane's reply to John's message is not linked to any timeline in the message center server and may be handled by the message center server in an entirely conventional manner. This is also relevant to the scenario of FIG. 11.

Referring now back to FIG. 8, it is seen that a commercial entity, here a dog food company, receives an identity-agnostic feed of parsed extracts from the messages received by the message center server. This feed is preferably associated with the CST timestamps of the relevant video context.

The technology enabling the functionality of FIG. 8 is embodied in the supply of an Export Enhanced MEPC (EEMEPC) by message center 810 to the commercial entity server 830. The EEMEPC preferably contains MEPC-CST data together with data derived from viewer comments which is linked to the CST data and enables the commercial entity to gauge value parameters of product placements or other events in the viewed media.

If a GOLD STANDARD MEPC exists, the EEMEPC data is highly reliable as to time linkage between viewer comments and CST data. This is a GOLD STANDARD commercial export feed.

If a GOLD STANDARD MEPC does not yet exist, the EEMEPC data is somewhat reliable as to time linkage between viewer comments and CST data. This is a standard commercial export feed.

Reference is now to the functionalities described hereinabove with reference to FIGS. 12-18. The technology enabling these functionalities provides production of one or more commercial messages which are associated with one or more CST timestamps so as to be delivered at a predetermined time along the CST timeline. The messages may be directed to all subscribers of the message sharing service or, alternatively, to only selected subscribers. Various different messages or different types of messages may be sent to various categories of subscribers based, inter alia, on social media data received from conventional sources. The commercial messages may include offers and coupons and solicit responses which may be received and processed via the message center server. The technology described hereinabove is applicable both to product placements and to advertisements appearing in media being watched by subscribers to the message sharing service.

Alternatively, a third party, such as a commercial entity, may connect to the message center server through the use of an Application Program Interface (API). The API will allow the third party to receive the user's CST timestamps during playing of the media element, thereby allowing the commercial entity to send or receive messages directly to or from users via its own message center server.

In another preferred embodiment of the present invention a computer program designed to run on a mobile device, such as an App, running on a smartphone or tablet computer, may be used to send and receive communications to and from the message center.

In yet another embodiment of the present invention the texting features of mobile devices, such as smartphones and tablet computers, may be used to interface with the message center server for sending and receiving communications to and from the message center.

Referring now back to FIG. 19, it is seen that a commercial entity, here a polling company, receives an identity-agnostic feed of parsed extracts from the messages received by the message center. This feed is preferably associated with the CST timestamps of the relevant video context.

The technology enabling the functionality of FIG. 19 is embodied in the supply of a Polling Enhanced MEPC (PEMEPC) by message center server 1910 to the commercial entity server 1950. The PEMEPC preferably contains MEPC-CST data together with data derived from viewer comments, which is linked to the CST data and enables the commercial entity to gauge user preference parameters related to events in the viewed media.

If a GOLD STANDARD MEPC exists, the PEMEPC data is highly reliable as to time linkage between viewer comments and CST data. This is a GOLD STANDARD commercial polling feed.

If a GOLD STANDARD MEPC does not yet exist, the PEMEPC data is somewhat reliable as to time linkage between viewer comments and CST data. This is a standard commercial polling feed.

It is appreciated that the above described technology is also applicable to music, as presented in FIG. 20, and to podcasts, as presented in FIGS. 21-39.

It will be appreciated by persons skilled in the art that the present invention is not limited by what has been particularly shown and described hereinabove.

Rather the scope of the present invention includes both combinations and subcombinations of features described hereinabove as well as modifications and variations thereof which are not in the prior art.

The invention claimed is:

1. A method for associating messages with media, the method comprising:
    playing media, including multiple media elements, on a first device;
    receiving at least one message from a second device during playing of said media on said first device;
    time stamping said at least one message with respect to a timeline of said media thereby providing a media timeline specific time stamp;
    storing said at least one message together with said media timeline specific time stamp; and
    presenting said at least one message on a third device, different from said first device and from said second device, during playing of said media on a fourth device at a time along said timeline specified by said media timeline specific time stamp.

2. A method for associating messages with media according to claim 1 and wherein said presenting said at least one message on said third device during playing of said media comprises sensing playing of said media and said timeline.

3. A method for associating messages with media according to claim 1 and wherein at least one of said first device and said second device is selected from a telephone screen, a tablet and a watch screen.

4. A method for associating messages with media according to claim 1 and wherein said media is selected from video media, audio media, interactive media, podcasts, audio books, music, radio programming, television programming, movies, live events, sports, lectures and sermons.

5. A method for associating messages with media according to claim 1 and wherein said media element is selected from: an audio frame, a video frame, an image, a word, a sequence of audio frames, a sound, a brightness level, a sound level, a sequence of video frames, a sequence of images, a sequence of words, a musical sequence, a logo, a portion of an image, a combination of video and audio content, an absence of audio content, an absence of video content and an absence of audio and video content.

6. A method for associating messages with media according to claim 2 and wherein:
    said sensing playing of said media comprises employing a microphone in said third device picking up ambient audio information during playing of said media by said fourth device, said ambient audio information including audio content of said media; and
    said method also comprises analyzing said ambient audio information to provide output information of at least frequency and amplitude of at least some of said ambient audio information along said timeline.

7. A system for associating messages with media, including multiple media elements, during playing thereof, the system comprising a server including:
    a message receiver, receiving at least one message from a first device during playing of said media on a second device;
    a media element sensor, sensing at least one media element currently being played during playing of said media on said second device; and
    a message transmitter, transmitting said at least one message to a message player for playing in time synchronization with playing of said at least one media element on a third device based on an output from said media element sensor.

8. A system for associating messages with media according to claim 7 and wherein:
    said server also comprises a media element message associator, associating said at least one message in time with said at least one media element; and
    said media element message associator also comprises:
        a message time stamper, time stamping a message with respect to a content specific timeline of media thereby providing a content specific timeline time stamp;
        a database; and
        a message time stamp storer, storing said message together with said content specific timeline time stamp in said database.

9. A system for associating messages with media according to claim 8 and wherein said media element sensor senses playing of said media and said content specific timeline.

10. A system for associating messages with media according to claim 8 and wherein said message transmitter associates said message with said media during playing thereof at a time along said content specific timeline specified by said content specific timeline time stamp.

11. A system for associating messages with media according to claim 7 and wherein said media is selected from video media, audio media, interactive media, podcasts, audio books, music, radio programming, television programming, movies, live events, sports, lectures and sermons.

12. A system for associating messages with media according to claim 7 and wherein said media element is selected from: an audio frame, a video frame, an image, a word, a sequence of audio frames, a sound, a brightness level, a sound level, a sequence of video frames, a sequence of images, a sequence of words, a musical sequence, a logo, a portion of an image, a combination of video and audio content, an absence of audio content, an absence of video content and an absence of audio and video content.

13. A system for associating messages with media according to claim 7 and wherein said media element sensor includes:
   an ambient audio information receiver receiving ambient audio information from said first device during playing of said at least one media element on said second device, said ambient audio information including audio content of said at least one media element; and
   an ambient audio analyzer, analyzing said ambient audio information to provide output information of at least frequency and amplitude of at least some of said ambient audio information along a content specific time line.

14. A system for associating messages with media according to claim 13 and wherein said ambient audio analyzer includes:
   an ambient audio sampler, sampling said ambient audio information to provide a multiplicity of samples of said ambient audio information; and
   an ambient audio sample transformer, performing a transformation of said multiplicity of samples to provide an output of at least frequency and amplitude of said at least some of said ambient audio information along a content specific time line to provide a Content Specific Timeline Specific Audio Identifier (CSTSAI).

15. A system for associating messages with media according to claim 14 and wherein said ambient audio sample transformer performs a plurality of transformations, each for a different number of samples.

16. A system for associating messages with media according to claim 14 and wherein said server also includes an audio matcher, attempting matching of said content specific timeline specific audio identifier output by said ambient audio analyzer to a previously acquired stored corresponding content specific timeline specific audio identifier.

17. A system for associating messages with media according to claim 16 and wherein said audio matcher comprises:
   an audio identifier matcher, attempting matching of said content specific timeline specific audio identifier provided by said ambient audio analyzer to a plurality of previously acquired stored corresponding content specific timeline specific audio identifiers;
   a match quality ascertainer, ascertaining a match quality metric for matching of said content specific timeline specific audio identifier provided by said ambient audio analyzer with two different ones of said plurality of previously acquired stored corresponding content specific timeline specific audio identifiers having the highest match quality;
   a match quality difference ascertainer, ascertaining whether a difference in said match quality metrics is equal to or greater than a predetermined threshold and providing a difference output of 'match' when said match quality metrics are equal to or greater than said threshold and an output of 'no match' when match quality metrics are less than said threshold; and
   a match establisher, establishing, if said difference output is 'match', a match between said content specific timeline specific audio identifier provided by said ambient audio analyzer and that one of said two different ones of said plurality of previously acquired stored corresponding content specific timeline specific audio identifiers having the highest match quality.

18. A system for associating messages with media according to claim 17 and wherein, if said difference output is 'no match', said match establisher stores said content specific timeline specific audio identifier provided by said ambient audio analyzer.

19. A system for associating messages with media according to claim 17 and wherein said message transmitter, upon said difference output being 'match', establishes a time synchronization between a content-specific timeline of audio content to which said content specific timeline specific audio identifier provided by said ambient audio analyzer belongs and a content-specific timeline of audio content to which said previously acquired stored corresponding content specific timeline specific audio identifier belongs.

20. A system for associating messages with media according to claim 19 and wherein said message transmitter transmits said message to said message player for playing at a time along said content-specific timeline of audio content to which said content specific timeline specific audio identifier provided by said ambient audio analyzer belongs, which corresponds to a time along said content-specific timeline of audio content to which said previously acquired stored corresponding content specific timeline specific audio identifier belongs to which said message was synchronized.

* * * * *